United States Patent
Kishigami

(10) Patent No.: US 12,468,023 B2
(45) Date of Patent: Nov. 11, 2025

(54) RADAR APPARATUS

(71) Applicant: Panasonic Automotive Systems Co., Ltd., Kanagawa (JP)

(72) Inventor: Takaaki Kishigami, Tokyo (JP)

(73) Assignee: PANASONIC AUTOMOTIVE SYSTEMS, CO., LTD., Kanagawa (JP)

( * ) Notice: Subject to any disclaimer, the term of this patent is extended or adjusted under 35 U.S.C. 154(b) by 21 days.

(21) Appl. No.: 18/646,218

(22) Filed: Apr. 25, 2024

(65) Prior Publication Data

US 2024/0280681 A1    Aug. 22, 2024

Related U.S. Application Data

(63) Continuation of application No. 17/204,274, filed on Mar. 17, 2021, now Pat. No. 12,000,921.

(30) Foreign Application Priority Data

Mar. 18, 2020    (JP) .................... 2020-047718

(51) Int. Cl.
  *G01S 13/34*    (2006.01)
  *G01S 7/35*    (2006.01)
  *G01S 13/32*    (2006.01)

(52) U.S. Cl.
  CPC ............ *G01S 13/347* (2013.01); *G01S 7/352* (2013.01); *G01S 13/325* (2013.01); *G01S 7/356* (2021.05)

(58) Field of Classification Search
  None
  See application file for complete search history.

(56) References Cited

U.S. PATENT DOCUMENTS

2015/0247924 A1    9/2015  Kishigami
2017/0254879 A1    9/2017  Tokieda, I et al.
(Continued)

FOREIGN PATENT DOCUMENTS

JP    2008-275382    11/2008
JP    2016-050778    4/2016
JP    2019-113481    7/2019

OTHER PUBLICATIONS

Hasch et al., "Millimeter-Wave Technology for Automotive Radar Sensors in the 77 GHz Frequency Band", IEEE Transactions On Microwave Theory and Techniques, vol. 60, No. 3, Mar. 2012, pp. 845-860.

(Continued)

*Primary Examiner* — Whitney Moore
(74) *Attorney, Agent, or Firm* — Greenblum & Bernstein, P.L.C.

(57) ABSTRACT

A radar apparatus includes signal generation circuitry, which, in operation, generates a plurality of transmission signals transmitted at different transmission start timings, and transmission circuitry, which, in operation, applies different phase rotations to a first transmission signal and a second transmission signal among the plurality of transmission signals and transmits the first transmission signal and the second transmission signal from different transmission antennas. A transmission start timing of the second transmission signal is later than a transmission start timing of the first transmission signal. A part of the first transmission signal and a part of the second transmission signal are transmitted in a first period. A modulation frequency of the first transmission signal at a first timing included in the first period differs from a modulation frequency of the second transmission signal at the first timing.

18 Claims, 13 Drawing Sheets

(56) References Cited

U.S. PATENT DOCUMENTS

2020/0326421 A1    10/2020  Aoki
2022/0196795 A1*   6/2022   Wu .................... G01S 7/354
2022/0221570 A1    7/2022   Zhu
2023/0008565 A1*   1/2023   Kishigami ............ G01S 7/4026

OTHER PUBLICATIONS

Cadzow, "Direction-of-Arrival Estimation Using Signal Subspace Modeling", IEEE Transactions of Aerospace and Electronic Systems, vol. 28, No. 1, Jan. 1992, pp. 64-79.
Kronauge et al., "Fast Two-Dimensional CFAR Procedure", IEEE Transactions of Aerospace and Electronic Systems, vol. 49, No. 3, Jul. 2013, pp. 1817-1823.
Murad et al., "Requirements for Next Generation Automotive Radars", IEEE Radar Conference (RadarCon13), Ottawa, ON, 2013, pp. 1-6.
Li et al., "MIMO Radar with Colocated Antennas", IEEE Signal Processing Magazine, vol. 24, Issue: 5, Sep. 2007, pp. 106-114.
Wenger et al., "Long Range and Ultra-Wideband Short Range Automotive Radar", IEEE International Conference on Ultra-Wideband, Singapore, 2007, pp. 518-522.
Japan Office Action issued in Japan Patent Application No. 2020-47718, dated Jun. 6, 2023, together with English translation thereof.

* cited by examiner

RADAR APPARATUS

CROSS REFERENCE TO RELATED APPLICATION

This application is a Continuation Application of U.S. application Ser. No. 17/204,274, filed Mar. 17, 2021, which claims priority to Japanese Patent Application No. 2020-047718, filed on Mar. 18, 2020. The entire contents of each of the above-mentioned documents are hereby incorporated by reference.

TECHNICAL FIELD

The present disclosure relates to a radar apparatus.

BACKGROUND ART

Recently, studies have been developed on radar apparatuses that use a radar transmission signal of a short wavelength including microwaves or millimeter waves allowing high resolution. Further, it has been required to develop a radar apparatus which detects not only vehicles but also small objects such as pedestrians in a wide-angle range (e.g., referred to as "wide-angle radar apparatus") in order to improve the outdoor safety.

Examples of the configuration of the radar apparatus having a wide-angle detection range include a configuration using a technique of receiving a reflected wave from a target (or target object) by an array antenna composed of a plurality of antennas (or also referred to as antenna elements), and estimating the direction of arrival of the reflected wave (or referred to as the angle of arrival) based on received phase differences with respect to element spacings (antenna spacings) (Direction of Arrival (DOA) estimation).

Examples of the DOA estimation include a Fourier method (Fast Fourier Transform (FFT) method), and, methods allowing higher resolution, such as a Capon method, Multiple Signal Classification (MUSIC), and Estimation of Signal Parameters via Rotational Invariance Techniques (ESPRIT).

There is also a proposed radar apparatus, for example, having a configuration in which a radar transmitter as well as a radar receiver is provided with a plurality of antennas (array antenna), and beam scanning is performed through signal processing using the transmit and receive array antennas (also referred to as Multiple Input Multiple Output (MIMO) radar) (e.g., see Non-Patent Literature (hereinafter referred to as "NPL") 1).

CITATION LIST

Patent Literature

PTL 1
Japanese Patent Application Laid-Open No. 2019-113481

Non Patent Literature

NPL 1
J. Li, and P. Stoica, "MIMO Radar with Colocated Antennas," Signal Processing Magazine, IEEE Vol. 24, Issue: 5, pp. 106-114, 2007
NPL 2
J. Hasch, E. Topak, R. Schnabel, T. Zwick, R. Weigel and C. Waldschmidt, "Millimeter-Wave Technology for Automotive Radar Sensors in the 77 GHz Frequency Band," in IEEE Transactions on Microwave Theory and Techniques, vol. 60, no. 3, pp. 845-860, March 2012.
NPL 3
M. Murad et al., "Requirements for next generation automotive radars," 2013 IEEE Radar Conference (RadarCon13), Ottawa, ON, 2013, pp. 1-6.
NPL 4
J. Wenger and S. Hahn, "Long Range and Ultra-Wideband Short Range Automotive Radar," 2007 IEEE International Conference on Ultra-Wideband, Singapore, 2007, pp. 518-522.
NPL 5
M. Kronauge, H. Rohling, "Fast two-dimensional CFAR procedure," IEEE Trans. Aerosp. Electron. Syst., 2013, 49, (3), pp. 1817-1823
NPL 6
Direction-of-arrival estimation using signal subspace modeling Cadzow, J. A.; Aerospace and Electronic Systems, IEEE Transactions on Volume: 28, Issue: 1 Publication Year: 1992, Page(s): 64-79

SUMMARY OF INVENTION

However, methods for a radar apparatus (e.g., MIMO radar) to detect a target have not been comprehensively studied.

One non-limiting and exemplary embodiment facilitates providing a radar apparatus with an enhanced target-detection accuracy.

A radar apparatus according to an embodiment of the present disclosure includes signal generation circuitry, which, in operation, generates a first transmission signal and a second transmission signal; and transmission circuitry, which, in operation, transmits a multiplexed signal resulting from code-multiplexing the first transmission signal and the second transmission signal, wherein a modulation frequency of the first transmission signal at a first timing is identical to a modulation frequency of the second transmission signal at a second timing that is later than the first timing.

Note that these generic or specific exemplary embodiments may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to enhance the target detection accuracy of a radar apparatus.

Additional benefits and advantages of one example of the present disclosure will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
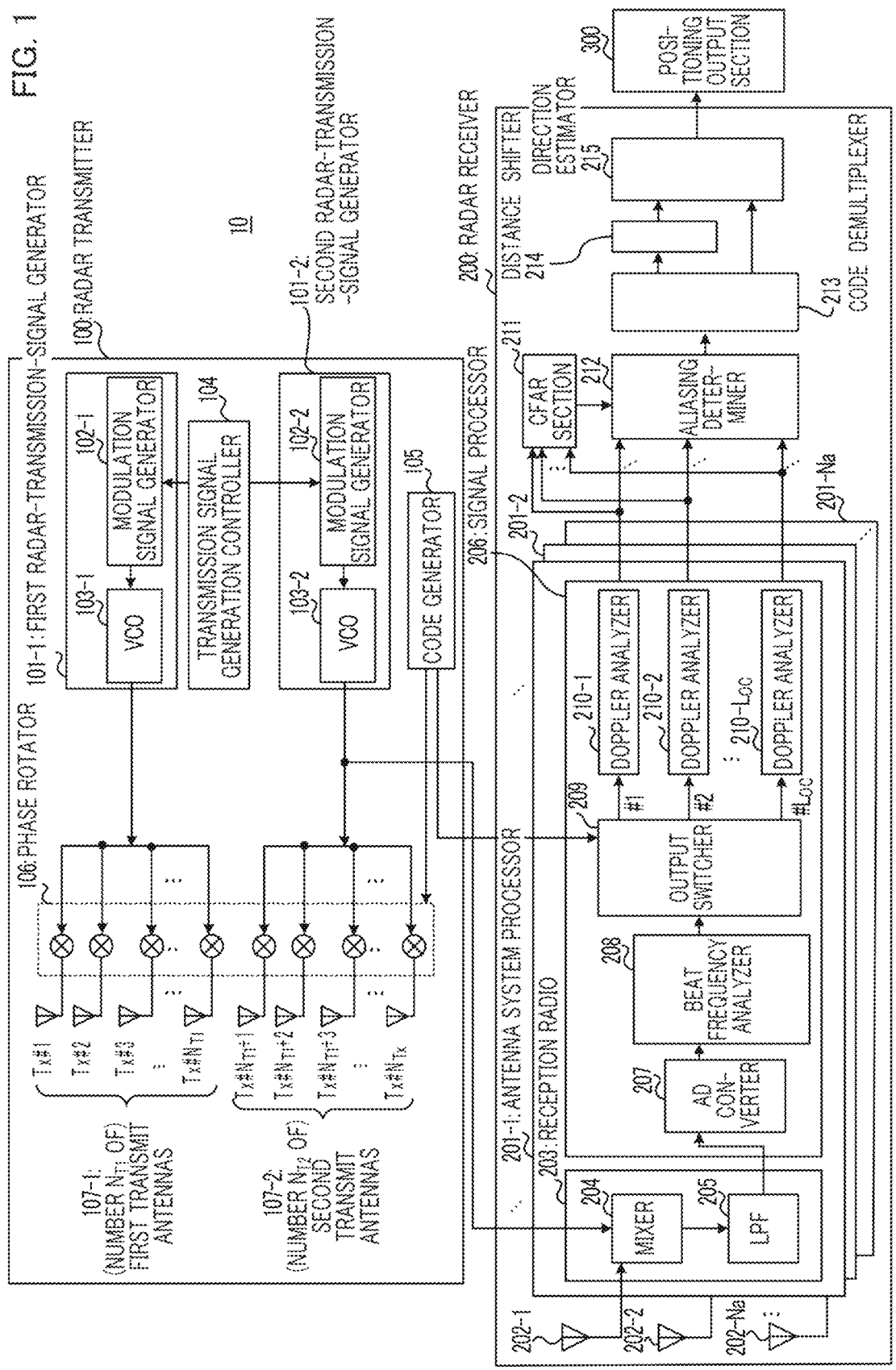
FIG. 1 is a block diagram illustrating an exemplary configuration of a radar apparatus according to Embodiment 1.

A MIMO radar transmits, from a plurality of transmit antennas (also referred to as "transmit array antenna"), a radar transmission signal (also referred to as "radar transmission wave") that is time-division, frequency-division, or code-division multiplexed, for example. The MIMO radar then receives a signal (e.g., referred to as "radar reflected wave") reflected, for example, by an object around the radar using a plurality of receive antennas (also referred to as "receive array antenna") to separate and receive a multiplexed transmission signal from each reception signal. With this processing, the MIMO radar can extract a propagation path response indicated by the product of the number of transmit antennas and the number of receive antennas, and performs array signal processing using these reception signals as a virtual receive array.

Further, in the MIMO radar, it is possible to virtually enlarge the antenna aperture so as to enhance the angular resolution by appropriately arranging element spacings in the transmit and receive array antennas.

For example, radar apparatuses such as an in-vehicle radar and the like have a mode for detection within a relatively-longer distance range (hereinafter, referred to as "Long Range (LR) mode") performed by narrowing a detection angle range (e.g., Field Of View (FOV)) using transmit antennas (or receive antennas) with a higher directive gain obtained by narrower directivity. The radar apparatuses also have a mode for detection within a relatively-near distance range (hereinafter, referred to as "Short Range (SR) mode") performed by widening the detection angle range (FOV) using relatively wide-angle directional transmit antennas (or receive antennas). Some radar systems use both the LR mode and the SR mode, for example.

Note that, the SR range mode may also be called a middle distance range mode (e.g., "Middle Range (MR) mode"), for example.

In the combined use in the LR mode and the SR mode, a method of switching between the LR mode and the SR mode in a time division manner is possible.

For example, a radar apparatus may transmit a modulation pulse (or a modulation pulse train consisting of a plurality of modulation pulses) for the LR mode from a transmit antenna for the LR mode, and a modulation pulse (or a modulation pulse train) for the SR mode from a transmit antenna for the SR mode alternately in a time division manner. Alternatively, the radar apparatus may sequentially transmit the modulation pulse train for the SR mode from the transmit antenna for the SR mode after transmitting the modulation pulse train for the LR mode from the transmit antenna for the LR mode.

Further, the transmissions of the modulation pulse trains are not limited to time division transmission or sequential transmission of the modulation pulse trains for the LR mode and the SR mode, but simultaneous multiplexing transmission such as code multiplexing transmission or Doppler multiplexing transmission may also be applied (see, e.g., Patent Literature (hereinafter referred to as "PTL") 1).

When the LR mode and the SR mode are sequentially switched with each other in the combined use of the LR mode and the SR mode, the radar apparatus can individually transmit a modulation pulse (or a modulation pulse train) in each of the LR mode and the SR mode. The modulation pulse meets a requirement of a detection range or resolution of distance and a Doppler component for each of the LR mode and the SR mode.

In this case, however, the LR mode and the SR mode are operated independently, and thus the processing time for completing both modes is likely to be extended. In addition, switching the modes sequentially is likely to enlarge a time difference between the time to obtain the reception result of the LR mode and the time to obtain the reception result of the SR mode. Thus, a process of using the reception result of the LR mode in the SR mode or a process of using the reception result of the SR mode in the LR mode, for example, is hard to be applied.

Further, in the combined use of the LR mode and the SR mode, when the modulation pulse of the LR mode and that of the SR mode are alternately switched in time division, the radar apparatus can configure and transmit a modulation pulse (or a modulation pulse train) meeting a requirement of a detection range or resolution of distance for either one of the LR mode and the SR mode, in each of the LR mode and the SR mode. This method makes it easier to apply the process of using the reception result of the LR mode in the SR mode or the process of using the reception result of the SR mode in the LR mode, for example.

This case, however, possibly lowers the maximum Doppler frequency detectable without aliasing (also referred to as Doppler aliasing). The processing time for completing both modes is also possibly extended.

Meanwhile, when signals of the LR mode and the SR mode are multiplexed and transmitted by code multiplexing or Doppler multiplexing, for example, the process of using the reception result of the LR mode in the SR mode or the process of using the reception result of the SR mode in the LR mode is easier to be applied, and the processing time for completing both modes can be reduced compared to the case of time division multiplexing.

In the case of code multiplexing or Doppler multiplexing, it is preferable to use a modulation pulse (or a modulation pulse train) meeting requirements (e.g., detection ranges or resolution of distance and Doppler components) for both of the SR mode and the LR mode. The LR mode detects in a long range, and thus both of the distance range and the velocity range where the LR mode can perform detection are assumed to be larger than the distance range and the velocity range where the SR mode can perform detection, for example. The SR mode, in contrast, detects in a short range, and it is thus preferable to improve both of the distance resolution and the velocity resolution compared to those in the LR mode, in order to detect the possibility of collision of a target more accurately (see NPLs 2 to 4, for example).

Hereinafter, descriptions will be given of methods of multiplexing and transmitting transmission signals of the LR mode and the SR mode simultaneously, using code multiplexing or Doppler multiplexing, as examples. Descriptions will also be given of methods of generating a radar wave meeting requirements (required specifications) for both of the LR mode and the SR mode described above, in a case of using a frequency modulated wave (also referred to as a chirp signal) as a modulation pulse train when the transmission signals are multiplexed and transmitted simultaneously.

An approach for expanding the distance range for the LR mode includes narrowing frequency sweep bandwidth Bw of a chirp signal. This approach, however, makes the distance resolution rough in inverse proportion to frequency sweep bandwidth Bw of the chirp signal, thereby possibly not meeting the requirement for the SR mode.

Another approach for expanding the distance range for the LR mode includes, for example, increasing sampling rate $f_{sa}$ of an Analogue-to-Digital (AD) converter without narrowing frequency sweep bandwidth Bw. This approach expands the maximum detection distance range while keeping the distance resolution, for example. The approach of increasing sampling rate $f_{sa}$, however, possibly increases the cost of the hardware with the acceleration of the AD converter. In addition, power consumption can also be increased with the acceleration of the AD converter, for example, and this possibly increases the calorific value as well.

Further, still another approach includes, for example, increasing frequency sweep time without narrowing frequency sweep bandwidth Bw. This approach expands the distance range while keeping the distance resolution, without increasing the sampling rate of the AD converter, for example. In this approach, however, a chirp sweep time becomes longer than that in other approaches, and this possibly makes a chirp transmission period longer. Accordingly, the maximum Doppler frequency without aliasing is lowered, for example, thereby possibly not meeting the requirement for the LR mode.

In this regard, an exemplary embodiment of the present disclosure will describe methods of expanding a distance range or a detection range of a Doppler component while keeping distance resolution, in simultaneous multiplexing transmission such as code multiplexing transmission or Doppler multiplexing transmission.

In an exemplary embodiment of the present disclosure, descriptions will be given of a radar apparatus (e.g., a MIMO radar) performing simultaneous multiplexing transmission capable of detecting in different distance ranges for different multiplexed signals, for example. According to an exemplary embodiment of the present disclosure, the radar apparatus can improve the distance resolution and expand the distance range or the detection range of the Doppler component without using a high-speed AD converter, for example, in transmission combining (i.e., mixed with) different modes having different ranges where detection is possible (e.g., the LR mode and the SR mode).

Note that the radar apparatus according to an exemplary embodiment of the present disclosure may be mounted on a mobile body such as a vehicle, for example. The radar apparatus mounted on the mobile body can be used, for example, for an Advanced Driver Assistance System (ADAS) that enhances crashworthiness, or as a sensor used for monitoring around the mobile body during automatic driving.

The radar apparatus according to an exemplary embodiment of the present disclosure may also be attached to a relatively high-altitude structure, such as, for example, a roadside utility pole or traffic lights. Such a radar apparatus is usable, for example, as a sensor in an assist system that increases the safety of passing vehicles or pedestrians.

Note that the use of the radar apparatus is not limited to the above, and the radar apparatus may be used for other uses.

Embodiments of the present disclosure will be described below in detail with reference to the drawings. In the embodiments, the same constituent elements are identified with the same numerals, and a description thereof is omitted because of redundancy.

In the following, a description is given of a radar apparatus having a configuration in which a transmission branch transmits different transmission signals multiplexed simultaneously from a plurality of transmit antennas, and a reception branch performs reception processing by demultiplexing each of the transmission signals (in other words, a MIMO radar configuration).

Further, by way of example, a description will be given below of a configuration of a radar system using a frequency-modulated pulse wave such as a chirp pulse (e.g., also referred to as chirp pulse transmission (fast chirp modulation)).

Furthermore, by another way of example, a description will be given of a configuration of a radar apparatus performing code multiplexing transmission of signals.

Embodiment 1

[Configuration of Radar Apparatus]

FIG. 1 is a block diagram illustrating an example of the configuration of radar apparatus 10 according to the present embodiment.

Radar apparatus 10 includes radar transmitter (transmission branch) 100, radar receiver (reception branch) 200, and positioning output section 300.

Radar transmitter 100 generates, for example, a radar signal (radar transmission signal) and transmits the radar transmission signal at a defined transmission period using a transmit array antenna composed of a plurality of transmit antennas 107 (e.g., number $N_{Tx}$ (=$N_{T1}$+$N_{T2}$) of antennas).

Radar receiver 200 receives, for example, a reflected wave signal, which is a radar transmission signal reflected by a target (target object (not illustrated)), using a receive array antenna including a plurality of receive antennas 202 (e.g., number Na of antennas). Radar receiver 200 performs signal processing on the reflected wave signal received at each of receive antennas 202 to, for example, detect the presence or absence of the target object, or estimate the distance through which the reflected wave signal arrives, the Doppler frequency (in other words, the relative velocity), and the direction of arrival, and outputs information on an estimation result (in other words, positioning information).

Positioning output section 300 may perform, for example, distance aliasing determination processing, examples of which will be described later, based on the information on the estimation result of the direction of arrival inputted from radar receiver 200. Note that processing performed in positioning output section 300 is not limited to the distance aliasing determination processing, and may include other processing.

Note that, the target is an object to be detected by radar apparatus 10, and includes a vehicle (including a four-wheeled vehicle and a two-wheeled vehicle), a person, a block, or a curb, for example.

[Configuration of Radar Transmitter 100]

Radar transmitter 100 includes first radar-transmission-signal generator 101-1, second radar-transmission-signal generator 101-2, transmission signal generation controller 104, code generator 105, phase rotator 106, and transmit antennas 107.

In radar transmitter 100, first radar-transmission-signal generator 101-1 and first transmit antenna 107-1 may serve as components performing processing related to the LR mode, and second radar-transmission-signal generator 101-2 and second transmit antenna 107-2 may serve as components performing processing related to the SR mode, for example.

First radar-transmission-signal generator 101-1 generates, for example, a radar transmission signal (in other words, a baseband signal). First radar-transmission-signal generator 101-1 includes, for example, Modulation signal generator 102-1 and Voltage Controlled Oscillator (VCO) 103-1. The components of first radar-transmission-signal generator 101-1 will be described below.

Figure 2:
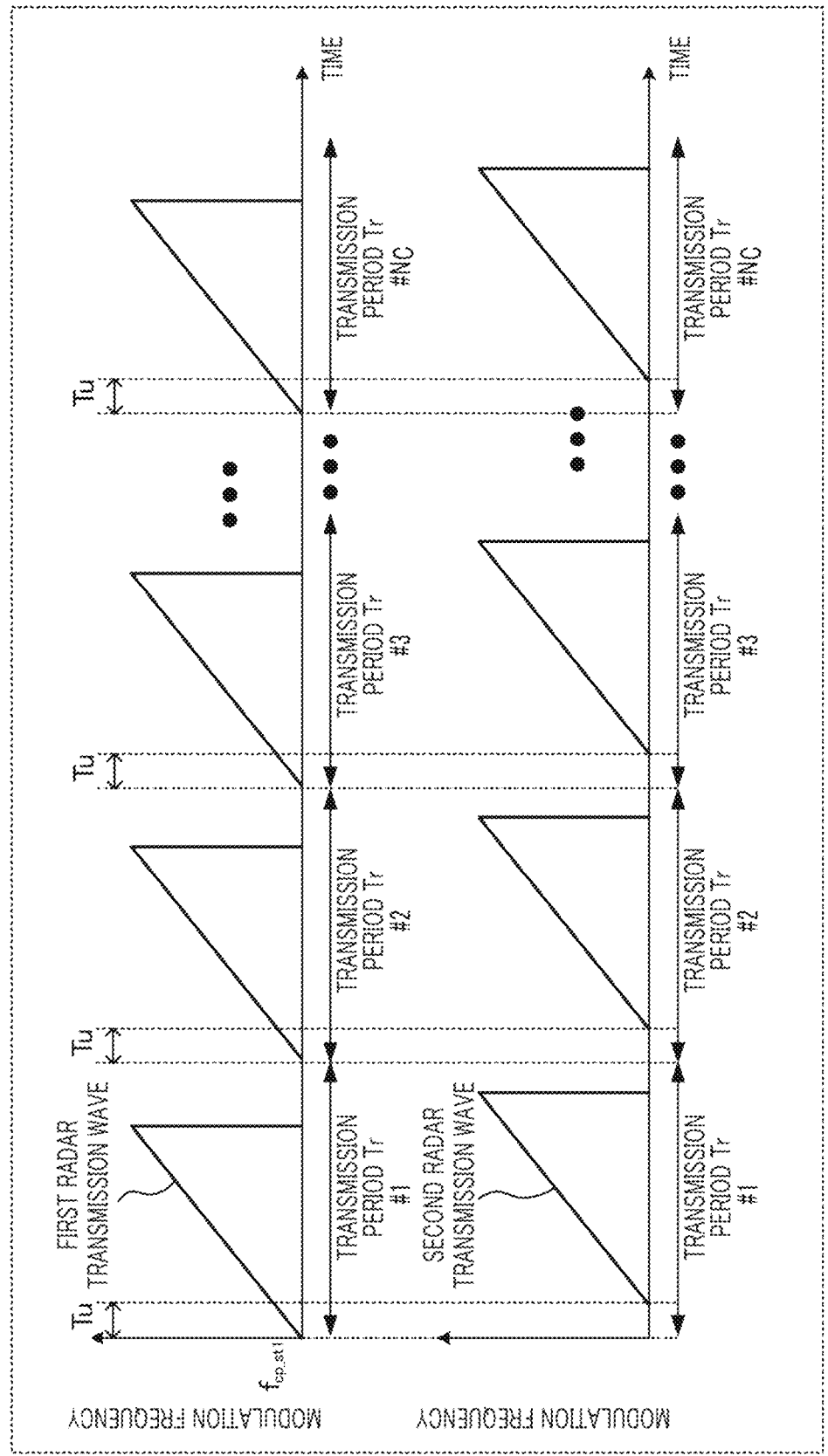
FIG. 2 illustrates an exemplary radar transmission signal according to Embodiment 1.

Modulation signal generator 102-1 generates a saw-toothed modulation signal (in other words, a modulation signal for VCO control) per radar transmission period Tr, for example, as illustrated on the upper side in FIG. 2.

Based on the radar transmission signal (modulation signal) outputted from Modulation signal generator 102-1, VCO 103-1 outputs a frequency modulated signal (hereinafter, referred to as a frequency chirp signal or chirp signal, for example) to phase rotator 106 (e.g., number $N_{T1}$ of phase shifters or phase modulators connected to first transmit antennas 107-1).

Second radar-transmission-signal generator 101-2 generates a radar transmission signal (in other words, a baseband signal). Second radar-transmission-signal generator 101-2 includes, for example, Modulation signal generator 102-2 and VCO 103-2. The components of second radar-transmission-signal generator 101-2 will be described below.

Modulation signal generator 102-2 generates a saw-toothed modulation signal (in other words, a modulation signal for VCO control) per radar transmission period Tr, for example, as illustrated on the lower side in FIG. 2.

Based on the radar transmission signal (modulation signal) outputted from Modulation signal generator 102-2, VCO 103-2 outputs a chirp signal to phase rotator 106 (e.g., number $N_{T2}$ of phase shifters or phase modulators connected to second transmit antennas 107-2) and radar receiver 200 (below-described mixer 204).

Transmission signal generation controller 104 controls, for example, generation of radar transmission signals generated in first radar-transmission-signal generator 101-1 and second radar-transmission-signal generator 101-2. For example, transmission signal generation controller 104 may control synchronization of the generation of the radar transmission signals in first radar-transmission-signal generator 101-1 and second radar-transmission-signal generator 101-2, or may control transmission timings of the radar transmission signals.

The upper side in FIG. 2 illustrates exemplary radar transmission signals outputted from first radar-transmission-signal generator 101-1 (e.g., the first radar transmission waves), for example, and the lower side in FIG. 2 illustrates exemplary radar transmission signals outputted from second radar-transmission-signal generator 101-2 (e.g., the second radar transmission waves).

For example, transmission signal generation controller 104 may control the output timing of the second radar transmission waves, as illustrated in FIG. 2, so as to delay by transmission delay time (also referred to as time delay) Tu with reference to the transmission timing of the first radar transmission wave outputted per transmission period Tr.

This control makes the transmission start timing of the first radar transmission wave earlier by Tu than the transmission start timing of the second radar transmission wave, as illustrated in FIG. 2, for example. In other words, a modulation frequency of the first radar transmission wave at a certain transmission timing is the same as that of the second radar transmission wave at a transmission timing later by Tu than the certain transmission timing, as illustrated in FIG. 2. Note that an example of a configuration value of transmission delay time Tu (in other words, a difference between the transmission timings of the first radar transmission signal and the second radar transmission signal) will be described later.

Herein, it is assumed, for example, that a chirp sweep time and a chirp frequency width for the first radar transmission wave are the same as those for the second radar transmission wave, and the transmission timing is different from each other (in other words, transmission delay time is applied).

Figure 3:
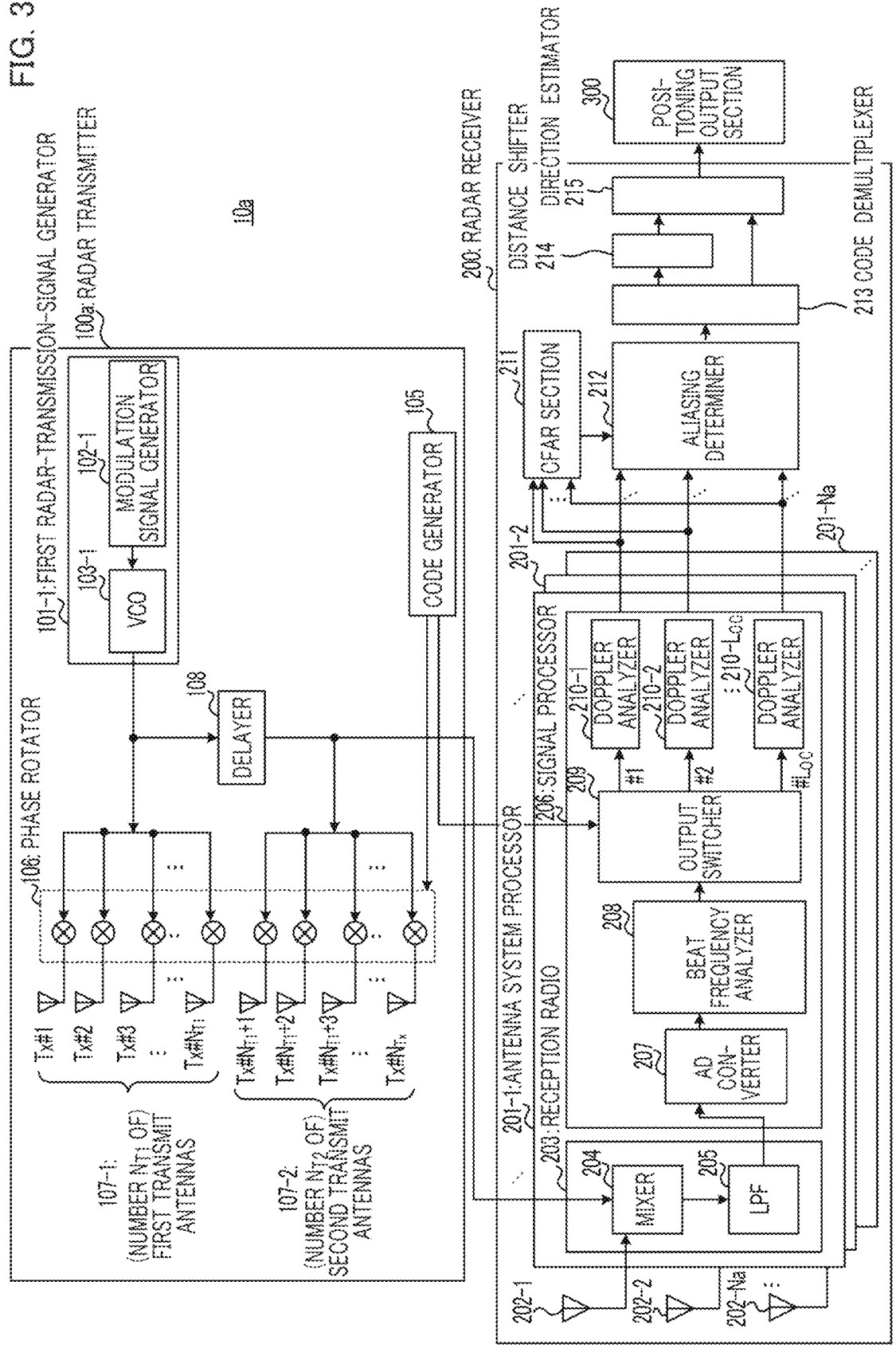
FIG. 3 is a block diagram illustrating another exemplary configuration of the radar apparatus according to Embodiment 1.

Note that the configuration of the radar apparatus is not limited to the configuration illustrated in FIG. 1, and may include a configuration with delayer 108 as illustrated in FIG. 3, for example. Radar apparatus 10a illustrated in FIG. 3 may generate the second radar transmission signal in radar transmitter 100a, for example, using delayer 108 that delays the output from first radar-transmission-signal generator 101-1 by predetermined delay time Tu, instead of using second radar-transmission-signal generator 101-2 illustrated in FIG. 1.

In FIG. 1, Code generator 105 generates a code different for each of transmit antennas 107 that perform code multiplexing transmission. Code generator 105 outputs phase rotation amounts corresponding to the generated codes to phase rotator 106. Code generator 105 also outputs information on the generated codes to radar receiver 200 (below-described output switcher 209).

Phase rotator 106 applies the phase rotation amounts inputted from code generator 105, for example, to the chirp signals inputted from first radar-transmission-signal generator 101-1 and second radar-transmission-signal generator 101-2, and outputs signals after the phase rotation to transmit antennas 107 (e.g., first transmit antennas 107-1 and second transmit antennas 107-2). Phase rotator 106 may include, for example, the phase shifters, phase modulators, or the like (not illustrated).

The output signals of phase rotator 106 are amplified to defined transmission power and radiated respectively from transmit antennas 107 to space. In other words, radar transmission signals are code multiplexed and transmitted from a plurality of transmit antennas 107 by application of the phase rotation amounts corresponding to the codes.

Next, one example of the codes (e.g., orthogonal codes) set in radar apparatus 10 will be described.

Code generator 105 may, for example, generate a code different for each of transmit antennas 107 that perform code multiplexing transmission.

By way of example, in the following, the number of first transmit antennas 107-1 is denoted by "$N_{T1}$," the number of second transmit antennas 107-2 is denoted by "$N_{T2}$," and the number of transmit antennas 107 which perform code multiplexing transmission is denoted by "$N_{Tx}$" ($=N_{T1}+N_{T2}$). Here, $N_{T1} \geq 1$, $N_{T2} \geq 1$, and $N_{Tx}$ ($=N_{T1}+N_{T2}$)$\geq 2$.

In addition, the number of code multiplexing is denoted by "$N_{CM}$". Although an example of $N_{CM}=N_{Tx}$ will be described with reference to FIG. 1, the present disclosure is not limited to the example, and the same code may also be transmitted (e.g., array transmission or beamforming transmission) for a set of a plurality of transmit antennas 107. In this case, $N_{CM} < N_{Tx}$.

For example, code generator 105 sets, as the codes for code multiplexing transmission, $N_{CM}$ orthogonal codes among $N_{allcode}$ (or $N_{allcode}(Loc)$) orthogonal codes included in code sequences with code length (in other words, the number of code elements) Loc (for example, mutually orthogonal code sequences (also simply referred to as codes or orthogonal codes)).

For example, number $N_{CM}$ of code multiplexing is less than number $N_{allcode}$ of orthogonal codes; that is, $N_{CM} < N_{allcode}$. In other words, code length Loc of the orthogonal codes is greater than number $N_{CM}$ of code multiplexing. For example, $N_{CM}$ orthogonal codes with code length Loc are represented as $Code_{ncm} = [OC_{ncm}(1), OC_{ncm}(2), \ldots, OC_{ncm}(Loc)]$. Here, "$OC_{ncm}(noc)$" represents the nocth code element in ncmth orthogonal code $Code_{ncm}$. The character "ncm" represents the index of an orthogonal code used for code multiplexing, and $ncm=1, \ldots, N_{CM}$. Further, the character "noc" is the index of a code element, and $noc=1, \ldots, Loc$.

Here, among $N_{allcode}$ orthogonal codes with code length Loc, ($N_{allcode} - N_{CM}$) orthogonal codes are not used in code generator 105 (in other words, they are not used for code multiplexing transmission). Hereafter, ($N_{allcode} - N_{CM}$) orthogonal codes not used in code generator 105 are referred to as "unused orthogonal codes". At least one of the unused orthogonal codes is used, for example, for aliasing determination of the Doppler frequency in aliasing determiner 212 of radar receiver 200 to be described later (a description of an example will be given below).

The use of the unused orthogonal code makes it possible for radar apparatus 10, for example, to receive signals code-multiplexed and transmitted from a plurality of transmit antennas 107, while inter-code interference is being prevented and such that the signals are demultiplexed individually, and also to expand the range where Doppler frequencies are detectable (an example will be described later).

As described above, Ncm orthogonal codes generated in code generator 105 are, for example, codes orthogonal to one another (in other words, uncorrelated codes). For example, a Walsh-Hadamard code may be used for the orthogonal code sequences. The code length of the Walsh-Hadamard code is a power of 2, and the number of orthogonal codes for each code length is the same as the code length. For example, the Walsh-Hadamard codes with a code length of 2, 4, 8, or 16 include 2, 4, 8, or 16 orthogonal codes, respectively.

In the following, by way of example, code length Loc of the orthogonal code sequences with Ncm codes may be set so as to satisfy following Expression 1:

(Expression 1)
$$Loc \geq 2^{ceil[\log_2(N_{CM}+1)]}. \quad [1]$$

Here, ceil[x] is an operator (ceiling function) that outputs the smallest integer greater than or equal to real number x. For the Walsh-Hadamard codes with code length Loc, the relation of $N_{allcode}(Loc)=Loc$ holds true. For example, since the Walsh-Hadamard codes with code length Loc=2, 4, 8, or 16 include 2, 4, 8, or 16 orthogonal codes respectively, $N_{allcode}(2)=2$, $N_{allcode}(4)=4$, $N_{allcode}(8)=8$, and $N_{allcode}(16)=16$ hold true. For example, code generator 105 may use $N_{CM}$ orthogonal codes among $N_{allcode}(Loc)$ codes included in the Walsh-Hadamard codes with code length Loc.

Here, a description will be given of the code length. For example, if acceleration is included in the moving speed of a target or radar apparatus 10, the longer the code length is, the more susceptible to inter-symbol interference the codes are. Further, candidates for the Doppler aliasing range for the below-described Doppler aliasing determination increase with increasing code length. Accordingly, with a plurality of Doppler frequency targets at the same distance index across different aliasing ranges, Doppler frequency indexes detected in the different aliasing ranges are more likely to overlap with each other. This can make it more difficult for radar apparatus 10 to appropriately determine aliasing.

For this reason, radar apparatus 10 may use a code with a shorter code length from the viewpoint of the performance and the arithmetic amount of the aliasing determination of aliasing determiner 212 of radar receiver 200 to be described later. By way of example, radar apparatus 10 may use an orthogonal code sequence having the shortest code length among code lengths Loc satisfying Expression 1.

Note that, when the Walsh-Hadamard codes with code length Loc include code $[OC_{ncm}(1), OC_{ncm}(2), \ldots, OC_{ncm}(Loc-1), and OC_{ncm}(Loc)]$ with code length Loc, the Walsh-Hadamard codes with code length Loc also include code $[OC_{ncm}(1), -OC_{ncm}(2), \ldots, OC_{ncm}(Loc-1), and -OC_{ncm}(Loc)]$ in which the odd-numbered code elements of the code are the same between the codes and the even-numbered code elements have signs inverted between the codes.

Note also that, even in a case of codes different from the Walsh-Hadamard codes with code length Loc, when code $[OC_{ncm}(1), OC_{ncm}(2), \ldots, OC_{ncm}(Loc-1), and OC_{ncm}(Loc)]$ with code length Loc is included, the code with code length Loc may be code $[OC_{ncm}(1), -OC_{ncm}(2), \ldots, OC_{ncm}(Loc-1), and -OC_{ncm}(Loc)]$ with the same odd-numbered code elements of the code and the even-numbered code elements with inverted signs, or may be code $[-OC_{ncm}(1), OC_{ncm}(2), \ldots, OC_{ncm}(Loc-1), and OC_{ncm}(Loc)]$ with the same even-numbered code elements of the code and the odd-numbered code elements with inverted signs.

When number ($N_{allcode} - N_{CM}$) of unused orthogonal codes is 2 or more, radar apparatus 10 may, for example, select codes such that the set of codes having the aforementioned relationship is not included in the unused orthogonal codes. For example, among the set of codes having the aforementioned relationship, one of the codes may be used for code multiplexing and the other code may be included in the unused orthogonal codes. Such selection of the unused orthogonal codes allows enhancement of the Doppler frequency aliasing determination accuracy of aliasing determiner 212 of radar receiver 200 to be described later (an example will be described later).

In addition, among the set of codes having the aforementioned relationship, one of the codes may be used, for example, for code multiplexing of radar transmission signals transmitted from first transmit antennas 107-1 (e.g., $ncm=1, \ldots, N_{T1}+1$), which is transmit antennas for the LR mode. The other code may be used for code multiplexing of radar transmission signals transmitted from second transmit antennas 107-2 (e.g., ncm=$N_{T1}+1$, $N_{Tx}$), which is transmit antennas for the SR mode. Such selection of the codes allows enhancement of the Doppler frequency aliasing determination accuracy of aliasing determiner 212 of radar receiver 200 to be described later (an example will be described later).

For example, when code [$OC_{ncm}(1)$, $OC_{ncm}(2)$, . . . , $OC_{ncm}(Loc-1)$, $OC_{ncm}(Loc)$] is used for the transmission signals transmitted from first transmit antennas 107-1, code [—$OC_{ncm}(1)$, $OC_{ncm}(2)$, . . . , $OC_{ncm}(Loc-1)$, $OC_{ncm}(Loc)$] may be used for the transmission signals transmitted from second transmit antennas 107-2. One of the reasons of such code selection is as follows.

In an embodiment of the present disclosure, a reception signal corresponding to the transmission signal transmitted from first transmit antenna 107-1 and a reception signal corresponding to the transmission signal transmitted from second transmit antenna 107-2 are possibly a multiplexed signal of reflected waves from targets in different distances from each other. In this case, the multiplexed signal (in other words, the code multiplexed signal) is outputted after being demultiplexed in code demultiplexer 213 to be described later, so that radar apparatus 10 receives either of the first radar transmission signal or the second radar transmission signal in some cases.

Herein, when a signal transmitted from first transmit antenna 107-1 is received and a signal transmitted from second transmit antenna 107-2 is not received, for example, the code used for the signal transmitted from second transmit antenna 107-2 can be considered the same as an unused orthogonal code. Similarly, when a signal transmitted from second transmit antenna 107-2 is received and a signal transmitted from first transmit antenna 107-1 is not received, the code used for the signal transmitted from first transmit antenna 107-1 can be considered the same as an unused orthogonal code.

Thus, it is possible to enhance the Doppler frequency aliasing determination accuracy of aliasing determiner 212 of radar receiver 200 to be described later, by dividing the set of codes having the aforementioned relationship into the code to be used for the transmission signal transmitted from first transmit antenna 107-1 (e.g., ncm=1, . . . , $N_{t1}$) for the LR mode and the code to be used for the transmission signal transmitted from second transmit antenna 107-2 (e.g., ncm=$N_{t1}+1$, . . . , $N_{tx}$) for the SR mode.

Next, a description will be given of an example of orthogonal codes for each number $N_{CM}$ of code multiplexing.

<Case of $N_{CM}=2$ or 3>

When $N_{CM}=2$ or 3, the Walsh-Hadamard codes with code length Loc=4, 8, 16, 32, and so forth may be applied, for example. In the case of one of these code lengths Loc, $N_{CM}<N_{allcode}(Loc)$. Further, a description will be given of a case of using the Walsh-Hadamard codes with the shortest code length (for example, Loc=4) among these code lengths Loc when number Ncm of code multiplexing=2 or 3.

For example, the Walsh-Hadamard codes with code length Loc are denoted by $WH_{Loc}(nwhc)$. Note that nwhc represents a code index of each code included in the Walsh-Hadamard codes with code length Loc, and nwhc is 1, . . . , Loc. For example, the Walsh-Hadamard codes with code length Loc=4 include orthogonal codes $WH_4(1)=[1, 1, 1, 1]$, $WH_4(2)=[1, -1, 1, -1]$, $WH_4(3)=[1, 1, -1, -1]$, and $WH_4(4)=[1, -1, -1, 1]$.

Here, among the Walsh-Hadamard codes with code length Loc=4, $WH_4(1)=[1, 1, 1, 1]$ and $WH_4(2)=[1, -1, 1, -1]$ are a set of codes including the odd-numbered code elements the same between the codes and the even-numbered code elements with signs inverted between the codes. Moreover, $WH_4(3)=[1, 1, -1, -1]$ and $WH_4(4)=[1, -1, -1, 1]$ are a set of codes having a relationship similar to the set of $WH_4(1)$ and $WH_4(2)$.

For example, when number ($N_{allcode}-N_{CM}$) of unused orthogonal codes is 2 or more, radar apparatus 10 may select codes such that the set of codes having the above-described relationship is not included in the unused orthogonal codes.

For example, in the case of number $N_{CM}$ of code multiplexing=2, code generator 105 determines two orthogonal codes among the Walsh-Hadamard codes with code length Loc=4 as the codes for code multiplexing transmission. In this case, number ($N_{allcode}-N_{CM}$) of unused orthogonal codes is 2.

For example, code generator 105 may select the codes for code multiplexing transmission such that the set of codes of $WH_4(1)$ and $WH_4(2)$ or the set of codes of $WH_4(3)$ and $WH_4(4)$ is not included in the unused orthogonal codes. For example, the combination of codes ($Code_1$ and $Code_2$) for code multiplexing transmission may be a combination of $Code_1=WH_4(1)$ (=[1, 1, 1, 1]) and $Code_2=WH_4(3)$ (=[1, 1, -1, -1]), a combination of $Code_1=WH_4(1)$ and $Code_2=WH_4(4)$, a combination of $Code_1=WH_4(2)$ and $Code_2=WH_4(3)$, or a combination of $Code_1=WH_4(2)$ and $Code_2=WH_4(4)$.

Further, in the case of number $N_{CM}$ of code multiplexing=2, for example, aliasing determiner 212 of radar receiver 200 may use, for the aliasing determination, at least one of two (=$N_{allcode}-N_{CM}$) unused orthogonal codes that are not used by code generator 105 (in other words, not used for code multiplexing transmission) among the $N_{allcode}=4$ Walsh-Hadamard codes with code length Loc=4 (an example will be described later).

Hereinbelow, among $N_{allcode}$ orthogonal codes with code length Loc, the unused orthogonal codes are represented as "$UnCode_{nuc}=[UOC_{nuc}(1), UOC_{nuc}(2), . . . , UOC_{nuc}(Loc)]$". Note that $UnCode_{nuc}$ represents the mucth unused orthogonal code. In addition, nuc represents the indexes of unused orthogonal codes, where nuc=1, . . . , ($N_{allcode}-N_{CM}$). Further, $UOC_{nuc}(noc)$ represents the nocth code element of mucth unused orthogonal code $UnCode_{nuc}$. In addition, noc represents the index of a code element, where noc=1, . . . , Loc.

For example, when number Ncm of code multiplexing=2 and the codes for code multiplexing transmission determined by code generator 105 are $Code_1=WH_4(1)$ (=[1, 1, 1, 1]) and $Code_2=WH_4(3)$ (=[1, 1, -1, -1]), the unused orthogonal codes are $UnCode_1=WH_4(2)$ (=[1, -1, 1, -1]) and $UnCode_2=WH_4(4)$ (=[1, -1, -1, 1]). Note that the combination of unused orthogonal codes ($UnCode_1$ and $UnCode_2$) is not limited to the combination of $WH_4(2)$ and $WH_4(4)$, and may be a combination of other codes.

Likewise, when number $N_{CM}$ of code multiplexing=3, code generator 105 determines three orthogonal codes among the Walsh-Hadamard codes with code length Loc=4 as the codes for code multiplexing transmission, for example. In this case, number ($N_{allcode}-N_{CM}$) of unused orthogonal codes is 1.

For example, code generator 105 may select $Code_1=WH_4(3)=[1, 1, -1, -1]$, $Code_2=WH_4(4)=[1, -1, -1, 1]$, and $Code_3=WH_4(2)=[1, -1, 1, -1]$.

Further, aliasing determiner 212 of radar receiver 200 uses, for the aliasing determination, one (=$N_{allcode}-N_{CM}$) unused orthogonal code among the $N_{allcode}=4$ Walsh-Hadamard codes with code length Loc=4 (an example will be described below). For example, when number Ncm of code multiplexing=3 and the codes for code multiplexing transmission determined by code generator 105 are $Code_1=WH_4(3)=[1, 1, -1, -1]$, $Code_2=WH_4(4)=[1, -1, -1, 1]$, and $Code_3=WH_4(2)=[1, -1, 1, -1]$, the unused orthogonal code is $UnCode_1=WH_4(1)=[1, 1, 1, 1]$. Note that the combination of the codes for code multiplexing transmission ($Code_1$, $Code_2$ and $Code_3$) and the unused orthogonal code ($UnCode_1$) is not limited to this example, and may be a combination of other codes.

<Case of $N_{CM}$=4, 5, 6, or 7>

In the case of $N_{CM}$=4, 5, 6, or 7, for example, the Walsh-Hadamard codes with code length Loc=8, 16, 32, and so forth may be applied. In the case of one of these code lengths Loc, $N_{CM}<N_{allcode}(Loc)$. Further, a description will be given of a case of using the Walsh-Hadamard codes with the shortest code length (for example, Loc=8) among these code lengths Loc, when number Ncm of code multiplexing=4, 5, 6, or 7.

For example, the Walsh-Hadamard codes with code length Loc=8 include the following eight orthogonal codes:

$$WH_8(1) = [1\ 1\ 1\ 1\ 1\ 1\ 1\ 1],$$
$$WH_8(2) = [1\ -1\ 1\ -1\ 1\ -1\ 1\ -1],$$
$$WH_8(3) = [1\ 1\ -1\ -1\ 1\ 1\ -1\ -1],$$
$$WH_8(4) = [1\ -1\ -1\ 1\ 1\ -1\ -1\ 1],$$
$$WH_8(5) = [1\ 1\ 1\ 1\ -1\ -1\ -1\ -1],$$
$$WH_8(6) = [1\ -1\ 1\ -1\ -1\ 1\ -1\ 1],$$
$$WH_8(7) = [1\ 1\ -1\ -1\ -1\ -1\ 1\ 1],$$
and
$$WH_8(8) = [1\ -1\ -1\ 1\ -1\ 1\ 1\ -1].$$

Here, among the Walsh-Hadamard codes with code length Loc=8, $WH_8(1)$ and $WH_8(2)$ are a set of codes including the odd-numbered code elements the same between the codes and the even-numbered code elements with signs inverted between the codes. Similarly, the set of $WH_8(3)$ and $WH_8(4)$, the set of $WH_8(5)$ and $WH_8(6)$, and, the set of $WH_8(7)$ and $WH_8(8)$ are sets of codes having the similar relationship to the set of $WH_8(1)$ and $WH_8(2)$.

When number $(N_{allcode}-N_{CM})$ of unused orthogonal codes is 2 or more, code generator 105 may select codes for code multiplexing transmission such that the unused orthogonal codes include none of the sets of codes having the aforementioned relationship. For example, the codes for code multiplexing transmission may be selected such that the unused orthogonal codes include none of the set of codes of $WH_8(1)$ and $WH_8(2)$, the set of codes of $WH_8(3)$ and $WH_8(4)$, the set of codes of $WH_8(5)$ and $WH_8(6)$, and the set of codes of $WH_8(7)$ and $WH_8(8)$.

For example, in the case of number Ncm of code multiplexing=4, code generator 105 determines four orthogonal codes among the Walsh-Hadamard codes with code length Loc=8 as the codes for code multiplexing transmission. In this case, number $(N_{allcode}-N_{CM})$ of unused orthogonal codes is 4.

For example, in code generator 105, the combination of the codes for code multiplexing transmission ($Code_1$, $Code_2$, $Code_3$, and $Code_4$) may be a combination of $Code_1=WH_8(1)$, $Code_2=WH_8(3)$, $Code_3=WH_8(5)$, and $Code_4=WH_8(7)$, or a combination of $Code_1=WH_8(1)$, $Code_2=WH_8(4)$, $Code_3=WH_8(5)$, and $Code_4=WH_8(8)$. Note that, the combination of the codes for code multiplexing transmission ($Code_1$, $Code_2$, $Code_3$, and $Code_4$) is not limited to these.

Further, in the case of number Ncm of code multiplexing=4, for example, aliasing determiner 212 of radar receiver 200 may use, for aliasing determination, a part or all of four $(=N_{allcode}-N_{CM})$ unused orthogonal codes that are not used by code generator 105 among the $N_{allcode}$=8 Walsh-Hadamard codes with code length Loc=8 (an example will be described later).

For example, when number $N_{CM}$ of code multiplexing=4 and the codes for code multiplexing transmission determined by code generator 105 are $Code_1=WH_8(1)$, $Code_2=WH_8(3)$, $Code_3=WH_8(5)$, and $Code_4=WH_8(7)$, the unused orthogonal codes are $UnCode_1=WH_8(2)$, $UnCode_2=WH_8(4)$, $UnCode_3=WH_8(6)$, and $UnCode_4=WH_8(8)$. Alternatively, for example, when number $N_{CM}$ of code multiplexing=4 and the codes for code multiplexing transmission determined by code generator 105 are $Code_1=WH_8(1)$, $Code_2=WH_8(4)$, $Code_3=WH_8(5)$, and $Code_4=WH_8(8)$, the unused orthogonal codes are $UnCode_1=WH_8(2)$, $UnCode_2=WH_8(3)$, $UnCode_3=WH_8(6)$, and $UnCode_4=WH_8(7)$.

Likewise, for example, in the case of number $N_{CM}$ of code multiplexing=5, code generator 105 determines five orthogonal codes among the Walsh-Hadamard codes with code length Loc=8 as the codes for code multiplexing transmission. In this case, number $(N_{allcode}-N_{CM})$ of unused orthogonal codes is 3.

For example, in code generator 105, the combination of the codes for code multiplexing transmission ($Code_1$, $Code_2$, $Code_3$, $Code_4$, and $Code_5$) may be a combination of $Code_1=WH_8(1)$, $Code_2=WH_8(3)$, $Code_3=WH_8(5)$, $Code_4=WH_8(7)$, and $Code_5=WH_8(8)$, or a combination of $Code_1=WH_8(1)$, $Code_2=WH_8(4)$, $Code_3=WH_8(5)$, $Code_4=WH_8(7)$, and $Code_5=WH_8(8)$. Note that the combination of the codes for code multiplexing transmission ($Code_1$, $Code_2$, $Code_3$, $Code_4$, and $Code_5$) is not limited to these.

Further, in the case of number Ncm of code multiplexing=5, for example, aliasing determiner 212 of radar receiver 200 may use, for aliasing determination, a part or all of three $(=N_{allcode}-N_{CM})$ unused orthogonal codes that are not used by code generator 105 among the $N_{allcode}$=8 Walsh-Hadamard codes with code length Loc=8 (an example will be described later).

For example, when number $N_{CM}$ of code multiplexing=5 and the codes for code multiplexing transmission determined by code generator 105 are $Code_1=WH_8(1)$, $Code_2=WH_8(3)$, $Code_3=WH_8(5)$, $Code_4=WH_8(7)$, and $Code_5=WH_8(8)$, the unused orthogonal codes are $UnCode_1=WH_8(2)$, $UnCode_2=WH_8(4)$, and $UnCode_3=WH_8(6)$. As another example, when number $N_{CM}$ of code multiplexing=5 and the codes for code multiplexing transmission determined by code generator 105 are $Code_1=WH_8(1)$, $Code_2=WH_8(4)$, $Code_3=WH_8(5)$, $Code_4=WH_8(7)$, and $Code_5=WH_8(8)$, the unused orthogonal codes are $UnCode_1=WH_8(2)$, $UnCode_2=WH_8(3)$, and $UnCode_3=WH_8(6)$.

Likewise, for example, in the case of number $N_{CM}$ of code multiplexing=6, code generator 105 determines six orthogonal codes among the Walsh-Hadamard codes with code length Loc=8 as the codes for code multiplexing transmission. In this case, number $(N_{allcode}-N_{CM})$ of unused orthogonal codes is 2.

For example, in code generator 105, the combination of the codes for code multiplexing transmission ($Code_1$, $Code_2$, $Code_3$, $Code_4$, $Code_5$, and $Code_6$) may, for example, be $Code_1=WH_8(1)$, $Code_2=WH_8(2)$, $Code_3=WH_8(3)$, $Code_4=WH_8(4)$, $Code_5=WH_8(5)$, and $Code_6=WH_8(8)$. Note that the combination of the codes for code multiplexing transmission ($Code_1$, $Code_2$, $Code_3$, $Code_4$, $Code_5$, and $Code_6$) is not limited to these.

Further, in the case of number $N_{CM}$ of code multiplexing=6, for example, aliasing determiner 212 of radar receiver 200 may use, for aliasing determination, a part or all of two (=$N_{allcode}-N_{CM}$) unused orthogonal codes that are not used by code generator 105 among the $N_{allcode}=8$ Walsh-Hadamard codes with code length Loc=8 (an example will be described later).

For example, when number Ncm of code multiplexing=6 and the codes for code multiplexing transmission determined by code generator 105 are $Code_1=WH_8(1)$, $Code_2=WH_8(2)$, $Code_3=WH_8(3)$, $Code_4=WH_8(4)$, $Code_5=WH_8(5)$, and $Code_6=WH_8(8)$, the unused orthogonal codes are $UnCode_1=WH_8(6)$ and $UnCode_2=WH_8(7)$.

Likewise, for example, in the case of number $N_{CM}$ of code multiplexing=7, code generator 105 determines seven orthogonal codes among the Walsh-Hadamard codes with code length Loc=8 as the codes for code multiplexing transmission. In this case, number ($N_{allcode}-N_{CM}$) of unused orthogonal codes is 1.

For example, code generator 105 may select $Code_1=WH_8(1)$, $Code_2=WH_8(2)$, $Code_3=WH_8(3)$, $Code_4=WH_8(4)$, $Code_5=WH_8(5)$, $Code_6=WH_8(6)$, and $Code_7=WH_8(7)$ as the codes for code multiplexing transmission. Note that the combination of the codes for code multiplexing transmission is not limited to this.

Further, aliasing determiner 212 of radar receiver 200 may use, for aliasing determination, one (=$N_{allcode}-N_{CM}$) unused orthogonal code that is not used by code generator 105 among the $N_{allcode}=8$ Walsh-Hadamard codes with code length Loc=8 (an example will be described later).

For example, when number $N_{CM}$ of code multiplexing=7 and the codes for code multiplexing transmission determined by code generator 105 are $Code_1=WH_8(1)$, $Code_2=WH_8(2)$, $Code_3=WH_8(3)$, $Code_4=WH_8(4)$, $Code_5=WH_8(5)$, $Code_6=WH_8(6)$, and $Code_7=WH_8(7)$, the unused orthogonal code is $UnCode_1=WH(8)$.

The cases of number $N_{CM}$ of code multiplexing=4, 5, 6, and 7 have been described. Note that also when number Ncm of code multiplexing=8 or more, radar apparatus 10 may determine the codes for code multiplexing transmission and the unused orthogonal codes in the same manner as in the cases of number Ncm of code multiplexing=2 to 7.

For example, code generator 105 may select, as the codes for code multiplexing transmission, Ncm orthogonal codes among the Walsh-Hadamard codes with code length Loc given by Expression 2:

(Expression 2)

$$Loc = 2^{ceil[\log_2(N_{CM}+1)]}. \quad [2]$$

In this case, $N_{CM} < Loc = N_{allcode}$.

Further, aliasing determiner 212 of radar receiver 200 may use, for the aliasing determination, ($N_{allcode}-N_{CM}$) unused orthogonal codes among the $N_{allcode}$=Loc Walsh-Hadamard codes with code length Loc (an example will be described below). In addition, when number ($N_{allcode}-N_{CM}$) of unused orthogonal codes is 2 or more, code generator 105 may select codes for code multiplexing transmission, for example, among the Walsh-Hadamard codes with code length Loc, such that the unused orthogonal codes include no sets of codes in which either the odd-numbered code elements or the even-numbered code elements are the same between the codes, and the other code elements have signs inverted between the codes.

In other words, the unused orthogonal codes may include one code in the set of codes, among the Walsh-Hadamard codes with code length Loc, in which either the odd-numbered code elements or the even-numbered code elements are the same between the codes and the other code elements have signs inverted between the codes, and may not include the other code.

Note that the elements constituting the orthogonal code sequence are not limited to real numbers, and may include a complex value.

Note also that the codes may also be other orthogonal codes different from the Walsh-Hadamard codes. For example, the codes may be orthogonal M-sequence codes or pseudo-orthogonal codes.

An example of the orthogonal codes in each case of number $N_{CM}$ of code multiplexing has been described above.

Next, exemplary phase rotation amounts based on the codes for code multiplexing transmission generated in code generator 105 will be described.

For example, radar apparatus 10 performs code multiplexing transmission using different orthogonal codes for respective transmit antennas Tx #1 to Tx #$N_{Tx}$ that perform the code multiplexing transmission. For example, code generator 105 sets phase rotation amount $\psi_{ncm}(m)$ based on orthogonal code $Code_{ncm}$ that is to be applied to ncmth transmit antenna Tx #ncm at mth transmission period Tr, and outputs phase rotation amount $\psi_{ncm}(m)$ to phase rotator 106. Here, ncm=1, ..., $N_{CM}$.

For example, with phase rotation amount $\psi_{ncm}(m)$, a phase amount corresponding to each of Loc code elements $OC_{ncm}(1), \ldots, OC_{ncm}(Loc)$ of orthogonal code $Code_{ncm}$ is cyclically applied per Loc (code length) transmission periods as given by following Expression 3:

(Expression 3)

$$\psi_{ncm}(m) = \text{angle}[OC_{ncm}(OC\_INDEX)]. \quad [3]$$

Here, "angle(x)" is an operator outputting the radian phase of real number x, and angle(1)=0, angle(−1)=π, angle (j)=π/2, and angle(−j)=π/2. The character "j" is an imaginary unit. OC_INDEX represents an orthogonal code element index indicating an element of orthogonal code sequence $Code_{ncm}$, and cyclically varies in the range of from 1 to Loc per transmission period (Tr), as given by following Expression 4:

[4]

$$OC\_INDEX = \text{mod}(m-1, Loc) + 1 \ldots . \quad \text{(Expression 4)}$$

Here, mod(x, y) is a modulo operator and is a function that outputs the remainder after x is divided by y. Further, m=1, ..., Nc. Nc denotes a predetermined number of transmission periods used by radar apparatus 10 for radar positioning (hereinafter referred to as "radar-transmission-signal transmission times"). Further, radar apparatus 10, for example, performs radar-transmission-signal transmission times Nc of transmission, where Nc is an integer multiple of Loc (e.g., Loc multiplied by a factor of Ncode). For example, Nc=Loc×Ncode.

Further, code generator 105 outputs, per transmission period (Tr), orthogonal code element index OC_INDEX to output switcher 209 of radar receiver 200.

Phase rotator 106 includes, for example, phase shifters or phase modulators corresponding respectively to $N_{Tx}$ transmit antennas 107. For example, phase rotator 106 applies phase rotation amount $\psi_{ncm}(m)$ inputted from code generator 105 to chirp signals inputted from first radar-transmission-signal generator 101-1 and second radar-transmission-signal generator 101-2 per transmission period Tr.

For example, phase rotator 106 applies phase rotation amount $\psi_{ncm}(m)$ to the chirp signals inputted from first radar-transmission-signal generator 101-1 and second radar-transmission-signal generator 101-2 per transmission period Tr. Phase rotation amount $\psi_{ncm}(m)$ is based on orthogonal code $Code_{ncm}$ and is applied to ncmth transmit antenna Tx #ncm. Here, ncm=1, ..., $N_{CM}$ and m=1, ..., Nc.

Outputs from phase rotator 106 to $N_{Tx}$ transmit antennas 107 are amplified to predetermined transmission power, for example, and then radiated into space from $N_{Tx}$ transmit antennas 107 (e.g., transmit array antenna).

An exemplary case of code multiplexing transmission will be described. In this case, number $N_{CM}$ of code multiplexing is 3 using number $N_{T1}=1$ of first transmit antenna 107-1 and number $N_{T2}=2$ of second transmit antennas 107-2 (number $N_{Tx}$ of transmit antennas=$N_{T1}+N_{T2}=3$). Note that, number $N_{Tx}$ of transmit antennas and number $N_{CM}$ of code multiplexing are not limited to these values.

For example, phase rotation amounts $\psi_1(m)$, $\psi_2(m)$, and $\psi_3(m)$ are outputted from code generator 105 to phase rotator 106 per mth transmission period Tr.

First (ncm=1) phase rotator 106 (in other words, a phase shifter corresponding to first transmit antenna 107-1 (for example, Tx #1)) applies, per transmission period Tr, phase rotation to the chirp signal generated in first radar-transmission-signal generator 101-1 per transmission period Tr as given by following Expression 5:

[5]

$$\exp[j\psi_1(1)]cp_1(t), \exp[j\psi_1(2)]cp_1(t),$$
$$\exp[j\psi_1(3)]cp_1(t), \ldots, \exp[j\psi_1(Nc)]cp_1(t) \ldots .$$
(Expression 5)

The output of first phase rotator 106 is transmitted from first transmit antenna 107-1 (Tx #1). Here, $cp_1(t)$ represents the chirp signal per transmission period Tr outputted from first radar-transmission-signal generator 101-1.

Likewise, second (ncm=2) phase rotator 106 applies, per transmission period Tr, phase rotation to the chirp signal generated in second radar-transmission-signal generator 101-2 per transmission period Tr as given by following Expression 6:

[6]

$$\exp[j\psi_2(1)]cp_2(t), \exp[j\psi_2(2)]cp_2(t),$$
$$\exp[j\psi_2(3)]cp_2(t), \ldots, \exp[j\psi_2(Nc)]cp_2(t) \ldots .$$
(Expression 6)

The output of second phase rotator 106 is transmitted from second transmit antenna 107-2 (e.g., Tx #2). Here, $cp_2(t)$ represents the chirp signal per transmission period Tr outputted from second radar-transmission-signal generator 101-2.

Likewise, third (ncm=3) phase rotator 106 applies, per transmission period Tr, phase rotation to the chirp signal generated in second radar-transmission-signal generator 101-2 per transmission period Tr as given by following Expression 7:

[7]

$$\exp[j\psi_3(1)]cp_2(t), \exp[j\psi_3(2)]cp_2(t),$$
$$\exp[j\psi_3(3)]cp_2(t), \ldots, \exp[j\psi_3(Nc)]cp_2(t) \ldots .$$
(Expression 7)

The output of third phase rotator 106 is transmitted from second transmit antenna 107-2 (e.g., Tx #3).

Note that, when performing radar positioning continuously, radar apparatus 10 may set a code used as orthogonal code $Code_{ncm}$ variably for each radar positioning (for example, per Nc transmission periods (Nc×Tr)).

Further, radar apparatus 10 may, for example, variably set transmit antennas 107 that transmit the outputs of $N_{Tx}$ phase rotators 106 (in other words, transmit antennas 107 corresponding respectively to the outputs of phase rotators 106). For example, association between the plurality of transmit antennas 107 and the code sequences for code multiplexing transmission may be different for each radar positioning in radar apparatus 10. For example, when radar apparatus 10 receives a signal under the influence of interference by another radar different for each transmit antenna 107, the code multiplexed signal outputted from transmit antenna 107 per radar positioning is changed, so that a randomization effect on the influence of interference can be obtained.

The exemplary configuration of radar transmitter 100 has been described above.

[Configuration of Radar Receiver 200]

In FIG. 1, radar receiver 200 includes Na receive antennas 202 (e.g., also represented as Rx #1 to Rx #Na) and forms an array antenna. Further, radar receiver 200 includes Na antenna system processors 201-1 to 201-Na, Constant False Alarm Rate (CFAR) section 211, aliasing determiner 212, code demultiplexer 213, distance shifter 214, and direction estimator 215.

Each of receive antennas 202 receives a reflected wave signal that is a radar transmission signal reflected by a reflecting object including a target of radar positioning, and outputs, as a reception signal, the received reflected wave signal to corresponding one of antenna system processors 201.

Each of antenna system processors 201 includes reception radio 203 and signal processor 206.

Figure 4:
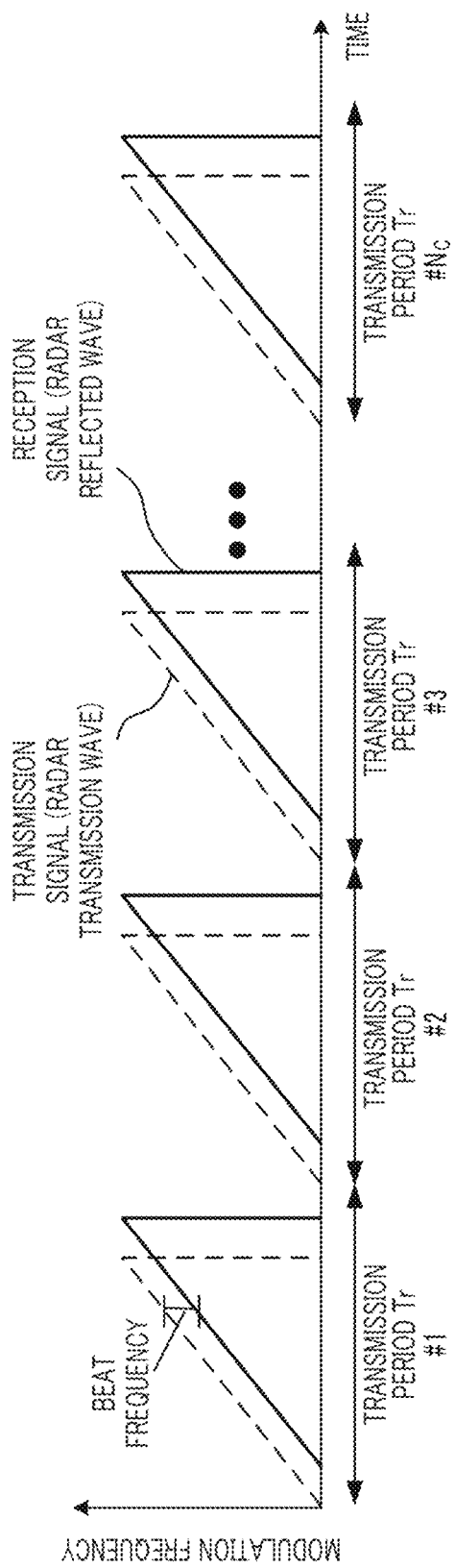
FIG. 4 illustrates examples of a transmission signal and a reflected wave signal in a case of using a chirp pulse according to Embodiment 1.

Reception radio 203 includes mixer 204 and low pass filter (LPF) 205. Mixer 204 mixes, for example, the received reflected wave signal with a chirp signal that is the radar transmission signal inputted from second radar-transmission-signal generator 101-2. In other words, mixer 204 down-mixes the reflected wave signal using the chirp signal for the SR mode. LPF 205 performs LPF processing on an output signal from mixer 204 to output a beat signal representing a frequency of the reflected wave signal depending on a delay time. For example, as illustrated in FIG. 4, the difference frequency between the frequency of a transmission chirp signal (transmission frequency-modulated wave)

and the frequency of a reception chirp signal (reception frequency-modulated wave) is obtained as the beat frequency (in other words, beat signal).

In each antenna system processor 201-z (where z is any of 1 to Na), signal processor 206 includes analog-to-digital (AD) converter 207, beat frequency analyzer 208, output switcher 209, and Doppler analyzers 210.

In signal processor 206, AD converter 207 converts the signal outputted from LPF 205 (e.g., the beat signal) into discretely sampled data, for example.

Beat frequency analyzer 208 performs, per transmission period Tr, Fast Fourier Transform (FFT) processing on $N_{data}$ pieces of discretely sampled data obtained in a defined time range (range gate), for example. Signal processor 206 thus outputs frequency spectra in which a peak appears at a beat frequency depending on the delay time of the reflected wave signal (radar reflected wave). Note that, as the FFT processing, beat frequency analyzer 208 may perform multiplication by a window function coefficient such as a Han window or a Hamming window, for example. Radar apparatus 10 can suppress side lobes around the beat frequency peak by using the window function coefficient. Further, when the number of $N_{data}$ pieces of discretely sampled data is not a power of 2, beat frequency analyzer 208 may, for example, include zero-padded data to obtain the FFT size of a power of 2 to perform FFT processing. In this case, the arrival delay of the radar reflected wave corresponding to each beat frequency index (e.g., a single FFT bin) obtained by the FFT processing is represented by 1/Bw, which corresponds to $C_0$/(2 Bw) converting into distance. Here, Bw denotes a frequency-modulation bandwidth of the chirp signal within the range gate, and $C_0$ denotes the speed of light.

[Detection methods for Beat Frequency]

Hereinafter, exemplary detection methods for beat frequency in radar apparatus 10 (radar receiver 200) will be described.

Note that, for example, when mixer 204 has a quadrature mixer configuration, an I signal component (In-phase component) and a Q signal component (Quadrature-phase component) are obtained as outputs of mixer 204. Hereinafter, descriptions will be given of, for example, a detection method for beat frequency using the I signal component (in other words, a distance detection method) and a detection method for beat frequency using both of the I signal component and the Q signal component (in other words, a distance detection method).

<Detection Method for Beat Frequency Using I signal Component>

For example, descriptions will be given of a case where $N_{data}$ pieces of discretely sampled data (also referred to as AD sampled data) is included in time range of range gate $T_{RG}$ (e.g., a case of AD sampling frequency $f_{sa}=N_{data}/T_{RG}$).

In this case, the highest beat frequency detectable in the FFT processing of beat frequency analyzer 208 based on the sampling theorem without aliasing, which is denoted by $f_{mb}$, is represented, for example, as given by following Expression 8:

[8]

$$f_{mb} = \frac{N_{data}}{2T_{RG}} = \frac{f_{sa}}{2} \ldots \quad \text{(Expression 8)}$$

Figure 5:
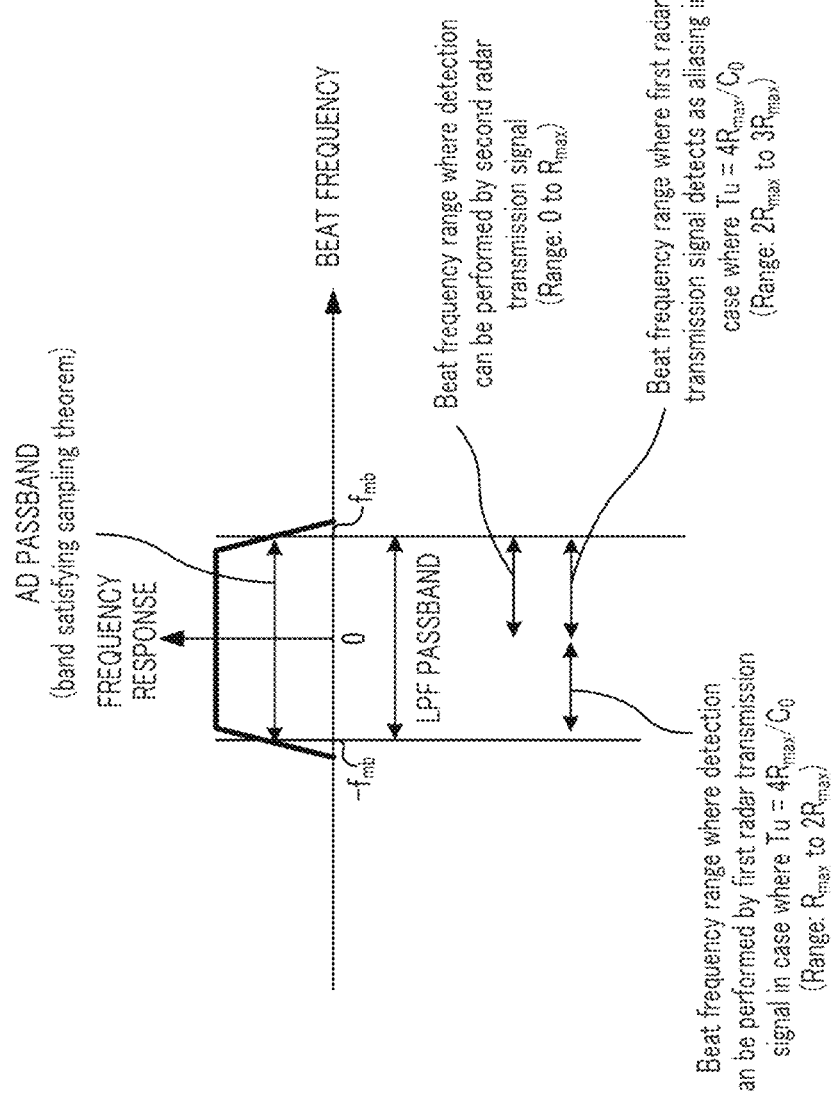
FIG. 5 illustrates an example of a beat frequency range where detection is possible according to Embodiment 1.

FIG. 5 illustrates an example of a beat frequency range where radar apparatus 10 can perform detection.

Herein, cutoff frequency $f_{LPF}$ of LPF 205 may be set to about $f_{mb}$, for example. This setting enables radar apparatus 10 to detect a target existing within a distance range represented by "0 to $R_{max}=C_0N_{data}/(4\text{ Bw})$" which corresponds to a reception beat frequency range of from 0 to $f_{mb}$, by a reception beat signal for a radar transmission signal generated in second radar-transmission-signal generator 101-2 (e.g., also referred to as the second radar transmission signal or the second radar transmission wave), as illustrated in FIG. 5, for example. Here, Bw denotes a frequency-modulation bandwidth of the chirp signal within the range gate, and $C_0$ denotes the speed of light.

Meanwhile, a reception beat signal for a radar transmission signal generated in first radar-transmission-signal generator 101-1 (e.g., also referred to as the first radar transmission signal or the first radar transmission wave) is transmitted applying transmission delay time Tu to the second radar transmission signal (e.g., a chirp signal). That is, the reception beat signal is transmitted at an earlier timing. Thus, with reference to the transmission timing of the second radar transmission signal (e.g., the chirp signal), for example, when a target exists in a distance corresponding to transmission delay time Tu, the reception beat signal for the first radar transmission signal (e.g., a chirp signal) is detected as a beat signal of a Doppler frequency zero component (i.e., beat frequency=0) in radar receiver 200.

For example, the setting of passband characteristics of LPF 205 (e.g., cutoff frequency $f_{LPF}=f_{mb}$) described above allows to detect a beat signal in a range of time delay Tu±ΔT, which is before and after the transmission delay time Tu, with respect to the first radar transmission signal (e.g., the chirp signal). Here, $\Delta T=N_{data}/2/\text{Bw}$.

By way of example, when the transmission delay time Tu is set to $4R_{max}/C_0$, which is time corresponding to $2R_{max}$, the reception beat signal for the first radar transmission signal is detectable in a range of $R_{max}$, that is, a range of from $R_{max}$ to $2R_{max}$. For example, the reception beat signal for the first radar transmission signal enables radar apparatus 10 to detect a target existing within a distance range of from $R_{max}$ to $2R_{max}$ in a reception beat frequency range of from $-f_{mb}$ to 0, as illustrated in FIG. 5. For example, a distance range where detection with the LR mode is possible can be expanded up to twice as large as a distance range where detection with the SR mode is possible, in FIG. 5.

Note that the value of Tu is not limited to the above, and may include another value. For example, Tu may be set in accordance with a detection area (in other words, a distance range) expected in radar apparatus 10.

Further, aliasing (hereinafter, referred to as "range aliasing") possibly occurs in beat frequency analyzer 208 when a target expected in radar apparatus 10 is detected in a distance range exceeding a distance corresponding to transmission delay time Tu. In FIG. 5 (e.g., Tu=$4R_{max}/C_0$), a beat frequency index obtained when a target exists in a distance range of from $R_{max}$ to $2R_{max}$ is identical to a beat frequency index obtained when a target exists in a distance range of from $3R_{max}$ to $2R_{max}$, for example. This makes it difficult to distinguish the distance of the target in radar apparatus 10 in some cases.

According to the relationship of "Expression 10+Expression 11=$4 \times R_{max}$" (those expressions will be given later), for example, a beat frequency index corresponding to a distance of $4R_{max}-r$ is identical to a beat frequency index corresponding to distance "r" that is a target distance when the target exists in the distance range of from $R_{max}$ to $2R_{max}$. As one of the methods for solving such an ambiguity caused by the range aliasing, radar apparatus 10 may, for example, periodically set transmission delay time Tu so as to vary for each measurement (in other words, each positioning). Alternatively, radar apparatus 10 may, for example, variably set inclination of frequency transition of a chirp signal, or a sampling rate in the AD conversion. These methods enable to prevent the ambiguity caused by the range aliasing (an example will be described later).

Note that a distance detection range by the reception beat signal for the first radar transmission signal and a distance detection range by the reception beat signal for the second radar transmission signal may be configured so as to partly overlap with each other.

Figure 6:
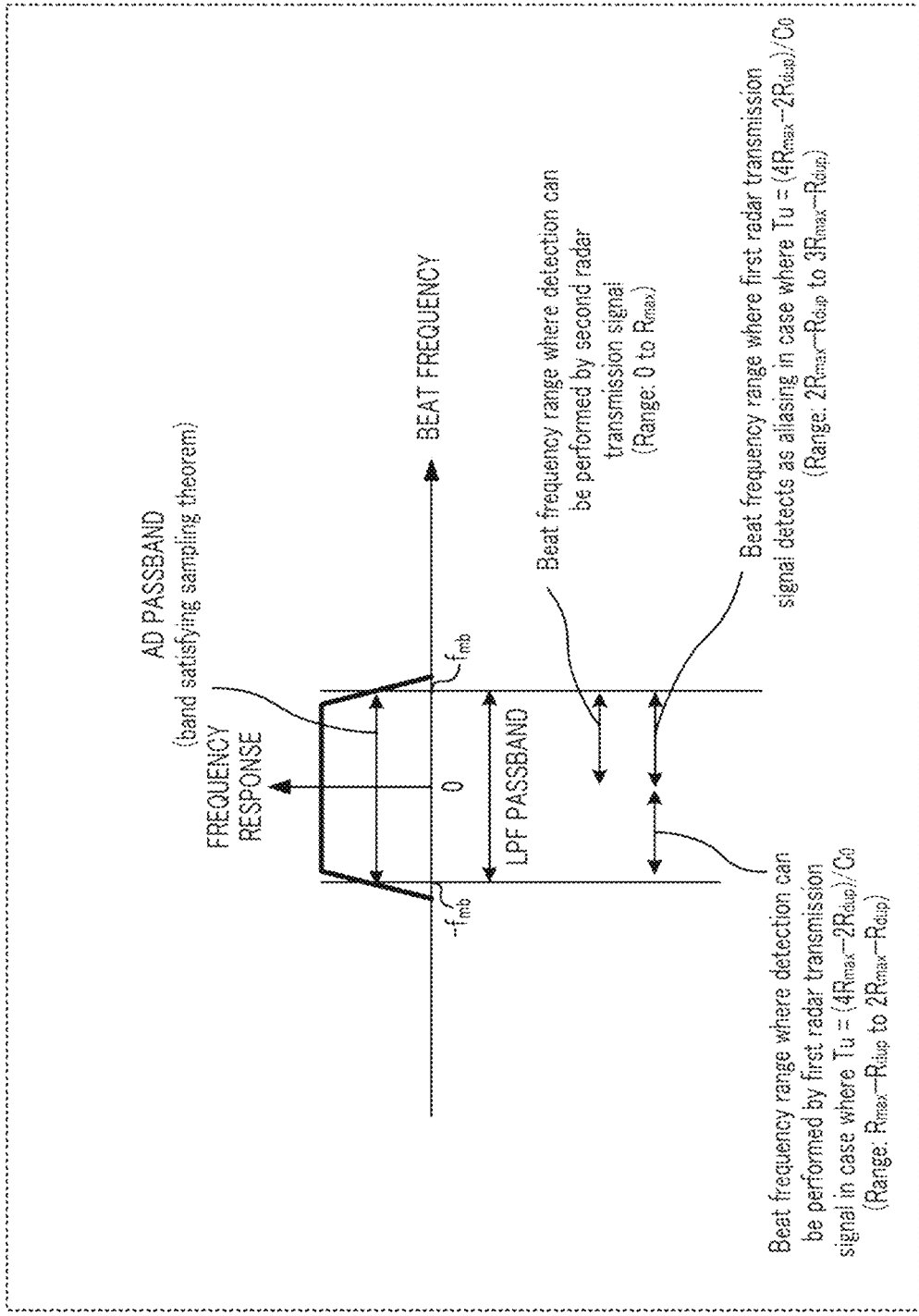
FIG. 6 illustrates another example of a beat frequency range where detection is possible according to Embodiment 1.

FIG. 6 illustrates an example of a beat frequency range where radar apparatus 10 can perform detection when distance detection ranges corresponding to the first radar transmission signal and the second radar transmission signal partly overlap with each other.

For example, when the overlapped range (i.e., length) is represented by $R_{dup}$, transmission delay time Tu may be set to the time corresponding to $(2R_{max}-R_{dup})$, that is, Tu= $(4R_{max}-2R_{dup})/C_0$. This setting allows radar apparatus 10, for example, to detect the reception beat signal for the first radar transmission signal in the range of from $(R_{max}-R_{dup})$ to $(2R_{max}-R_{dup})$, as illustrated in FIG. 6. Note that $R_{dup}$ may be set in a range of $0<R_{dup}\leq R_{max}$, for example, in order for the distance detection ranges to be partly overlapped.

Further, the range aliasing possibly occurs in beat frequency analyzer 208 when a target expected in radar apparatus 10 is detected in a distance range exceeding a distance corresponding to transmission delay time Tu. In FIG. 6 (e.g., Tu=$(4R_{max}-2R_{dup})/C_0$), a beat frequency index obtained when a target exists in a range of from $(R_{max}-R_{dup})$ to $(2R_{max}-R_{dup})$ is identical to a beat frequency index obtained when a target exists in a range of from $(3R_{max}-R_{dup})$ to $(2R_{max}-R_{dup})$, for example. This makes it difficult to distinguish the distance of the target in radar apparatus 10 in some cases.

According to the relationship of "Expression 10+Expression 11=$4R_{max}-2R_{dup}$" (those expressions will be given later), for example, a beat frequency index corresponding to a distance of $(4R_{max}-2R_{dup}-r)$ is identical to a beat frequency index corresponding to distance "r" that is a target distance when the target exists in the distance range of from $(R_{max}-R_{dup})$ to $(2R_{max}-R_{dup})$. As one of the methods for solving such an ambiguity caused by the range aliasing, radar apparatus 10 may, for example, periodically set transmission delay time Tu so as to vary for each measurement as described above. Alternatively, radar apparatus 10 may, for example, variably set inclination of frequency transition of a chirp signal, or a sampling rate in the AD conversion, as described above. These methods enable to prevent the ambiguity caused by the range aliasing (an example will be described later).

Next, a case where the value of transmission delay time Tu is variably set for each measurement will be described as an example of a method for solving the ambiguity caused by the range aliasing.

Although $Tu_1$ and $Tu_2$ ($Tu_1 \#Tu_2$) will be used as examples of transmission delay times different from each other, transmission delay time Tu is not limited to these, and may include three or more transmission delay times.

Transmission signal generation controller 104, for example, may alternately set $Tu_1$ and $Tu_2$ for each measurement period. For example, when the distance corresponding to $Tu_1$ is represented by $X_0$[m], the distance corresponding to $Tu_2$ may be set to be shifted by X[m] from $X_0$ (for example, $X_0$+X[m]). In this case, for example, the following range aliasing determination processing may be performed in positioning output section 300. For example, positioning output section 300 may compare the target detection result using $Tu_1$ (e.g., may include direction estimation information $D_{target}$, range information $R_{target}$, or Doppler velocity information $V_{target}$ of the target, to be outputted from direction estimator 215) with the target detection result using $Tu_2$.

For example, a beat frequency index corresponding to the target distance detected using $Tu_1$ in a certain measurement period is, taking the range aliasing into account, possibly either a beat frequency index corresponding to distance r when the target exists in a range of from $(R_{max}-R_{dup})$ to $(2R_{max}-R_{dup})$, or a beat frequency index corresponding to the distance of $4R_{max}-2R_{dup}-r$.

When the target distance is detected using $Tu_2$ in the next measurement period in radar apparatus 10, the target in the distance correctly measured is detectable in a moving range within an expected speed.

The target in the distance incorrectly measured is detectable, however, in a range of 2X[m] added to the moving range of the expected speed. Here, X[m] represents a variable distance corresponding to the time in which Tu changes from $Tu_1$ to $Tu_2$. In this case, the target is possibly detected at the moving speed exceeding the expected speed in radar apparatus 10. Thus, positioning output section 300, for example, can distinguish between the target in the distance correctly detected and the target in the distance incorrectly measured. This enables radar apparatus 10 to expand the distance range where detection with the LR mode is possible up to three times as large as the distance range where detection with the SR mode is possible, for example, taking the aliasing into account. For example, positioning output section 300 may remove the target in the distance incorrectly detected. Positioning output section 300, for example, may output the target detection result excluding the detection result corresponding to the target distance incorrectly detected, to an advanced driver assistance system or a monitoring system for monitoring around the mobile body during automatic driving, for example.

Note that, although descriptions have been given of the case where the distance detection ranges corresponding to the first radar transmission signal and the second radar transmission signal partly overlap with each other, the present disclosure is not limited thereto, and transmission delay time Tu may be set in the same manner when the distance detection ranges corresponding to the first radar transmission signal and the second radar transmission signal do not overlap with each other.

Similarly, radar apparatus 10 may variably set a frequency sweep width of a chirp signal for each measurement, or may also variably set a sampling rate of AD converter 207 for each measurement. In other words, the frequency sweep width of the chirp signal or the sampling rate in AD conversion may vary for each positioning. The aliasing range varies in these cases as well, and thus positioning output section 300 may distinguish between the target in the distance correctly measured and the target in the distance incorrectly detected, and remove the detection result of the target in the distance incorrectly detected.

For example, when the inclination of the frequency transition of the chirp signal is variably set, transmission signal generation controller 104 may alternately set the frequency sweep width $Bw_1$ and $Bw_2$ ($Bw_1 \#Bw_2$) for each measurement period. The change in the frequency sweep width Bw causes $R_{max}$ to vary (from $R_{max}=C_0 N_{data}/(4\ Bw)$). This brings a similar effect to that in the case of variable transmission delay time Tu, even with the constant transmission delay time Tu. Positioning output section 300 may thus remove the detection result of the target in the distance incorrectly detected. Further, positioning output section 300, for example, may output, by performing range aliasing determination processing, the target detection result excluding the detection result corresponding to the target detected at the moving speed exceeding the expected speed, to an advanced driver assistance system or a monitoring system for monitoring around the mobile body during automatic driving, for example.

Further, when the sampling rate of AD converter 207 is variably set, for example, an AD sampling rate controller (not illustrated) may alternately set the sampling rate $fsa_1$ and $fsa_2$ of AD converter 207 for each measurement period. The change in the sampling rate varies number $N_{data}$ of discretely sampled data (also referred to as AD sampled data) within time range of range gate $T_{RG}$, and $R_{max}$ varies accordingly (from $R_{max}=C_0N_{data}/(4\ Bw)$). This brings the similar effect to that in the case of variable transmission delay time Tu, even with the constant transmission delay time Tu. Positioning output section 300 may thus remove the detection result of the target in the distance incorrectly detected. Further, positioning output section 300, for example, may output, by performing range aliasing determination processing, the target detection result excluding the detection result corresponding to the target detected at the moving speed exceeding the expected speed, to an advanced driver assistance system or a monitoring system for monitoring around the mobile body during automatic driving, for example.

Note that, although descriptions have been given, as examples, of the case of alternately setting frequency sweep widths $Bw_1$ and $Bw_2$ or sampling rates $fsa_1$ and $fsa_2$, the values of frequency sweep width Bw and sampling rate $f_{sa}$ are not limited to 2 types, and may include 3 types or more.

<Detection Method for Beat Frequency Using I signal Component and Q signal Component>

When mixer 204 has a quadrature mixer configuration, an I signal component and a Q signal component are obtained as outputs of mixer 204. For example, an LPF is applied to each I signal component or each Q signal component, and AD conversion is applied to the outputs, so that the output of I signal component from AD converter 207, and the output of Q signal component from AD converter 207 are obtained.

Figure 7:
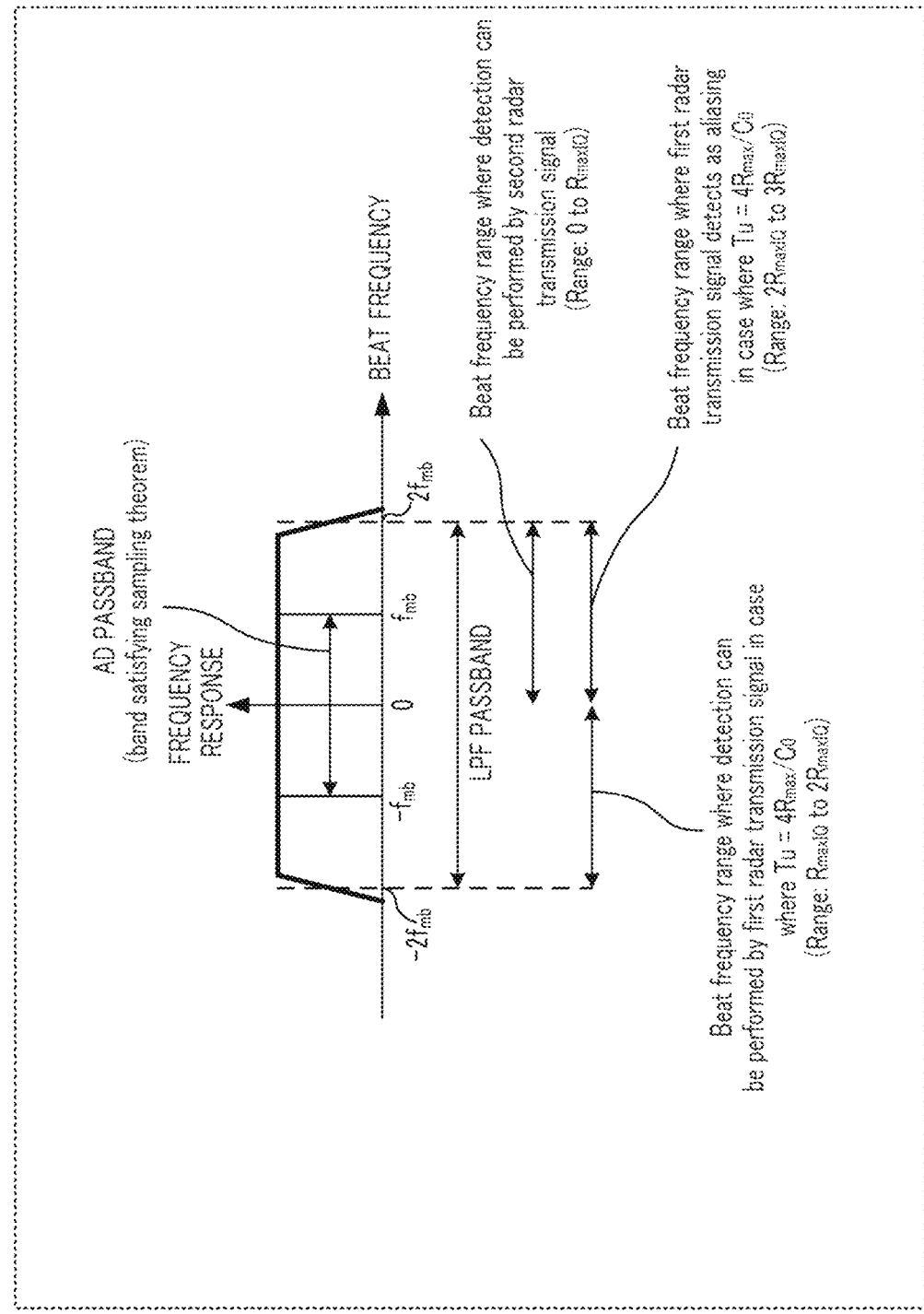
FIG. 7 illustrates still another example of a beat frequency range where detection is possible according to Embodiment 1.

FIG. 7 illustrates an example of a beat frequency range where radar apparatus 10 can perform detection.

When mixer 204 has the quadrature mixer configuration, cutoff frequency $f_{LPF}$ of LPF 205 may be set to about $2f_{mb}$, for example. With this setting, beat frequency corresponding to range aliasing in a range of from $f_{mb}$ to 2fmb is detected as a negative beat frequency, as illustrated in FIG. 7, for example, so that radar apparatus 10 can expand a distance range where radar apparatus 10 can perform detection, and the relationship of $R_{maxIQ}=2\ R_{max}$ holds true, for example.

Radar apparatus 10, for example, can detect a target existing within a distance range represented by "0 to $R_{maxIQ}=C_0N_{data}/(2\ Bw)$" which corresponds to a reception beat frequency range of from 0 to $2f_{mb}$, by a reception beat signal for the second radar transmission signal, as illustrated in FIG. 7. Here, Bw denotes a frequency-modulation bandwidth of the chirp signal within the range gate, and $C_0$ denotes the speed of light.

Meanwhile, a reception beat signal for the first radar transmission signal is transmitted applying transmission delay time Tu to the second radar transmission signal. That is, the reception beat signal is transmitted at an earlier timing. Thus, with reference to the transmission timing of the second radar transmission signal, for example, when a target exists in a distance corresponding to transmission delay time Tu, the reception beat signal for the first radar transmission signal is detected as a beat signal of a Doppler frequency zero component (i.e., beat frequency=0) in radar receiver 200.

For example, the setting of passband characteristics of LPF 205 (e.g., cutoff frequency $f_{LPF}=2f_{mb}$) described above allows to detect a beat signal in a range of time delay $Tu\pm\Delta T_{IQ}$, which is before and after the transmission delay time Tu, with respect to the first radar transmission signal. Here, $\Delta T_{IQ}=N_{data}/Bw$.

By way of example, when the transmission delay time Tu is set to $4R_{maxIQ}/C_0$, which is time corresponding to $2R_{maxIQ}$, the reception beat signal for the first radar transmission signal is detectable in a range of $R_{maxIQ}$, that is, a range of from $R_{maxIQ}$ to $2R_{maxIQ}$. For example, the reception beat signal for the first radar transmission signal enables radar apparatus 10 to detect a target existing within the distance range of from $R_{maxIQ}$ to $2R_{maxIQ}$ in a reception beat frequency range of from $-2f_{mb}$ to 0, as illustrated in FIG. 7. For example, a distance range where detection with the LR mode is possible can be expanded up to twice as large as a distance range where detection with the SR mode is possible, in FIG. 7.

Note that the value of Tu is not limited to the above, and may include another value. For example, Tu may be set in accordance with a detection area (in other words, a distance range detected by the first radar transmission signal) expected for the LR mode in radar apparatus 10.

Further, range aliasing possibly occurs in beat frequency analyzer 208 when a target expected in radar apparatus 10 is detected in a distance range exceeding a distance corresponding to transmission delay time Tu. In FIG. 7 (e.g., $Tu=4R_{maxIQ}/C_0$), a beat frequency index obtained when a target exists in a distance range of from $R_{maxIQ}$ to $2R_{maxIQ}$ is identical to a beat frequency index obtained when a target exists in a distance range of from $2R_{maxIQ}$ to $3R_{maxIQ}$, for example. This makes it difficult to distinguish the distance of the target in radar apparatus 10 in some cases.

For example, a beat frequency index corresponding to a distance of $r+R_{maxIQ}$ is identical to a beat frequency index corresponding to distance "r" that is a target distance when the target exists in the distance range of from $R_{maxIQ}$ to $2R_{maxIQ}$. As one of the methods for solving such an ambiguity caused by the range aliasing, radar apparatus 10 may, for example, periodically set transmission delay time Tu so as to vary for each measurement. Alternatively, radar apparatus 10 may, for example, variably set inclination of frequency transition of a chirp signal, or a sampling rate in the AD conversion. These methods enable to prevent the ambiguity caused by the range aliasing (an example will be described later).

Note that a distance detection range by the reception beat signal for the first radar transmission signal and a distance detection range by the reception beat signal for the second radar transmission signal may be configured so as to partly overlap with each other.

Figure 8:
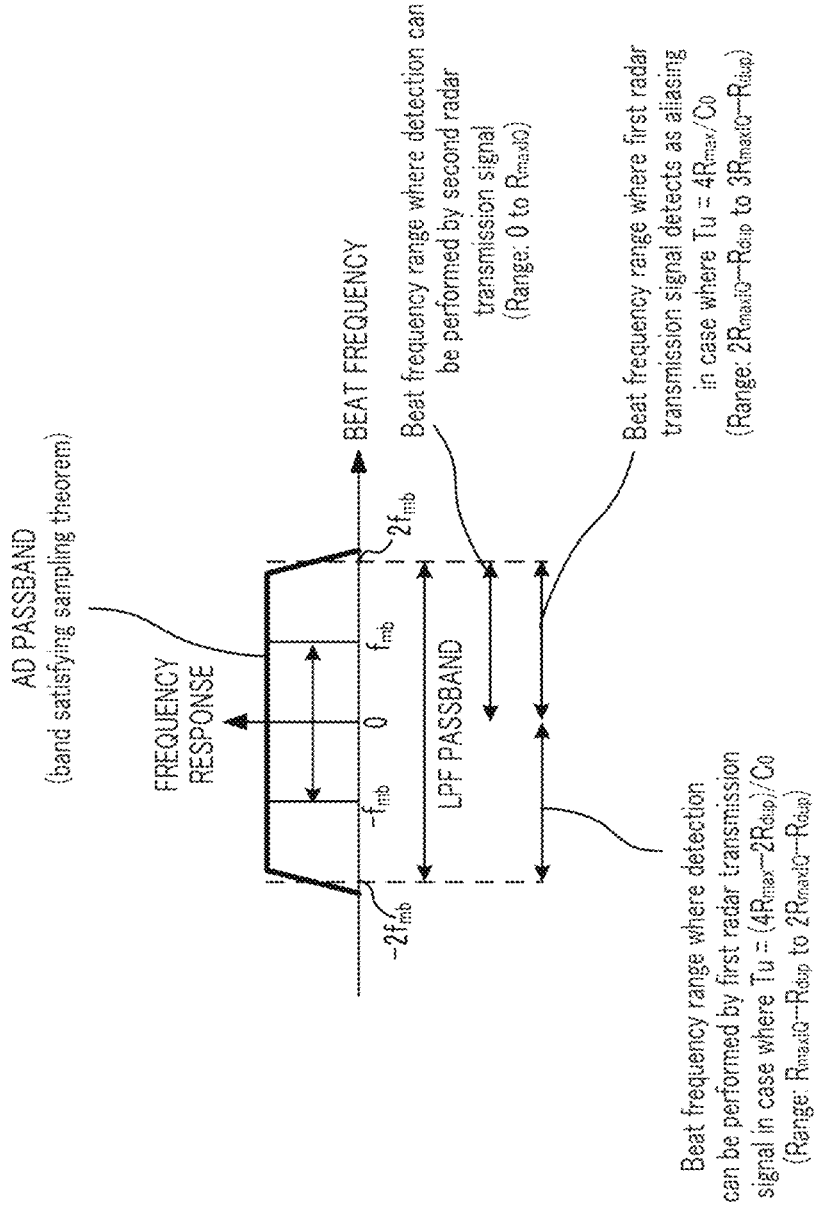
FIG. 8 illustrates still another example of a beat frequency range where detection is possible according to Embodiment 1.

FIG. 8 illustrates an example of a beat frequency range where radar apparatus 10 can perform detection when distance detection ranges corresponding to the first radar transmission signal and the second radar transmission signal partly overlap with each other.

For example, when the overlapped range (i.e., length) is represented by $R_{dup}$, transmission delay time Tu may be set to the time corresponding to $(2R_{maxIQ}-R_{dup})$, that is, Tu=

$(4R_{maxIQ} - 2R_{dup})/C_0$. This setting allows radar apparatus 10, for example, to detect the reception beat signal for the first radar transmission signal in the range of from $(R_{maxIQ}-R_{dup})$ to $(2R_{maxIQ}-R_{dup})$, as illustrated in FIG. 8. Note that $R_{dup}$ may be set in a range of $0<R_{dup}\leq R_{maxIQ}$, for example, in order for the distance detection ranges to be partly overlapped.

Further, the range aliasing possibly occurs in beat frequency analyzer 208 when a target expected in radar apparatus 10 is detected in a distance range exceeding a distance corresponding to transmission delay time Tu. In FIG. 8 (e.g., $Tu=(4R_{maxIQ} - 2R_{dup})/C_0$), a beat frequency index obtained when a target exists in a range of from $(R_{maxIQ}-R_{dup})$ to $(2R_{maxIQ}-R_{dup})$ is identical to a beat frequency index obtained when a target exists in a range of from $(2R_{maxIQ}-R_{dup})$ to $(3R_{maxIQ}-R_{dup})$, for example. This makes it difficult to distinguish the distance of the target in radar apparatus 10 in some cases.

For example, a beat frequency index corresponding to a distance of $(r+R_{maxIQ})$ is identical to a beat frequency index corresponding to distance "r" that is a target distance when the target exists in the distance range of from $(R_{maxIQ}-R_{dup})$ to $(2R_{maxIQ}-R_{dup})$ Herein, in the case of $R_{dup}=R_{maxIQ}$, for example, transmission delay timing Tu may be set to $2R_{maxIQ}/C_0$. In this case, the reception beat signal for the first radar transmission signal can be detected in a distance range of from 0 to $R_{maxIQ}$. The reception beat signal for the second radar transmission signal is also detected in the distance range of from 0 to $R_{maxIQ}$, and is possibly detected as a beat frequency index identical to that of the reception beat signal for the first radar transmission signal. For example, when an expected target is detected in a distance range exceeding $R_{maxIQ}$, the target in the distance range of from $R_{maxIQ}$ to $2R_{maxIQ}$ is possibly detected in beat frequency analyzer 208 with range aliasing.

As one of the methods for solving such an ambiguity caused by the range aliasing, radar apparatus 10 may, for example, periodically set transmission delay time Tu so as to vary for each measurement as described above. Alternatively, radar apparatus 10 may, for example, variably set inclination of frequency transition of a chirp signal, or a sampling rate in the AD conversion, as described above. These methods enable to prevent the ambiguity caused by the range aliasing (an example will be described later).

Next, a case where the value of transmission delay time Tu is variably set for each measurement will be described as an example of a method for solving the ambiguity caused by the range aliasing.

Although $Tu_1$ and $Tu_2$ ($Tu_1+Tu_2$) will be used as examples of transmission delay times different from each other, transmission delay time Tu is not limited to these, and may include three or more transmission delay times.

Transmission signal generation controller 104, for example, may alternately set $Tu_1$ and $Tu_2$ for each measurement period. For example, when the distance corresponding to $Tu_1$ is represented by $X_0[m]$, the distance corresponding to $Tu_2$ may be set to be shifted by $X[m]$ from $X_0$ (for example, $X_0+X[m]$). In this case, for example, the following range aliasing determination processing may be performed in positioning output section 300. For example, positioning output section 300 may compare the target detection result using $Tu_1$ (e.g., may include direction estimation information $D_{target}$, range information $R_{target}$, or Doppler velocity information $V_{target}$ of the target, to be outputted from direction estimator 215) with the target detection result using $Tu_2$.

For example, a beat frequency index corresponding to the target distance detected using $Tu_1$ in a certain measurement period is, taking the range aliasing into account, possibly either a beat frequency index corresponding to distance r when the target exists in a range of from $(R_{maxIQ}-R_{dup})$ to $(2R_{maxIQ}-R_{dup})$, or a beat frequency index corresponding to the distance of $(r+R_{maxIQ})$.

When the target distance is detected using $Tu_2$ in the next measurement period in radar apparatus 10, the target in the distance correctly measured is detectable in a moving range within an expected speed.

The target in the distance incorrectly measured is detectable, however, in a range of 2X[m] added to the moving range of the expected speed. Here, X[m] represents a variable distance corresponding to the time in which Tu changes from $Tu_1$ to $Tu_2$. In this case, the target is possibly detected at the moving speed exceeding the expected speed in radar apparatus 10. Thus, positioning output section 300, for example, can distinguish between the target in the distance correctly detected and the target in the distance incorrectly measured. This enables radar apparatus 10 to expand, taking the aliasing into account, the distance range where detection with the LR mode is possible up to three times as large as the distance range where detection with the SR mode is possible, for example. Positioning output section 300, for example, may output the target detection result excluding the detection result corresponding to the target distance incorrectly detected, to an advanced driver assistance system or a monitoring system for monitoring around the mobile body during automatic driving, for example.

Note that, although descriptions have been given of the case where the distance detection ranges corresponding to the first radar transmission signal and the second radar transmission signal partly overlap with each other, the present disclosure is not limited thereto, and transmission delay time Tu may be set in the same manner when the distance detection ranges corresponding to the first radar transmission signal and the second radar transmission signal do not overlap with each other.

Similarly, radar apparatus 10 may variably set a frequency sweep width of a chirp signal for each measurement, or may also variably set a sampling rate of AD converter 207 for each measurement. In other words, the frequency sweep width of the chirp signal or the sampling rate in AD conversion may vary for each positioning. The aliasing range varies in these cases as well, and thus positioning output section 300 may distinguish between the target in the distance correctly measured and the target in the distance incorrectly detected, and remove the detection result of the target in the distance incorrectly detected.

For example, when the inclination of the frequency transition of the chirp signal is variably set, transmission signal generation controller 104 may alternately set frequency sweep widths $Bw_1$ and $Bw_2$ ($Bw_1/Bw_2$) for each measurement period. The change in frequency sweep width Bw causes $R_{maxIQ}$ to vary. Note that $R_{maxIQ}=C_0N_{data}/(2\text{ }Bw)$. This brings a similar effect to that in the case of variable transmission delay time Tu, even with the constant transmission delay time Tu. Positioning output section 300 may thus remove the detection result of the target in the distance incorrectly detected. Further, positioning output section 300, for example, may output, by performing range aliasing determination processing, the target detection result excluding the detection result corresponding to the target detected at the moving speed exceeding the expected speed, to an advanced driver assistance system or a monitoring system for monitoring around the mobile body during automatic driving, for example.

Further, when the sampling rate of AD converter 207 is variably set, for example, an AD sampling rate controller (not illustrated) may alternately set the sampling rate $fsa_1$ and $fsa_2$ of AD converter 207 for each measurement period. The change in the sampling rate varies number $N_{data}$ of discretely sampled data (also referred to as AD sampled data) within time range of range gate $T_{RG}$, and $R_{maxIQ}$ varies accordingly. Note that $R_{maxIQ} = C_0 N_{data}/(2\,Bw)$. This brings the similar effect to that in the case of variable transmission delay time Tu, even with the constant transmission delay time Tu. Positioning output section 300 may thus remove the detection result of the target in the distance incorrectly detected. Further, positioning output section 300, for example, may output, by performing range aliasing determination processing, the target detection result excluding the detection result corresponding to the target detected at the moving speed exceeding the expected speed, to an advanced driver assistance system or a monitoring system for monitoring around the mobile body during automatic driving, for example.

Note that, although descriptions have been given, as examples, of the case of alternately setting frequency sweep widths $Bw_1$ and $Bw_2$ or sampling rates $fsa_1$ and $fsa_2$, the values of frequency sweep widths Bw and sampling rates $f_{sa}$ are not limited to 2 types, and may include 3 types or more.

Exemplary detection methods for beat frequency have been described above.

Here, a beat frequency response obtained by the mth chirp pulse transmission, which is outputted from beat frequency analyzer 208 in zth signal processor 206, is represented by $RFT_z(f_b, m)$. Here, $f_b$ denotes the beat frequency index and corresponds to an FFT index (bin number). For example, $f_b = 0, \ldots, N_{data}/2$, $z = 0, \ldots, Na$, and $m = 1, \ldots, Nc$. A beat frequency having smaller beat frequency index $f_b$ indicates that the delay time of a reflected wave signal is shorter (in other words, the distance to the target is shorter).

In addition, beat frequency index $f_b$ may be converted into distance information using following Expressions 9, 10, and 11:

[9]
$$R_2(f_b) = \frac{C_o}{2B_w} f_b \ldots ; \quad \text{(Expression 9)}$$

[10]
$$R_1(f_b) = \frac{C_o T_u}{2} - \frac{C_o}{2B_w} f_b \ldots ; \quad \text{(Expression 10)}$$

[11]
$$R_{1alias}(f_b) = \frac{C_o}{2B_w} f_b + \frac{C_o T_u}{2} \ldots . \quad \text{(Expression 11)}$$

In the following, beat frequency index $f_b$ is also referred to as "distance index $f_b$."

Here, Bw denotes a frequency-modulation bandwidth of the chirp signal within the range gate, and $C_0$ denotes the speed of light.

Expression 9 is a conversion expression for converting a beat frequency detected by the second radar transmission signal into the distance information $R_2(f_b)$, for example. Expression 10 is a conversion expression for converting a beat frequency detected by the first radar transmission signal into the distance information $R_1(f_b)$ when the beat frequency is in a range without aliasing, for example. Expression 11 is a conversion expression for converting a beat frequency detected by the first radar transmission signal into the distance information $R_{1alias}(f_b)$ when the beat frequency is in a range with aliasing, for example.

Note that, when converting the beat frequency into the distance information, radar apparatus 10, for example, may first perform demultiplexing processing on reception signals corresponding to signals multiplexed and transmitted simultaneously, and then convert into the distance information following Expressions 9, 10, and 11, depending on whether the beat frequency is detected by the first radar transmission signal or the second radar transmission signal.

Additionally, radar apparatus 10 may set a distance conversion value of transmission delay time Tu (e.g., $C_0Tu/2$) to an integer multiple of a distance bin interval (or distance resolution) (e.g., $C_0/2Bw$). This enables to integrally represent the conversion expressions into the distance information.

Further, radar apparatus 10 may set the distance conversion value of transmission delay time Tu (e.g., $C_0Tu/2$) to an integer multiple of the distance bin interval (or distance resolution) (e.g., $C_0/2Bw$), when the distance ranges where detection can be performed using the respective reception beat signals for the first radar transmission signal and the second radar transmission signal are configured to be partly overlapped with each other (e.g., FIG. 6 or 8), for example. This enables radar apparatus 10 to perform direction estimation processing using the reception beat signal for the first radar transmission signal and the reception beat signal for the second radar transmission signal, for example.

Hereinafter, descriptions will be given of a case of setting distance conversion value $C_0Tu/2$ of transmission delay time Tu to integer multiple $N_{LR}$ of a distance bin interval (or distance resolution) $C_0/2Bw$, as an example. That is, $C_0Tu/2 = N_{LR}$ ($C_0/2Bw$). In this case, the conversion expression from the beat frequency into the distance information may be represented, for example, as in following Expressions 12 and 13:

[12]
$$R_1(f_b) = \frac{c_o T_u}{2} - \frac{c_o}{2B_w} f_b = \quad \text{(Expression 12)}$$
$$\frac{c_o}{2B_w}(N_{LR} - f_b) = R_2(N_{LR} - f_b) = R_2(f_{bLR}),$$
$$f_{bLR} = N_{LR} - f_b \ldots ;$$

[13]
$$R_{1alias}(f_b) = \frac{c_o}{2B_w} f_b + \frac{c_o T_u}{2} = \quad \text{(Expression 13)}$$
$$\frac{c_o}{(2B_w)}(f_b + N_{LR}) = R_2(f_b + N_{LR}) = R_2(f_{bLR}),$$
$$f_{bLR} = f_b + N_{LR} \ldots .$$

As represented in Expressions 12 and 13, with conversion from beat frequency index $f_b$ into beat frequency index $f_{bLR}$ for the LR mode, for example, the conversion expressions from the beat frequency into the distance information may be integrally represented by conversion expression $R_2(f_{bLR})$ for converting the beat frequency detected by the second radar transmission signal into the distance information.

Note that, when mixer 204 has the quadrature mixer configuration, a signal detected as a negative beat frequency (e.g., $f_b = -N_{data}/2, \ldots, -1$) among the beat frequencies detected by the second radar transmission signal, can be regarded as range aliasing of a positive beat frequency ($f_b=N_{data}/2, \ldots, N_{data}-1$). Therefore, $f_b=0, \ldots, N_{data}-1$, in the following. In this case, beat frequency index $f_b$ may be converted into the distance information according to following Expressions 14, 15, and 16:

[14]
$$R_2(f_b) = \frac{c_o}{2B_w} f_b \ldots ; \quad \text{(Expression 14)}$$

[15]
$$R_1(f_b) = \frac{c_o}{2B_w}\left(f_b - \frac{Ndata}{2}\right) + \frac{c_o T_u}{2} \ldots ; \quad \text{(Expression 15)}$$

[16]
$$R_{1alias}(f_b) = \frac{c_o}{2B_w} f_b + \frac{c_o T_u}{2} \ldots . \quad \text{(Expression 16)}$$

Further, when distance conversion value $C_0Tu/2$ of transmission delay time Tu is set to integral multiple $N_{LR}$ of a distance bin interval (or distance resolution) $C_0/2Bw$ (e.g., $C_0Tu/2=N_{LR}$ ($C_0/2Bw$)), for example, the conversion expression from the beat frequency into the distance information may be represented, for example, as in following Expressions 17 and 18:

[17]
$$R_1(f_b) = \frac{c_o}{2B_w}\left(f_b - \frac{Ndata}{2}\right) + \frac{c_o T_u}{2} = \quad \text{(Expression 17)}$$
$$\frac{c_o}{2B_w}\left(f_b - \frac{Ndata}{2} + N_{LR}\right) = R_2(f_{bLR}),$$
$$f_{bLR} = f_b - \frac{Ndata}{2} + N_{LR} \ldots ;$$

[18]
$$R_{1alias}(f_b) = \frac{c_o}{2B_w} f_b + \frac{c_o T_u}{2} = \quad \text{(Expression 18)}$$
$$\frac{c_o}{2B_w}(f_b + N_{LR}) = R_2(f_b + N_{LR}) = R_2(f_{bLR}),$$
$$f_{bLR} = f_b + N_{LR} \ldots .$$

As represented in Expressions 17 and 18, with conversion from beat frequency index $f_b$ into beat frequency index $f_{bLR}$ for the LR mode, for example, the conversion expression from the beat frequency into the distance information may be integrally represented by the conversion expression $R_2(f_{bLR})$ for converting the beat frequency detected by the second radar transmission signal into the distance information.

Exemplary operations of beat frequency analyzer 208 have been described above.

Based on orthogonal code element index OC_INDEX outputted from code generator 105, output switcher 209 selectively switches to OC_INDEXth Doppler analyzer 210 among Loc Doppler analyzers 210 and outputs the output of beat frequency analyzer 208 per transmission period to the OC_INDEXth Doppler analyzer. In other words, output switcher 209 selects OC_INDEXth Doppler analyzer 210 in mth transmission period Tr.

Signal processor 206 includes Loc Doppler analyzers 210-1 to 210-Loc. For example, data is inputted by output switcher 209 to nocth Doppler analyzer 210 per Loc transmission periods (Loc×Tr). Accordingly, nocth Doppler analyzer 210 performs Doppler analysis for each distance index $f_b$ using data in Ncode transmission periods among Nc transmission periods (for example, using beat frequency response $RFT_z(f_b, m)$ outputted from beat frequency analyzer 208). Here, noc denotes the index of a code element, and $noc=1, \ldots, Loc$.

For example, when Ncode is a power of 2, FFT processing may be applied in the Doppler analysis. In this case, the FFT size is Ncode, and a maximum Doppler frequency that is derived from the sampling theorem and does not cause aliasing is $\pm 1/(2Loc \times Tr)$. Further, the Doppler frequency interval for Doppler frequency index $f_s$ is $1/(Ncode \times Loc \times Tr)$, and the range of Doppler frequency index $f_s$ is $f_s=-Ncode/2, \ldots, 0, \ldots, Ncode/2-1$.

For example, outputs $VFT_z^{noc}(f_b, f_s)$ of Doppler analyzers 210 of zth signal processor 206 are given by following Expression 19:

[19]
$$VFT_z^{noc}(f_b, f_s) = \sum_{s=0}^{N_{code}-1} RFT_z(f_b, L_{OC} \times s + noc)\exp\left[-j\frac{2\pi s f_s}{N_{code}}\right] \ldots . \quad \text{(Expression 19)}$$

Here, j is the imaginary unit and z=1 to Na.

Further, when Ncode is not a power of 2, zero-padded data may, for example, be included to obtain the data size (FFT size) of a power of 2 to perform FFT processing. For example, when the FFT size in Doppler analyzer 210 for the case where the zero-padded data is included is denoted by $N_{codewzero}$, outputs $VFT_z^{noc}(f_b, f_s)$ of Doppler analyzers 210 in zth signal processor 206 are given by following Expression 20:

[20]
$$VFT_z^{noc}(f_b, f_s) = \sum_{s=0}^{N_{codewzero}-1} RFT_z \quad \text{(Expression 20)}$$
$$(f_b, L_{OC} \times s + noc)\exp\left[-j\frac{2\pi s f_s}{N_{codewzero}}\right] \ldots .$$

Here, noc denotes the index of a code element, and $noc=1, \ldots, Loc$. In addition, the FFT size is $N_{codewzero}$, and the maximum Doppler frequency that is derived from the sampling theorem and does not cause aliasing is $+1/(2Loc \times Tr)$. Further, the Doppler frequency interval for Doppler frequency index $f_s$ is $1/(N_{codewzero} \times Loc \times Tr)$, and the range of Doppler frequency index $f_s$ is $f_s=-N_{codewzero}/2, \ldots, 0, \ldots, N_{codewzero}/2-1$.

The following description will be given of a case where Ncode is a power of 2, as an example. When zero-padding is used in Doppler analyzer 210, it is possible to apply the following description similarly and obtain similar effects with replacement of Ncode with $N_{codewzero}$ in the description.

In addition, in the FFT processing, Doppler analyzer 210 may perform multiplication by a window function coefficient such as the Han window or the Hamming window, for example. Radar apparatus 10 can suppress side lobes generated around the beat frequency peak by applying the window function.

The processing of each component of signal processor 206 has been described above.

In FIG. 1, CFAR section 211 performs CFAR processing (in other words, adaptive threshold determination) using the outputs of Loc Doppler analyzers 210 in each of the first to Nath signal processors 206 and extracts distance index $f_{b\_cfar}$ and Doppler frequency index $f_{s\_cfar}$ that provide a peak signal.

For example, CFAR section 211 performs two-dimensional CFAR processing with the distance axis and the Doppler frequency axis (corresponding to the relative velocity) or CFAR processing that is a combination of one-dimensional CFAR processing operations by power addition of outputs $VFT_z^{noc}(f_b, f_s)$ of Doppler analyzers 210 in first to Nath signal processors 206, for example, as given by following Expression 21:

[21]

$$PowerFT(f_b, f_s) = \sum_{z=1}^{N_a} \sum_{noc=1}^{L_{oc}} |VFT_z^{noc}(f_b, f_s)|^2 \ldots \quad \text{(Expression 21)}$$

For example, processing disclosed in NPL 5 may be applied as the two-dimensional CFAR processing or the CFAR processing that is a combination of one-dimensional CFAR processing operations.

CFAR section 211 adaptively sets a threshold and outputs to aliasing determiner 212, distance index $f_{b\_cfar}$, Doppler frequency index $f_{s\_cfar}$, and received-power information $PowerFT(f_{b\_cfar}, f_{s\_cfar})$ that provides received power greater than the threshold.

Next, an operation example of aliasing determiner 212 illustrated in FIG. 1 will be described.

Aliasing determiner 212 performs aliasing determination of Doppler components $VFT_z^{noc}(f_{b\_cfar}, f_{s\_cfar})$, which are the outputs of Doppler analyzers 210, for example, based on distance indexes $f_{b\_cfar}$ and Doppler frequency indexes $f_{s\_cfar}$ extracted in CFAR section 211. Here, $z=1, \ldots, Na$, and $noc=1, \ldots, Loc$.

Aliasing determiner 212 may perform Doppler aliasing determination processing, for example, on the assumption that the Doppler range for a target is $+1/(2 \times Tr)$.

Here, since Doppler analyzer 210 applies the FFT processing to each code element, for example, when Ncode is a power value of 2, the Doppler analyzer performs the FFT processing per $(Loc \times Tr)$ periods using the output from beat frequency analyzer 208. Thus, the Doppler range in which the sampling theorem does not cause aliasing in Doppler analyzer 210 is $+1/(2Loc \times Tr)$.

Accordingly, the Doppler range for the target assumed in aliasing determiner 212 is wider than the Doppler range in which no aliasing is caused in Doppler analyzer 210. For example, aliasing determiner 212 performs aliasing determination processing assuming Doppler range $\#1/(2 \times Tr)$ that is Loc times greater than Doppler range$\pm 1/(2Loc \times Tr)$ in which no aliasing is caused in Doppler analyzer 210.

Hereinafter, an example of the aliasing determination processing of aliasing determiner 212 will be described.

Here, by way of example, a description will be given of a case where number $N_{CM}$ of code multiplexing=3, and code generator 105 uses three orthogonal codes $Code_1 = WH_4(3) = [1, 1, -1, -1]$, $Code_2 = WH_4(4) = [1, -1, -1, 1]$, and $Code_3 = WH_4(2) = [1, -1, 1, -1]$ among the Walsh-Hadamard codes with code length Loc=4.

For example, aliasing determiner 212 uses, for the aliasing determination, one $(=N_{allcode} - N_{CM})$ unused orthogonal code among the $N_{allcode} = 4$ Walsh-Hadamard codes with code length Loc=4. For example, when number $N_{CM}$ of code multiplexing=3 and the codes for code multiplexing transmission determined by code generator 105 are $Code_1 = WH_4(3) = [1, 1, -1, -1]$, $Code_2 = WH_4(4) = [1, -1, -1, 1]$, and $Code_3 = WH_4(2) = [1, -1, 1, -1]$, the unused orthogonal code is $UnCode_1 = WH_4(1) = [1, 1, 1, 1]$.

For example, since Doppler analyzers 210 apply FFT processing to each code element as described above when radar apparatus 10 performs code multiplexing transmission using orthogonal codes with code length Loc=4, the FFT processing is performed using the output from beat frequency analyzer 208 per $(Loc \times Tr) = (4 \times Tr)$ periods. Thus, the Doppler range in which the sampling theorem does not cause aliasing in Doppler analyzer 210 is $+1/(2Loc \times Tr) = +1/(8 \times Tr)$.

Aliasing determiner 212 may perform the determination of aliasing in the range greater by a factor of code length Loc of the orthogonal code sequences, for example, than the range of the Doppler analysis in Doppler analyzers 210 (Doppler range). For example, aliasing determiner 212 performs the aliasing determination processing on the assumption of the Doppler range=$\pm 1/(2 \times Tr)$ which is 4 (=Loc) times greater than the Doppler range$\pm 1/(8 \times Tr)$ in which no aliasing is caused in Doppler analyzer 210.

Figure 9A:
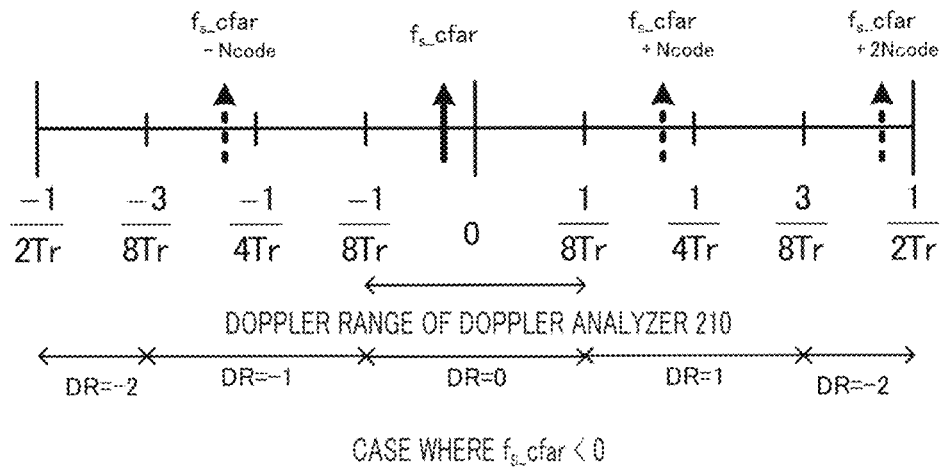
FIGS. 9A and 9B illustrate examples of Doppler aliasing determination according to Embodiment 1.
Figure 9B:
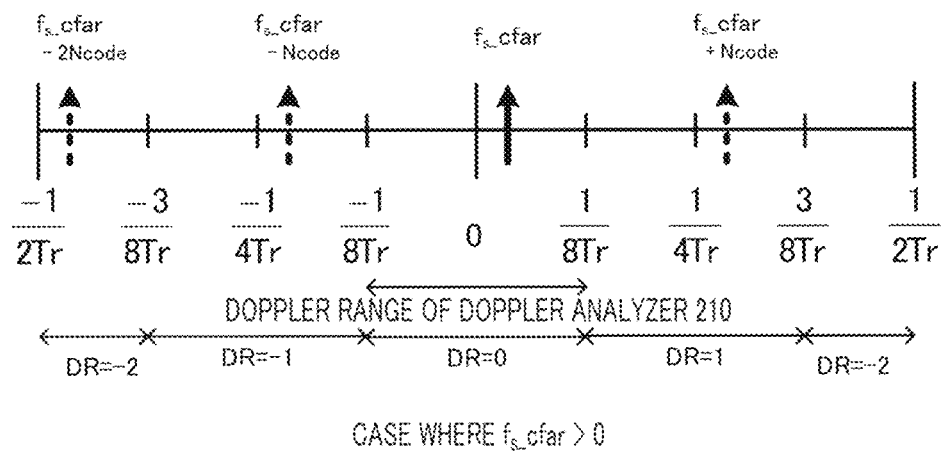

Here, Doppler components $VFT_z^{noc}(f_{b\_cfar}, f_{s\_cfar})$, which are the outputs of Doppler analyzers 210 corresponding to distance indexes $f_{b\_cfar}$ and Doppler frequency indexes $f_{s\_cfar}$ extracted in CFAR section 211, may contain a Doppler component including aliasing as illustrated in FIG. 9A and FIG. 9B, for example, in the Doppler Range of $+1/(2 \times Tr)$.

For example, when $f_{s\_cfar} < 0$ as illustrated in FIG. 9A, the Doppler component in the Doppler range of $+1/(2 \times Tr)$ may be any of four (=Loc) Doppler components of $f_{s\_cfar}$-Ncode, $f_{s\_cfar}$, $f_{s\_cfar}$+Ncode, and $f_{s\_cfar}$+2Ncode.

In addition, when $f_{s\_cfar} > 0$ as illustrated in FIG. 9B, for example, the Doppler component in the Doppler range of $+1/(2 \times Tr)$ may be any of four (=Loc) Doppler components of $f_{s\_cfar}$-2Ncode, $f_{s\_cfar}$-Ncode, $f_{s\_cfar}$, and $f_{s\_cfar}$+Ncode.

Aliasing determiner 212 performs code demultiplexing processing in the Doppler range of $+1/(2 \times Tr)$ as illustrated in FIGS. 9A and 9B, for example, using an unused orthogonal code. For example, aliasing determiner 212 may correct, for the unused orthogonal code, the phase change of four (=Loc) Doppler components including aliasing as illustrated in FIGS. 9A and 9B.

Then, aliasing determiner 212 determines whether or not each Doppler component is aliasing, for example, based on the received power of the Doppler component that is code-demultiplexed based on the unused orthogonal code. For example, aliasing determiner 212 may detect the Doppler component having the minimum received power among the Doppler components including aliasing, and determine the detected Doppler component as the true Doppler component. In other words, aliasing determiner 212 may determine that the Doppler components having other levels of received power different from the minimum received power among the Doppler components including aliasing are false Doppler components.

This aliasing determination processing makes it possible to reduce ambiguity of the Doppler range including aliasing. In addition, this aliasing determination processing makes it possible to expand the range in which the Doppler frequency can be detected without ambiguity to a range of from $-1/(2Tr)$ to less than $1/(2Tr)$, which is greater than the Doppler range (e.g., of from $-1/(8Tr)$ to less than $1/(8Tr)$) in Doppler analyzer 210.

For example, by the code demultiplexing based on the unused orthogonal code, the phase change of the true Doppler component is corrected appropriately, and the orthogonality between the orthogonal codes for code multiplexing transmission and the unused orthogonal code is maintained. The unused orthogonal code and the code-multiplexed transmission signals are thus uncorrelated, and the received power becomes as low as a noise level.

Meanwhile, the phase change of the false Doppler component is erroneously corrected, and the orthogonality between the orthogonal codes for code multiplexing transmission and the unused orthogonal code is not maintained. Thus, since a correlated component (interference component) between the unused orthogonal code and the code-multiplexed transmission signals is caused, the received power greater than the noise level can be detected, for example.

Therefore, as described above, aliasing determiner 212 may determine the Doppler component having the minimum received power as the true Doppler component among the Doppler components that are code-demultipelxed based on the unused orthogonal code, and determine that the other Doppler components having received power different from the minimum received power are the false Doppler components.

For example, aliasing determiner 212 corrects the phase change of the Doppler components including aliasing based on the outputs of Doppler analyzers 210 in each of antenna system processors 201, and calculates, according to following Expression 22, received power $\text{DeMulUnCode}_{nuc}$ ($f_{b\_cfar}$, $f_{s\_cfar}$, DR) after code demultiplexing using unused orthogonal code $\text{UnCode}_{nuc}$:

[22]

$$\text{DeMulUnCode}_{nuc}(f_{b\_cfar}, f_{s\_cfar}, DR) = \sum_{z=1}^{Na} |(\text{UnCode}_{nuc})^* \cdot \{\beta(DR) \otimes \alpha(f_{s\_cfar}) \otimes VFTALL_z(f_{b\_cfar}, f_{s\_cfar})\}^T|^2 \ldots \quad \text{(Expression 22)}$$

In Expression 22, with respect to the outputs of Doppler analyzers 210 in all of antenna system processors 201, the sum of the received powers after the code demultiplexing using unused orthogonal code $\text{UnCode}_{nuc}$ is calculated, thereby increasing the aliasing determination accuracy even when the reception signal level is low. However, instead of Expression 22, with respect to the outputs of Doppler analyzers 210 in some of antenna system processors 201, the received power after code demultiplexing using the unused orthogonal code may be calculated. Even in this case, it is possible to reduce the arithmetic processing amount while maintaining the accuracy of aliasing determination, for example, as long as the reception signal level is sufficiently high.

Note that, nuc=1, . . . , $N_{allcode}$−$N_{CM}$ in Expression 22. Further, DR is an index indicating the Doppler aliasing range, and takes an integer value in the range of DR=ceil[−Loc/2], ceil[−Loc/2]+1, . . . , 0, . . . , ceil[Loc/2]−1, for example.

In addition, in Expression 22, operator "⊗"

represents a product between elements of vectors having the same number of elements. For example, for nth order vectors A=[$a_1$, . . . , $a_n$] and B=[$b_1$, . . . , $b_n$], the products between the elements are expressed by following Expression 23:

[24]

$$A \otimes B = [a_1, \ldots, a_n] \otimes [b_1, \ldots, b_n] = [a_1 b_1, \ldots, a_n b_n] \ldots \quad \text{(Expression 23)}$$

Further, in Expression 22, operator "•"

represents a vector dot product operator. Moreover, in Expression 22, superscript "T" represents vector transposition, and superscript "*" (asterisk) represents a complex conjugate operator.

In Expression 22, $\alpha(f_{s\_cfar})$ represents a "Doppler phase correction vector." When Doppler frequency index $f_{s\_cfar}$ extracted in CFAR section 211 is within the output range (in other words, Doppler range) of Doppler analyzer 210 that includes no Doppler aliasing, for example, Doppler phase correction vector $\alpha(f_{s\_cfar})$ corrects the Doppler phase rotation caused by the time difference in the Doppler analysis between Loc Doppler analyzers 210.

For example, Doppler phase correction vector $\alpha(f_{s\_cfar})$ is expressed by following Expression 24:

[26]

$$\alpha(f_{s\_cfar}) = \left[1, \exp\left\{-j\frac{2\pi f_{s\_cfar}}{N_{code}}\frac{1}{Loc}\right\}, \exp\left\{-j\frac{2\pi f_{s\_cfar}}{N_{code}}\frac{2}{Loc}\right\}, \ldots, \exp\left\{-j\frac{2\pi f_{s\_cfar}}{N_{code}}\frac{Loc-1}{Loc}\right\}\right] \ldots \quad \text{(Expression 24)}$$

For example, Doppler phase correction vector $\alpha(f_{s\_cfar})$ given by Expression 24 is a vector having, as an element, a Doppler phase correction coefficient used to correct phase rotations of Doppler components with Doppler frequency indexes $f_{s\_cfar}$ resulting from the respective time delays of Tr, 2Tr, . . . , (Loc−1)Tr of output $VFT_z^2$ ($f_{b\_cfar}$, $f_{s\_cfar}$) of second Doppler analyzer 210 to output $VFT_z^{Loc}$($f_{b\_cfar}$, $f_{s\_cfar}$) of Locth Doppler analyzer 210, for example, with reference to the Doppler analysis time of output $VFT_z^1$ ($f_{b\_cfar}$, $f_{s\_cfar}$) of first Doppler analyzer 210.

Further, in Expression 22, β(DR) represents an "aliasing phase correction vector." Aliasing phase correction vector β(DR) corrects, considering the case where Doppler aliasing is present, the Doppler phase rotation of an integer multiple of 2π among the Doppler phase rotations caused by the time differences in the Doppler analyses of Loc Doppler analyzers 210, for example.

For example, aliasing phase correction vector $\beta(DR)$ is expressed by following Expression 25:

[25]

$$\beta(DR) = \left[1, \exp\left(-j2\pi DR \frac{1}{Loc}\right), \exp\left(-j2\pi DR \frac{2}{Loc}\right), \ldots, \exp\left(-j2\pi DR \frac{Loc-1}{Loc}\right)\right].$$ (Expression 25)

For example, in the case of Loc=4, aliasing phase correction vector $\beta(DR)$ takes integer values of DR=−2, −1, 0, 1, and is expressed by Expressions 26, 27, 28, and 29:

[28]

$$\beta(-2) = [1, -1, 1, -1];$$ (Expression 26)

[29]

-continued $$\beta(-1) = \left[1, \exp\left(j\frac{\pi}{2}\right), \exp(j\pi), \exp\left[j\pi\frac{3}{2}\right]\right];$$ (Expression 27)

[30]

$$\beta(0) = [1, 1, 1, 1];$$ (Expression 28)

[31]

$$\beta(1) = \left[1, \exp\left(-j\frac{\pi}{2}\right), \exp(-j\pi), \exp\left[-j\pi\frac{3}{2}\right]\right].$$ (Expression 29)

For example, when Loc=4, the Doppler range (e.g.,−⅛Tr to +⅛Tr) in which the Doppler component with Doppler frequency index $f_{s\_cfar}$ as the output of Doppler analyzer 210 is detected, corresponds to DR=0 in FIG. 9A or 9B. In addition, the Doppler phase rotations (e.g., $\beta(1)$, $\beta(-1)$, and $\beta(-2)$) with Doppler frequency index $f_{s\_cfar}$ for DR=0 by integer multiples of $2\pi$, allows to calculate the Doppler component in the Doppler range (e.g., ⅛Tr to ⅜Tr) corresponding to DR=1, the Doppler component in the Doppler range (e.g., −⅜Tr to −⅛Tr) corresponding to DR=−1, and the Doppler components in the Doppler ranges (e.g., −½Tr to −⅜Tr and ⅜Tr to ½Tr) corresponding to DR=−2.

Further, for example, as given by following Expression 30, $VFTALL_z(f_{b\_cfar}, f_{s\_cfar})$ in Expression 22 represents vector-format component $VFT_z^{noc}$ $(f_{b\_cfar}, f_{s\_cfar})$ (where noc=1, . . . , Loc) corresponding to distance index $f_{b\_cfar}$ and Doppler frequency index $f_{s\_cfar}$ extracted in CFAR section 211 among outputs $VFT_z^{noc}$ $(f_b, f_s)$ of Loc Doppler analyzers 210 in zth antenna system processor 201:

[32]

$$VFTALL_z(f_{b\_cfar}, f_{s\_cfar}) =$$ (Expression 30)
$$\left[VFT_z^1(f_{b\_cfar}, f_{s\_cfar}), VFT_z^2(f_{b\_cfar}, f_{s\_cfar}) \ldots, VFT_z^{Loc}(f_{b\_cfar}, f_{s\_cfar})\right].$$

For example, in accordance with Expression 22, aliasing determiner 212 calculates, within the ranges of DR=ceil[−Loc/2], ceil[−Loc/2]+1, . . . , 0, . . . , ceil[Loc/2]−1, respective received powers $DeMulUnCode_{nuc}(f_{b\_cfar}, f_{s\_cfar}, DR)$ after the code demultiplexing using unused orthogonal code $UnCode_{nuc}$ that has corrected the phase changes of the Doppler components including aliasing.

Then, aliasing determiner 212 detects the DR in which received power $DeMulUnCode_{nuc}(f_{b\_cfar}, f_{s\_cfar}, DR)$ is minimum among the ranges of DR. In the following, as given by following Expression 31, the DR in which received power $DeMulUnCode_{nuc}(f_{b\_cfar}, f_{s\_cfar}, DR)$ is minimum among the ranges of DR is represented as "$DR_{min}$":

[33]

$$DR_{min} = \left\{\arg DR \bigg| \min_{DR=ceil[-Loc/2], \ldots, ceil[Loc/2]-1} DeMulUnCode_{nuc}(f_{b\_cfar}, f_{s\_cfar}, DR)\right\}.$$ (Expression 31)

Hereinafter, the reason why the Doppler aliasing determination is possible by the aliasing determination processing as described above will be described.

Ignoring a noise component, for example, a radar transmission signal component transmitted from ncmth transmit antenna 107 (e.g., Tx #ncm) included in $VFTALL_z(f_{b\_cfar}, f_{s\_cfar})$ given by Expression 30 is represented by following Expression 32:

[34]

$$\beta(DR_{true})^* \otimes \alpha(f_{s\_cfar})^* \otimes \gamma_{z,ncm} Code_{ncm}.$$ (Expression 32)

Here, $\gamma_{z,ncm}$ represents a complex reflection coefficient for a case where the radar transmission signal transmitted from ncmth transmit antenna 107 and reflected by the target is received by zth antenna system processor 201. In addition, $DR_{true}$ represents an index indicating the true Doppler aliasing range. $DR_{true}$ is the index in the range of ceil[−Loc/2], ceil[−Loc/2]+1, . . . , 0, . . . , ceil[Loc/2]−1. Hereinafter, the possibility of determining that $DR_{min}=DR_{true}$ will be described.

For the radar transmission signal components transmitted from the first to the Ncmth transmit antennas 107, sum PowDeMul(nuc, DR, $DR_{true}$) of the received powers after the code demultiplexing using unused orthogonal code $UnCode_{nuc}$ is expressed by following Expression 33:

[35]

$$PowDeMul(nuc, DR, DR_{true}) = \sum_{ncm=1}^{N_{CM}} |UnCode_{nuc}^* \cdot \{\beta(DR) \otimes \alpha(f_{s\_cfar}) \otimes$$
$$\beta(DR_{true})^* \otimes \alpha(f_{s\_cfar})^* \otimes \gamma_{z,ncm} Code_{ncm}\}^T|^2$$
$$= \sum_{ncm=1}^{N_{CM}} |\gamma_{z,ncm} UnCode_{nuc}^* \cdot \{\beta(DR) \otimes$$
$$\beta(DR_{true})^* \otimes Code_{ncm}\}^T|^2$$
$$= \sum_{ncm=1}^{N_{CM}} |\gamma_{z,ncm} \{\beta(DR) \otimes \beta(DR_{true})^* \otimes$$
$$UnCode_{nuc}^*\} \cdot \{Code_{ncm}\}^T|^2$$

(Expression 33)

Note that PowDeMul(nuc, DR, $DR_{true}$) given by Expression 33 corresponds to an evaluation value of the term

[36]

$$|(UnCode_{nuc})^* \cdot \{\beta(DR) \otimes \alpha(f_{s\_cfar}) \otimes VFTALL_z(f_{b\_cfar}, f_{s\_cfar})\}^T|^2$$

in Expression 22.

In Expression 33, when DR=$DR_{true}$, a correlation value between unused orthogonal code $UnCode_{nuc}$ and orthogonal code $Code_{ncm}$ for code multiplexing transmission is zero (e.g., $UnCode_{nuc}^* \cdot \{Code_{ncm}\}^T = 0$), and accordingly, PowDeMul(nuc, DR, $DR_{true}$)=0.

Meanwhile, when DR $\neq DR_{true}$ in Expression 33, PowDeMul(nuc, DR, $DR_{true}$) depending on the correlation value between

[37]

$$\beta(DR) \otimes \beta(DR_{true})^* \otimes UnCode_{nuc}^*$$

and orthogonal code $Code_{ncm}$ for code multiplexing transmission is outputted. Here, when PowDeMul(nuc, DR, $DR_{true}$) is not zero for all $UnCode_{nuc}$, following Expression 34 is satisfied, for example, and, when DR=$DR_{true}$, the power of PowDeMul(nuc, $DR_{true}$, $DR_{true}$) is minimum, so that aliasing determiner 212 can detect $DR_{true}$ (=$DR_{min}$):

[38]

$$\sum_{nuc=1}^{N_{allcode}-N_{CM}} PowDeMul(nuc, DR, DR_{true}) > 0.$$

(Expression 34)

In other words, aliasing determiner 212 can perform the Doppler aliasing determination according to Expression 22.

For example, to satisfy Expression 34, the term

[39]

$$\beta(DR)^* \otimes \beta(DR_{true}) \otimes UnCode_{nuc}$$

need not to match another unused orthogonal code $UnCode_{nuc2}$. Here, nuc2≠nuc.

Thus, when the number of unused orthogonal codes is one, Expression 34 is satisfied. Further, when a plurality of unused orthogonal codes are present, code generator 105 may select the codes for code multiplexing transmission such that the term

[40]

$$\beta(DR)^* \otimes \beta(DR_{true}) \otimes Uncode_{nuc}$$

does not match another unused orthogonal code, for example.

Here, when a code such as the Walsh-Hadamard code or the orthogonal M-sequence code is used, a set of codes, among orthogonal codes with code length Loc, in which odd-numbered code elements are the same between the codes and even-numbered code elements have signs inverted between the codes, may be included.

Meanwhile, since $\beta(0)$=[1, 1, . . . , 1], $\beta(-Loc/2)$=[1, −1, 1, −1, . . . , 1, −1], the term

[41]

$$\beta(0)^* \otimes \beta(-Loc/2) \otimes UnCode_{nuc}$$

is converted into codes in which the odd-numbered code elements of $UnCode_{nuc}$ are the same between the codes and the even-numbered code elements signs inverted between the codes.

Accordingly, when number ($N_{allcode}-N_{CM}$) of unused orthogonal codes is 2 or more, code generator 105 may select, for example, among the orthogonal codes with code length Loc, codes for code multiplexing transmission or unused orthogonal codes such that the set of codes in which either the odd-numbered code elements or the even-numbered code elements are the same between the codes, and the other code elements have signs inverted between the codes is not included in the unused orthogonal codes.

Further, code generator 105 may select the codes, for example, such that codes in the set of codes with the aforementioned relationship are respectively used for the first radar transmission signal transmitted from first transmit antenna 107-1 for the LR mode (e.g., ncm=1, . . . , $N_{T1}$), and the second radar transmission signal transmitted from second transmit antenna 107-2 for the SR mode (e.g., ncm=$N_{T1}$+1, . . . , $N_{Tx}$).

For example, the Walsh-Hadamard codes with code length Loc=4 include $WH_4(1)$=[1, 1, 1, 1] and $WH_4(2)$=[1, −1, 1, −1], and are expressed as

[42]
$$\beta(0)^* \otimes \beta(-Loc/2) \otimes WH_4(1) = WH_4(2)$$

or

[43]
$$\beta(0)^* \otimes \beta(-Loc/2) \otimes WH_4(2) = WH_4(1)$$

Thus, code generator 105 may, for example, select the codes for code multiplexing transmission or the unused orthogonal code so as not to include a set of $WH_4(1)$ and $WH_4(2)$ in a plurality of unused orthogonal codes. Further, since the relation between $WH_4(3)=[1, 1, -1, -1]$ and $WH_4(4)=[1, -1, -1, 1]$ is similar to the relation between $WH_4(1)$ and $WH_4(2)$, code generator 105 may, for example, select the codes for code multiplexing transmission or the unused orthogonal code so as not to include a set of $WH_4(3)$ and $WH_4(4)$ in the plurality of unused orthogonal codes.

Note that, when there are a plurality of unused orthogonal codes $UnCode_{nuc}$, received power $DeMulUnCodeAll(f_{b\_cfar}, f_{s\_cfar}, DR)$ after code demultiplexing using all the unused orthogonal codes as given by following Expression 35 may be used instead of received power $DeMulUnCode_{nuc}(f_{b\_cfar}, f_{s\_cfar}, DR)$:

[44]
(Expression 35)
$$DeMulUnCodeAll(f_{b\_cfar}, f_{s\_cfar}, DR) = \sum_{nun=1}^{N_{allcode}-N_{CM}} DeMulUnCode_{nun}(f_{b\_cfar}, f_{s\_cfar}, DR).$$

Obtaining the received power after the code demultiplexing using all the unused orthogonal codes makes it possible for aliasing determiner 212 to increase the accuracy of the aliasing determination even when the reception signal level is low.

For example, aliasing determiner 212 calculates $DeMulUnCodeAll(f_{b\_cfar}, f_{s\_cfar}, DR)$ in each of the ranges of $DR=\text{ceil}[-Loc/2], \text{ceil}[-Loc/2]+1, \ldots, 0, \ldots, \text{ceil}[Loc/2]-1$, and detects the DR (in other words, $DR_{min}$) in which received power $DeMulUnCodeAll(f_{b\_cfar}, f_{s\_cfar}, DR)$ is minimum. When Expression 35 is used, the DR which provides the minimum received power in the DR range is represented as "$DR_{min}$" as given by following Expression 36:

[45]
(Expression 36)
$$DR_{min} = \left\{ \arg DR \Big|_{DR=\text{ceil}[-Loc/2],\ldots,\text{ceil}[Loc/2]-1} \min DeMulUnCodeAll(f_{b\_far}, f_{s\_far}, DR) \right\}.$$

Further, for example, aliasing determiner 212 may perform processing of comparing minimum received power $DeMulUnCode_{nuc}(f_{b\_cfar}, f_{s\_cfar}, DR_{min})$ after code demultiplexing using unused orthogonal code $UnCode_{nuc}$ with received power, and determining (in other words, measuring) the certainty of the aliasing determination. In this case, aliasing determiner 212 may determine the certainty of the aliasing determination in accordance with following Expressions 37 and 38, for example:

(Expression 37)
$$DeMulUnCode_{nuc}(f_{b\_cfar}, f_{s\_cfar}, DR_{min}) < \text{Threshold}_{DR} \times PowerFT(f_{b\_cfar}, f_{s\_cfar}); \quad [46]$$

(Expression 38)
$$DeMulUnCode_{nuc}(f_{b\_cfar}, f_{s\_cfar}, DR_{min}) \geq \text{Threshold}_{DR} \times PowerFT(f_{b\_cfar}, f_{s\_cfar}). \quad [47]$$

For example, when minimum received power $DeMulUnCode_{nuc}(f_{b\_cfar}, f_{s\_cfar}, DR_{min})$ after code demultiplexing using unused orthogonal code $UnCode_{nuc}$ is smaller (e.g., Expression 37) than a value obtained by multiplying, by predetermined value $\text{Threshold}_{DR}$, received power value $PowerFT(f_{b\_cfar}, f_{s\_cfar})$ corresponding to distance index $f_{b\_cfar}$ and Doppler frequency index $f_{s\_cfar}$ extracted in CFAR section 211, aliasing determiner 212 determines that the aliasing determination is sufficiently certain. In this case, radar apparatus 10 may perform, for example, subsequent processing (e.g., code demultiplexing processing).

Meanwhile, for example, aliasing determiner 212 determines that the accuracy of the aliasing determination is not sufficient (for example, determines the component as a noise component) when minimum received power $DeMulUnCode_{nuc}(f_{b\_cfar}, f_{s\_cfar}, DR_{min})$ after code demultiplexing using unused orthogonal code $UnCode_{nuc}$ is equal to or greater than the value obtained by multiplying received power value $PowerFT(f_{b\_cfar}, f_{s\_cfar})$ by $\text{Threshold}_{DR}$ (for example, Expression 38). In this case, for example, radar apparatus 10 may not perform subsequent processing (e.g., code demultiplexing processing).

Such processing makes it possible to reduce a determination error in aliasing determination in aliasing determiner 212 and to remove a noise component. Note that, predetermined value $\text{Threshold}_{DR}$ may, for example, be set within a range of from 0 to less than 1. By way of example, considering inclusion of a noise component, $\text{Threshold}_{DR}$ may be set in a range of approximately from 0.1 to 0.5.

Note that, when there are a plurality of unused orthogonal codes $UnCode_{nuc}$, aliasing determiner 212 may perform processing of comparing between $DeMulUnCodeAll(f_{b\_cfar}, f_{s\_cfar}, DR)$, instead of received power $DeMulUnCode_{nuc}(f_{b\_cfar}, f_{s\_cfar}, DR)$, and received power, and determining (in other words, measuring) the certainty of the aliasing determination. In this case, aliasing determiner 212 may, for example, determine the certainty of the aliasing determination using $DeMulUnCodeAll(f_{b\_cfar}, f_{s\_cfar}, DR)$ instead of $DeMulUnCode_{nuc}(f_{b\_cfar}, f_{s\_cfar}, DR)$ in Expressions 37 and 38. Obtaining the received power after code demultiplexing using all the unused orthogonal codes makes it possible for aliasing determiner 212 to increase the accuracy of how certain the aliasing determination is, even when the reception signal level is low.

Note that the calculation formula for received power $DeMulUnCode_{nuc}(f_{b\_cfar}, f_{s\_cfar}, DR)$ after code demultiplexing using unused orthogonal code $UnCode_{nuc}$ may be following Expression 39 instead of Expression 22, for example:

(Expression 39)

$$DeMulUnCode_{nuc}(f_{b\_cfar}, f_{s\_cfar}, DR) = \sum_{z=1}^{Na} |(\beta(DR) \otimes UnCode_{nuc})^* \cdot \{\alpha(f_{s\_cfar}) \otimes VFTALL_z(f_{b\_cfar}, f_{s\_cfar})\}^T|^2. \quad [48]$$

[48]

In Expression 39, the term $$\beta(DR) \otimes UnCode_{nuc} \quad [49]$$

does not depend on index (Doppler frequency index) $f_s$ of a Doppler component, and it is thus possible to reduce the arithmetic amount in aliasing determiner 212, for example, by pre-tabulation.

The operation example of aliasing determiner 212 has been described above.

Next, an operation example of code demultiplexer 213 will be described.

Code demultiplexer 213 performs demultiplexing processing of a code multiplexed signal based on the aliasing determination result in aliasing determiner 212 and the codes for code multiplexing transmission.

For example, as given by following Expression 40, code demultiplexer 213 performs, based on aliasing phase correction vector $\beta(DR_{min})$ using $DR_{min}$ that is the aliasing determination result in aliasing determiner 212, code demultiplexing processing on Doppler components $VFTALL_z(f_{b\_cfar}, f_{s\_cfar})$ that are the outputs of Doppler analyzers 210 corresponding to distance indexes $f_{b\_cfar}$ and Doppler frequency indexes $f_{s\_cfar}$ extracted by CFAR section 211:

(Expression 40)

$$DeMUL_z^{ncm}(f_{b\_cfar}, f_{s\_cfar}) = \quad [50]$$
$$(Code_{ncm})^* \cdot \{\beta(DR_{min}) \otimes \alpha(f_{s\_cfar}) \otimes VFTALL_z(f_{b\_cfar}, f_{s\_cfar})\}^T.$$

Since aliasing determiner 212 can determine an index that is a true Doppler aliasing range within the Doppler range of from $-1/(2Tr)$ to less than $1/(2Tr)$ (in other words, can determine the index such that $DR_{min}=DR_{true}$), code demultiplexer 213 can set the correlation value between the orthogonal codes used for code multiplexing to zero in the Doppler range of from $-1/(2Tr)$ to less than $1/(2Tr)$, thereby enabling the demultiplexing processing in which the interference between the code multiplexed signals is suppressed.

Here, $DeMul_z^{ncm}$ ($f_{b\_cfar}$, $f_{s\_cfar}$) is an output (e.g., code demultiplexing result) resulting from code demultiplexing of a code multiplexed signal using orthogonal code $Code_{ncm}$ corresponding to the output of distance index $f_{b\_cfar}$ and Doppler frequency index $f_{s\_cfar}$ of Doppler analyzer 210 in zth antenna system processor 201. Note that, $z=1, \ldots, Na$, and $ncm=1, \ldots, N_{CM}$.

Note that, code demultiplexer 213 may use following Expression 41 instead of Expression 40:

(Expression 41)

$$DeMUL_z^{ncm}(f_{b\_cfar}, f_{s\_cfar}) = (\beta DR_{min}) \otimes Code_{ncm})^* \cdot \quad [51]$$
$$\{\alpha(f_{s\_cfar}) \otimes VFTALL_z(f_{b\_cfar}, f_{s\_cfar})\}^T.$$

In Expression 41, the term $$\beta(DR) \otimes Code_{ncm} \quad [52]$$

(where, $DR=DR_{min}$ in Expression 41) does not depend on index (e.g., Doppler frequency index) $f_s$ of the Doppler component, and it is thus possible to reduce the arithmetic amount in code demultiplexer 213, for example, by pre-tabulation.

Through the code demultiplexing processing as described above, radar apparatus 10 can obtain a signal resulting from demultiplexing of a signal code-multiplexed and transmitted using orthogonal code $Code_{ncm}$ applied to ncmth transmit antenna Tx #ncm based on the aliasing determination result of aliasing determiner 212 assuming a Doppler range of $\pm 1/(2\times Tr)$ that is Loc times greater than Doppler range$\pm 1/(2Loc\times Tr)$ in which the aliasing is not caused in Doppler analyzer 210.

In addition, radar apparatus 10 performs, on the output of Doppler analyzer 210 for each code element, Doppler phase correction (for example, processing based on aliasing phase correction vector $\beta(DR_{min})$) considering Doppler aliasing, for example, during code demultiplexing processing. Mutual interference between code multiplexed signals can thus be reduced, for example, as low as a noise level. In other words, radar apparatus 10 can reduce inter-code interference and suppress the effect on degradation of the detection performance of radar apparatus 10.

Figure 10:
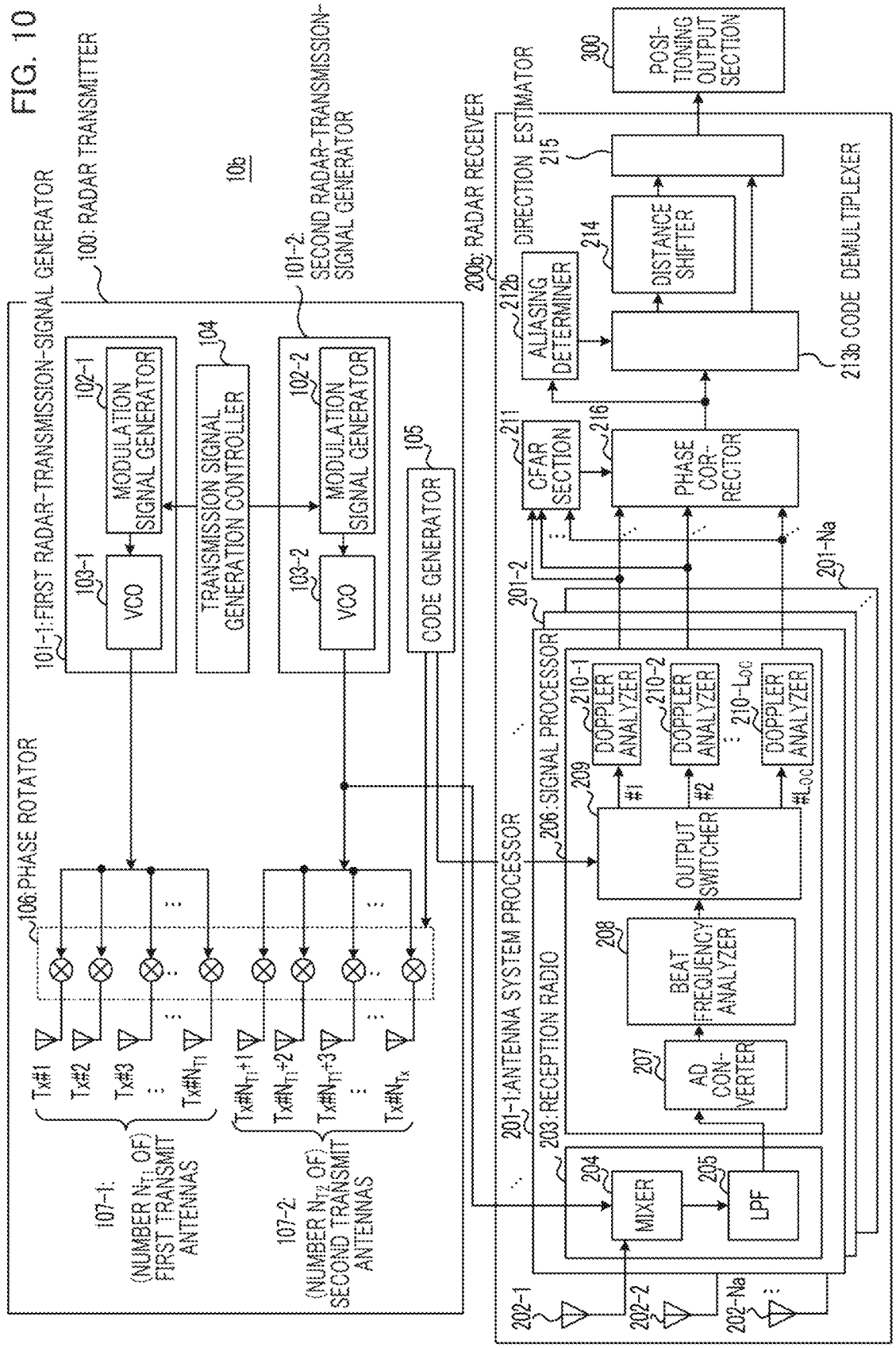
FIG. 10 is a block diagram illustrating another exemplary configuration of the radar apparatus according to Embodiment 1.

FIG. 10 illustrates another exemplary configuration of radar apparatus 10. In the configuration of radar apparatus 10 illustrated in FIG. 1, the term $$\alpha(f_{s\_cfar}) \otimes VFTALL_z(f_{b\_cfar}, f_{s\_cfar}) \quad [53]$$

is commonly used in aliasing determiner 212 and code demultiplexer 213 as indicated in Expressions 22, 39, 40, and 41. In this regard, radar receiver 200b of radar apparatus 10b illustrated in FIG. 10, for example, includes phase corrector 216 and may output, to aliasing determiner 212b and code demultiplexer 213b, output $$\alpha(f_{s\_cfar}) \otimes VFTALL_z(f_{b\_cfar}, f_{s\_cfar}) \quad [54]$$

obtained by multiplying Doppler component $VFTALL_z(f_{b\_cfar}, f_{s\_cfar})$ by Doppler phase correction vector $\alpha(f_{s\_cfar})$. Aliasing determiner 212b and code demultiplexer 213b need not calculate the term $$\alpha(f_{s\_cfar}) \otimes VFTALL_z(f_{b\_cfar}, f_{s\_cfar}) \quad [55]$$

and it is thus possible to reduce redundant arithmetic processing of the term in radar apparatus 10b.

The operation example of code demultiplexer 213 has been described above.

Distance shifter 214 in FIG. 1 may convert, for example, the signal to be inputted from code demultiplexer 213 into distance information. For example, distance shifter 214 may perform the conversion into the distance information on signals $\text{DeMul}_z^{ncm}$ ($f_{b\_cfar}$, $f_{s\_cfar}$) obtained by code demultiplexing processing on the code multiplexed signals transmitted from first transmit antennas 107-1 (e.g., ncm=1, ..., $N_{T1}$), among signals $\text{DeMul}_z^{ncm}$ ($f_{b\_cfar}$, $f_{s\_cfar}$) obtained by demultiplexing processing on the code multiplexed signals in code demultiplexer 213. Distance shifter 214 then may output the distance information to direction estimator 215.

When the distance conversion value (e.g., $C_0Tu/2$) of transmission delay time Tu is set to integer multiple $N_{LR}$ of a distance bin interval (or distance resolution) $C_0/2Bw$ (e.g., $C_0Tu/2=N_{LR}(C_0/2Bw)$), for example, distance index $f_{b\_cfar}$ may be converted into beat frequency index $f_{bLR}$ for the LR mode in the conversion into the distance information, and the distance information may be obtained according to Expression 9, for example.

Herein, beat frequency index $f_{bLR}$ for the LR mode may be converted as follows, for example, according to Expressions 12, 13, 17, and 18.

When a quadrature mixer is not used in mixer 204, $$f_{bLR} = N_{LR} - f_{b\_cfar} \text{ without range aliasing, and}$$

$$f_{bLR} = f_{b\_cfar} + N_{LR} \text{ with range aliasing.}$$

When a quadrature mixer is used in mixer 204, $$f_{bLR} = f_{b\_cfar} - (N_{data}/2) + N_{LR} \text{ without range aliasing, and}$$

$$f_{bLR} = f_{b\_cfar} + N_{LR} \text{ with range aliasing.}$$

An expected target is in a distance range in which no range aliasing occurs in beat frequency analyzer 208, distance shifter 214 may apply (i.e., adopt) the conversion into the distance information without range aliasing described above, for example. Meanwhile, an expected target is in a distance range in which range aliasing possibly occurs in beat frequency analyzer 208, distance shifter 214 may apply (i.e., adopt) the conversion into the distance information both with and without range aliasing described above, for example.

Note that reception signals corresponding to the radar transmission signals transmitted from first transmit antenna 107-1 and second transmit antenna 107-2 are possibly multiplexed signals of reflected waves of targets in mutually different ranges, in an embodiment of the present disclosure. In this case, the multiplexed signal (i.e., the code multiplexed signal) is subjected to demultiplexing processing in code demultiplexer 213 and outputted as $\text{DeMul}_z^{ncm}$ ($f_{b\_cfar}$, $f_{s\_cfar}$), and thus radar apparatus 10 possibly receives either one of the first radar transmission signal and the second radar transmission signal, for example.

In this regard, distance shifter 214 need not output the signal to direction estimator 215, for example, when a power level of the power sum of reception signals $\text{DeMul}_z^{ncm}$ ($f_{b\_cfar}$, $f_{s\_cfar}$) obtained by the code demultiplexing processing and distance conversion on the code multiplexed signals transmitted from first transmit antennas 107-1 (e.g., ncm=1, ..., $N_{T1}$) for the LR mode, is less than threshold (also referred to as determination value) $P_{ThDop1}$. Distance shifter 214 may output reception signals $\text{DeMul}_z^{ncm}$ ($f_{b\_cfar}$, $f_{s\_cfar}$) with a power level equal to or greater than threshold $P_{ThDop1}$, for example, as in following Expression 42:

(Expression 42)

$$\sum_{ncm=1}^{N_{T1}} \sum_{z=1}^{Na} |DeMUL_z^{ncm}(f_{bLR}, f_{s\_cfar})|^2 \geq P_{ThDop1}. \quad [56]$$

In other words, direction estimation processing for the LR mode or the combination use of the SR mode and the LR mode in direction estimator 215 may be performed on reception signals $\text{DeMul}_z^{ncm}$ ($f_{b\_cfar}$, $f_{s\_cfar}$) with the power level equal to or greater than threshold $P_{ThDop1}$.

Distance shifter 214 may alternatively use an adaptive determination value using the power sum of the reception signals corresponding to all of transmit antennas 107 (e.g., ncm=1, ..., $N_{Tx}$) in place of threshold $P_{ThDop1}$, as in following Expression 43:

(Expression 43)

$$\sum_{ncm=1}^{N_{T1}} \sum_{z=1}^{Na} |DeMUL_z^{ncm}(f_{bLR}, f_{s\_cfar})|^2 \geq \quad [57]$$
$$\alpha_{ThDop1} \sum_{ncm=1}^{N_{Tx}} \sum_{z=1}^{Na} |DeMUL_z^{ncm}(f_{b\_cfar}, f_{s\_cfar})|^2.$$

Here, $\alpha_{ThDop1}$ is a coefficient value (where $0 < \alpha_{ThDop1} \leq 1$).

Similarly, distance shifter 214 need not output the signal to direction estimator 215, for example, when a power level of the power sum of reception signals $\text{DeMul}_z^{ncm}$ ($f_{b\_cfar}$, $f_{s\_cfar}$) obtained by the code demultiplexing processing on the code multiplexed signals transmitted from second transmit antennas 107-2 (e.g., ncm=$N_{T1}$+1, ..., $N_{Tx}$) for the SR mode, is less than threshold (also referred to as determination value) $P_{ThDop2}$. Distance shifter 214 may output reception signals $\text{DeMul}_z^{ncm}$ ($f_{b\_cfar}$, $f_{s\_cfar}$) with a power level equal to or greater than threshold $P_{ThDop2}$, for example, as in following Expression 44:

(Expression 44)

$$\sum_{ncm=N_{T1}+1}^{N_{Tx}} \sum_{z=1}^{Na} |DeMUL_z^{ncm}(f_{b\_cfar}, f_{s\_cfar})|^2 \geq P_{ThDop2}. \quad [58]$$

In other words, direction estimation processing for the SR mode or the combination use of the SR mode and the LR mode in direction estimator 215 may be performed on reception signals $\text{DeMul}_z^{ncm}$ ($f_{b\_cfar}$, $f_{s\_cfar}$) with the power level equal to or greater than threshold $P_{ThDop2}$.

Distance shifter 214 may alternatively use an adaptive determination value using the power sum of the reception signals corresponding to all of transmit antennas 107 (e.g., ncm=1, ..., $N_{Tx}$) in place of threshold $P_{ThDop2}$, as in following Expression 45:

(Expression 45)

$$\sum_{ncm=N_{T1}+1}^{N_{Tx}} \sum_{z=1}^{Na} |DeMUL_z^{ncm}(f_{b\_cfar}, f_{s\_cfar})|^2 \geq \alpha_{ThDop2} \sum_{ncm=1}^{N_{Tx}} \sum_{z=1}^{Na} |DeMUL_z^{ncm}(f_{b\_cfar}, f_{s\_cfar})|^2. \quad [59]$$

Here, $\alpha_{ThDop2}$ is a coefficient value (where $0<\alpha_{ThDop2}<1$).

Note that the following range aliasing determination processing may be applied when mixer 204 has a quadrature mixer configuration and $R_{dup}=R_{maxIQ}$.

$N_{LR}=(N_{data}/2)$ when $R_{dup}=R_{maxIQ}$, for example, and this leads to the expressions $f_{bLR}=f_{b\_cfar}$ without range aliasing and $f_{bLR}=f_{b\_cfar}+(N_{data}/2)$ with range aliasing.

When, for example, $R_{dup}=R_{maxIQ}$ and the reception signal for the first radar transmission signal is detected in a distance range of from 0 to $R_{maxIQ}$, the reception signal for the second radar transmission signal is possibly detected as the beat frequency index identical to the reception beat signal for the first radar transmission signal in the distance range of from 0 to $R_{maxIQ}$.

Thus, distance shifter 214 may determine that there is no range aliasing when, for example, the power sum of reception signals $DeMUL_z^{ncm}(f_{b\_cfar}, f_{s\_cfar})$ obtained by the code demultiplexing processing on the code multiplexed signals transmitted from second transmit antennas 107-2 (e.g., $ncm=N_{T1}+1, \ldots, N_{Tx}$) for the SR mode, is equal to or greater than threshold (also referred to as a determination value) $P_{ThDop2}$, as in following Expression 46:

$$\sum_{ncm=N_{T1}+1}^{N_{Tx}} \sum_{z=1}^{Na} |DeMUL_z^{ncm}(f_{b\_cfar}, f_{s\_cfar})|^2 \geq P_{ThDop2}. \quad \text{(Expression 46)}$$

Distance shifter 214 may output the reception signals to direction estimator 215 using the conversion expression into the distance information without range aliasing, that is, $f_{bLR}=f_{b\_cfar}$, when distance shifter 214 determines that there is no range aliasing, for example.

Meanwhile, when $R_{dup}=R_{maxIQ}$ and the reception signal for the first radar transmission signal is detected in a distance range of from $R_{maxIQ}$ to $2R_{maxIQ}$, no reception signal for the second radar transmission signal is detected in the distance range of from $R_{maxIQ}$ to $2R_{maxIQ}$. Thus, the reception power is possibly as low as a noise level with the beat frequency index identical to the reception signal for the second radar transmission signal.

Thus, distance shifter 214 may determine that there is range aliasing when, for example, the power sum of reception signals $DeMUL_z^{ncm}(f_{b\_cfar}, f_{s\_cfar})$ obtained by the code demultiplexing processing on the code multiplexed signals transmitted from second transmit antennas 107-2 (e.g., $ncm=N_{T1}+1, \ldots, N_{Tx}$) for the SR mode, is less than threshold $P_{ThDop2}$, as in following Expression 47:

$$\sum_{ncm=N_{T1}+1}^{N_{Tx}} \sum_{z=1}^{Na} |DeMUL_z^{ncm}(f_{b\_cfar}, f_{s\_cfar})|^2 < P_{ThDop2}. \quad \text{(Expression 47)}$$

Distance shifter 214 may output the reception signals to direction estimator 215 using the conversion expression into the distance information with range aliasing, that is, $f_{bLR}=f_{b\_cfar}+(N_{data}/2)$, when distance shifter 214 determines that there is range aliasing, for example.

Exemplary operations of distance shifter 214 have been described above.

In FIG. 1, direction estimator 215 performs target direction estimation processing based on code demultiplexing result $DeMul_z^{ncm}(f_{b\_cfar}, f_{s\_cfar})$ inputted from code demultiplexer 213 with respect to the output of Doppler analyzer 210 corresponding to distance index $f_{b\_cfar}$ and Doppler frequency index $f_{s\_cfar}$.

For example, direction estimator 215 may perform direction estimation for the LR mode (hereinafter, also referred to as "LR-DOA") using reception signals $DeMul_z^{ncm}(f_{bLR}, f_{s\_cfar})$ corresponding to code multiplexed signals transmitted from first transmit antennas 107-1 (e.g., $ncm=1, \ldots, N_{T1}$) for the LR mode.

In addition, direction estimator 215 may, for example, perform direction estimation processing for the SR mode (hereinafter, also referred to as "SR-DOA") using reception signals $DeMul_z^{ncm}(f_{b\_cfar}, f_{s\_cfar})$ corresponding to code multiplexed signals transmitted from second transmit antennas 107-2 (e.g., $ncm=N_{T1}+1, \ldots, N_{Tx}$) for the SR mode.

Note that the distance ranges may be configured so that the distance ranges where detection can be performed using the respective reception signals for the first radar transmission signal for the LR mode and the second radar transmission signal for the SR mode partly overlap with each other (e.g., FIG. 6 or 8). In this case, radar apparatus 10 may perform direction estimation processing for the combination use of the SR mode and the LR mode (hereinafter, also referred to as "SR/LR-DOA"), in the overlapped range (e.g., the distance range of from $R_{max}-R_{dup}$ to $R_{max}$ or the distance range of from $R_{maxIQ}-R_{dup}$ to $R_{maxIQ}$), for example, using reception signals $DeMul_z^{ncm}(f_{bLR}, f_{s\_cfar})$ obtained by the code demultiplexing processing and the distance conversion on the code multiplexed signals transmitted from first transmit antennas 107-1 for the LR mode and reception signals $DeMul_z^{ncm}(f_{bLR}, f_{s\_cfar})$ with beat frequency index $f_{bLR}$ obtained by the code demultiplexing processing on the code multiplexed signals transmitted from second transmit antennas 107-2 for the SR mode. This enables direction estimator 215 to perform direction estimation processing using the reception signals corresponding to the code multiplexed signals transmitted from first transmit antennas 107-1 and second transmit antennas 107-2, thereby improving the array gain and also improving angular resolution due to the increase of the aperture length by the virtual array.

Hereinafter, examples of LR-DOA, SR-DOA and SR/LR-DOA will be described.

<(1) Direction Estimation for LR Mode (LR-DOA)>

Direction estimator 215 may perform the direction estimation for the LR mode (LR-DOA) using, for example, reception signals $DeMul_z^{ncm}(f_{bLR}, f_{s\_cfar})$, which are code multiplexed signals transmitted from first transmit antennas 107-1 (e.g., $ncm=1, \ldots, N_{T1}$) for the LR mode on which the code demultiplexing processing and the distance conversion are performed.

For example, direction estimator 215 performs the direction estimation processing by generating virtual receive array correlation vector $h_{LR}(f_{bLR}, f_{s\_cfar})$ as given by Expression 48.

Virtual receive array correlation vector $h_{LR}(f_{bLR}, f_{s\_cfar})$ includes $(N_{T1} \times Na)$ elements, the number of which is equal to the product of number $N_{T1}$ of transmit antennas and number Na of receive antennas. Virtual receive array correlation vector $h_{LR}(f_{bLR}, f_{s\_cfar})$ is used in processing for performing, on reflected wave signals from a target, direction estimation based on a phase difference among receive antennas 202. Here, z=1, ..., Na.

$$h_{LR}(f_{bLR}, f_{s\_cfar}) = \begin{bmatrix} DeMUL_1^1(f_{bLR}, f_{s\_cfar}) \\ DeMUL_2^1(f_{bLR}, f_{s\_cfar}) \\ \vdots \\ DeMUL_{Na}^1(f_{bLR}, f_{s\_cfar}) \\ DeMUL_1^2(f_{bLR}, f_{s\_cfar}) \\ DeMUL_2^2(f_{bLR}, f_{s\_cfar}) \\ \vdots \\ DeMUL_{Na}^2(f_{bLR}, f_{s\_cfar}) \\ \vdots \\ DeMUL_1^{N_{T1}}(f_{bLR}, f_{s\_cfar}) \\ DeMUL_2^{N_{T1}}(f_{bLR}, f_{s\_cfar}) \\ \vdots \\ DeMUL_{Na}^{N_{T1}}(f_{bLR}, f_{s\_cfar}) \end{bmatrix} \quad \text{(Expression 48)}$$

For example, direction estimator 215 may calculate a spatial profile, with azimuth direction θ in direction estimation evaluation function value $P_{LR}(θ, f_{bLR}, f_{s\_cfar})$ being variable within a defined angular range. Direction estimator 215 extracts a predetermined number of local maximum peaks in the calculated spatial profile in order from the largest, for example, and outputs the azimuth directions of the local maximum peaks as direction-of-arrival estimation values (e.g., positioning outputs).

There are various methods for direction estimation evaluation function value $P_{LR}(θ, f_{bLR}, f_{s\_cfar})$ depending on direction-of-arrival estimation algorithms. For example, an estimation method using an array antenna disclosed in NPL 6 may be used.

When ($N_{T1}$×Na) virtual receive arrays are linearly placed at equal intervals $d_{LR}$, for example, a beamformer method can be expressed by following Expressions 49, and 50:

$$P_{LR}(θ_u, f_{bLR}, f_{s\_cfar}) = |a_{LR}^H(θ_u) D_{calLR} h_{LR}(f_{bLR}, f_{s\_cfar})|^2; \quad \text{(Expression 49)}$$

$$a_{LR}(θ_u) = \begin{bmatrix} 1 \\ \exp\{-j2πd_{LR}\sin θ_u/λ\} \\ \vdots \\ \exp\{-j2π(N_{T1}N_a - 1)d_{LR}\sin θ_u/λ\} \end{bmatrix}. \quad \text{(Expression 50)}$$

In addition, techniques such as Capon and MUSIC are also applicable.

Here, superscript H is the Hermitian transpose operator. Further, $a_{LR}(θ_u)$ represents a direction vector of the virtual receive arrays when ($N_{T1}$×Na) virtual receive arrays with respect to arrival waves in azimuth direction $θ_u$ are linearly placed at equal intervals $d_{LR}$.

In addition, azimuth direction $θ_u$ is a vector changed at azimuth interval $D_{step}$ within the azimuth range for the LR mode (e.g., $θ_{minLR} ≤ θ_u ≤ θ_{maxLR}$) in which the direction-of-arrival estimation is performed. For example, $θ_u$ may be set as follows:

$$θ_u = θ_{min\,LR} + u × D_{Step}, u = 0, \ldots, NU - 1$$

$$NU = floor\left[(θ_{maxLR} - θ_{min\,LR})/D_{Step}\right].$$

Here, floor(x) is a function that returns the maximum integer value not greater than real number x.

Further, in Expression 49, $D_{calLR}$ is a ($N_{T1}$×Na)th order matrix including an array correction coefficient for correcting phase deviations and amplitude deviations between the transmit array antennas and between the receive array antennas, and a coefficient for reducing the influence of inter-element coupling between the antennas. When the coupling between antennas in the virtual receive array is negligible, $D_{calLR}$ represents a diagonal matrix and includes, as diagonal components, the array correction coefficient for correcting the phase deviations and the amplitude deviations between the transmit array antennas and between the receive array antennas.

<(2) Direction Estimation for SR Mode (SR-DOA)>

Direction estimator 215 may perform the direction estimation for the SR mode (SR-DOA) using, for example, reception signals $DeMul_z^{ncm}(f_{b\_cfar}, f_{s\_cfar})$ obtained by code demultiplexing processing performed on code multiplexed signals transmitted from second transmit antennas 107-2 (e.g., ncm=$N_{T1}$+1, ..., $N_{Tx}$) for the SR mode.

For example, direction estimator 215 performs the direction estimation processing by generating virtual receive array correlation vector $h_{SR}(f_{b\_cfar}, f_{s\_cfar})$ as given by Expression 51.

Virtual receive array correlation vector $h_{SR}(f_{b\_cfar}, f_{s\_cfar})$ includes ($N_{T2}$×Na) elements, the number of which is equal to the product of number $N_{T2}$ of transmit antennas and number Na of receive antennas. Virtual receive array correlation vector $h_{SR}(f_{b\_cfar}, f_{s\_cfar})$ is used in processing for performing, on reflected wave signals from a target, direction estimation based on a phase difference among receive antennas 202. Here, z=1, ..., Na.

$$h_{SR}(f_{b\_cfar}, f_{s\_cfar}) = \begin{bmatrix} DeMUL_1^{N_{T1}+1}(f_{b\_cfar}, f_{s\_cfar}) \\ DeMUL_2^{N_{T1}+1}(f_{b\_cfar}, f_{s\_cfar}) \\ \vdots \\ DeMUL_{Na}^{N_{T1}+1}(f_{b\_cfar}, f_{s\_cfar}) \\ DeMUL_1^{N_{T1}+2}(f_{b\_cfar}, f_{s\_cfar}) \\ DeMUL_2^{N_{T1}+2}(f_{b\_cfar}, f_{s\_cfar}) \\ \vdots \\ DeMUL_{Na}^{N_{T1}+2}(f_{b\_cfar}, f_{s\_cfar}) \\ \vdots \\ DeMUL_1^{N_{Tx}}(f_{b\_cfar}, f_{s\_cfar}) \\ DeMUL_2^{N_{Tx}}(f_{b\_cfar}, f_{s\_cfar}) \\ \vdots \\ DeMUL_{Na}^{N_{Tx}}(f_{b\_cfar}, f_{s\_cfar}) \end{bmatrix}. \quad \text{(Expression 51)}$$

For example, direction estimator 215 may calculate a spatial profile, with azimuth direction θ in direction estimation evaluation function value $P_{SR}(θ, f_{b\_cfar}, f_{s\_cfar})$ being variable within a defined angular range. Direction estimator 215 extracts a predetermined number of local maximum peaks in the calculated spatial profile in order from the largest, for example, and outputs the azimuth directions of the local maximum peaks as direction-of-arrival estimation values (e.g., positioning outputs).

There are various methods for direction estimation evaluation function value $P_{SR}(θ, f_{b\_cfar}, f_{s\_cfar})$ depending on direction-of-arrival estimation algorithms. For example, an estimation method using an array antenna disclosed in NPL 6 may be used.

When ($N_{T2}$×Na) virtual receive arrays are linearly placed at equal intervals $d_{SR}$, for example, a beamformer method can be expressed by following Expressions 52, and 53:

$$P_{SR}(\theta_u, f_{b\_cfar}, f_{s\_cfar}) = \qquad \text{(Expression 52)}$$

$$|a_{SR}^H(\theta_u) D_{calSR} h_{SR}(f_{b\_cfar}, f_{s\_cfar})|^2;$$

$$a_{SR}(\theta_u) = \begin{bmatrix} 1 \\ \exp\{-j2\pi d_{SR} \sin\theta_u/\lambda\} \\ \vdots \\ \exp\{-j2\pi(N_{T2}N_a-1)d_{SR}\sin\theta_u/\lambda\} \end{bmatrix}. \qquad \text{(Expression 53)}$$

In addition, techniques such as Capon and MUSIC are also applicable.

Here, superscript H is the Hermitian transpose operator. Further, $a_{SR}(\theta_u)$ represents a direction vector of the virtual receive arrays when $(N_{T2} \times Na)$ virtual receive arrays with respect to arrival waves in azimuth direction $\theta_u$ are linearly placed at equal intervals $d_{SR}$.

In addition, azimuth direction $\theta_u$ is a vector changed at azimuth interval $D_{step}$ within the azimuth range for the SR mode (e.g., OminSR≤θu≤OmaxSR) in which the direction-of-arrival estimation is performed. For example, $\theta_u$ may be set as follows:

$$\theta_u = \theta_{minSR} + u \times D_{Step}, u = 0, \ldots, NU - 1$$

$$NU = floor[(\theta_{maxSR} - \theta_{minSR})/D_{Step}].$$

Here, floor(x) is a function that returns the maximum integer value not greater than real number x.

Further, in Expression 52, $D_{calSR}$ is a $(N_{T2} \times Na)$th order matrix including an array correction coefficient for correcting phase deviations and amplitude deviations between the transmit array antennas and between the receive array antennas, and a coefficient for reducing the influence of inter-element coupling between the antennas. When the coupling between antennas in the virtual receive array is negligible, $D_{calSR}$ represents a diagonal matrix and includes, as diagonal components, the array correction coefficient for correcting the phase deviations and the amplitude deviations between the transmit array antennas and between the receive array antennas.

<(3) Direction Estimation for Combination Use of SR/LR Modes (SR/LR-DOA)>

For example, the distance ranges are configured in some cases so that the distance ranges where detection can be performed using the respective reception signals for the first radar transmission signal for the LR mode and the second radar transmission signal for the SR mode partly overlap with each other.

In this case, direction estimator 215 may perform direction estimation processing for the combination use of the SR mode and the LR mode (SR/LR-DOA), in the overlapped range (e.g., the distance range of from $(R_{max} - R_{dup})$ to $R_{max}$ or the distance range of from $(R_{maxIQ} - R_{dup})$ to $R_{maxIQ}$), for example, using reception signals $DeMul_z^{ncm}$ $(f_{bLR}, f_{s\_cfar})$ obtained by code demultiplexing processing and distance conversion on the code multiplexed signals transmitted from first transmit antennas 107-1 (e.g., ncm=1, ..., $N_{T1}$) for the LR mode and reception signals $DeMul_z^{ncm}$ $(f_{bLR}, f_{s\_cfar})$ with beat frequency index $f_{bLR}$ obtained by the code demultiplexing processing on the code multiplexed signals transmitted from second transmit antennas 107-2 (ncm= $N_{T1}+1, \ldots, N_{Tx}$) for the SR mode.

For example, direction estimator 215 performs the direction estimation processing by generating virtual receive array correlation vector hLRSR $(f_{bLR}, f_{s\_cfar})$ as given by Expression 54.

Virtual receive array correlation vector $h_{LR}$/SR $(f_{bLR}, f_{s\_cfar})$ includes $(N_{Tx} \times Na)$ elements, the number of which is equal to the product of number $N_{Tx}$ of transmit antennas and number Na of receive antennas. Virtual receive array correlation vector $h_{LR/SR}$ $(f_{bLR}, f_{s\_cfar})$ is used in processing for performing, on reflected wave signals from a target, direction estimation based on a phase difference among receive antennas 202. Here, z=1, ..., Na.

$$h_{LR/SR}(f_{bLR}, f_{s\_cfar}) = \begin{bmatrix} DeMUL_1^1(f_{bLR}, f_{s\_cfar}) \\ DeMUL_2^1(f_{bLR}, f_{s\_cfar}) \\ \vdots \\ DeMUL_{Na}^1(f_{bLR}, f_{s\_cfar}) \\ DeMUL_1^2(f_{bLR}, f_{s\_cfar}) \\ DeMUL_2^2(f_{bLR}, f_{s\_cfar}) \\ \vdots \\ DeMUL_{Na}^2(f_{bLR}, f_{s\_cfar}) \\ \vdots \\ DeMUL_1^{N_{Tx}}(f_{bLR}, f_{s\_cfar}) \\ DeMUL_2^{N_{Tx}}(f_{bLR}, f_{s\_cfar}) \\ \vdots \\ DeMUL_{Na}^{N_{Tx}}(f_{bLR}, f_{s\_cfar}) \end{bmatrix} \qquad \text{(Expression 54)}$$

For example, direction estimator 215 may calculate a spatial profile, with azimuth direction θ in direction estimation evaluation function value $P_{LR}$/SR $(\theta, f_{bLR}, f_{s\_cfar})$ being variable within a defined angular range. Direction estimator 215 extracts a predetermined number of local maximum peaks in the calculated spatial profile in order from the largest, for example, and outputs the azimuth directions of the local maximum peaks as direction-of-arrival estimation values (e.g., positioning outputs).

There are various methods for direction estimation evaluation function value $P_{LR}$/SR $(\theta, f_{bLR}, f_{s\_cfar})$ depending on direction-of-arrival estimation algorithms. For example, an estimation method using an array antenna disclosed in NPL 6 may be used.

When $(N_{Tx} \times Na)$ virtual receive arrays are linearly placed at equal intervals $d_{LR}$/SR, for example, a beamformer method can be expressed by following Expressions 55, and 56:

$$P_{LR/SR}(\theta_u, f_{bLR}, f_{s\_cfar}) = \qquad \text{(Expression 55)}$$

$$|a_{LR/SR}^H(\theta_u) D_{calLR/SR} h_{LR/SR}(f_{bLR}, f_{s\_cfar})|^2;$$

$$a_{LR/SR}(\theta_u) = \begin{bmatrix} 1 \\ \exp\{-j2\pi d_{LR/SR}\sin\theta_u/\lambda\} \\ \vdots \\ \exp\{-j2\pi(N_{Tx}N_a-1)d_{LR/SR}\sin\theta_u/\lambda\} \end{bmatrix}. \qquad \text{(Expression 56)}$$

In addition, techniques such as Capon and MUSIC are also applicable.

Here, superscript H is the Hermitian transpose operator. Further, $a_{LR/SR}(\theta_u)$ represents a direction vector of the virtual receive arrays when $(N_{Tx} \times Na)$ virtual receive arrays with respect to arrival waves in azimuth direction $\theta_u$ are linearly placed at equal intervals $d_{LR/SR}$.

In addition, azimuth direction $\theta_u$ is a vector changed at azimuth interval $D_{step}$ within the azimuth range for the SR/LR modes (e.g., $\theta_{minLR/SR} \leq \theta_u \leq \theta_{maxLR/SR}$) in which the direction-of-arrival estimation is performed. For example, $\theta_u$ may be set as follows:

$$\theta_u = \theta_{min\,LR/SR} + u \times D_{Step},\ u = 0, \ldots, NU - 1$$

$$NU = floor\left[(\theta_{maxLR/SR} - \theta_{min\,LR/SR})/D_{Step}\right].$$

The azimuth range for the SR/LR modes may be set, for example, to an angular range narrower than the angular range of the azimuth range for the SR mode and wider than the azimuth range for the LR mode. Here, floor(x) is a function that returns the maximum integer value not greater than real number x.

Further, in Expression 55, $D_{calLR/SR}$ is a $(N_{TX} \times Na)$th order matrix including an array correction coefficient for correcting phase deviations and amplitude deviations between the transmit array antennas and between the receive array antennas, and a coefficient for reducing the influence of inter-element coupling between the antennas. When the coupling between antennas in the virtual receive array is negligible, $D_{calLR/SR}$ represents a diagonal matrix and includes, as diagonal components, the array correction coefficient for correcting the phase deviations and the amplitude deviations between the transmit array antennas and between the receive array antennas.

Examples of LR-DOA, SR-DOA, and SR/LR-DOA have been described above.

For example, direction estimator 215 may output the direction estimation result and may further output, as a positioning result, distance information that is based on distance index $f_{bLR}$ or $f_{b\_cfar}$, and Doppler velocity information of a target that is based on Doppler frequency index $f_{b\_cfar}$ of the target and determination result $DR_{min}$ of aliasing determiner 212, for example, to a control device of a vehicle in the case of an in-vehicle radar (not illustrated) or to an infrastructure control device in the case of an infrastructure radar (not illustrated).

Direction estimator 215 may, for example, calculate Doppler frequency index $f_{es\_cfar}$ in accordance with Expression 57 based on Doppler frequency index $f_{s\_cfar}$ and $DR_{min}$ that is a determination result of aliasing determiner 212:

$$f_{es\_cfar} = f_{s\_cfar} + DR_{min} \times N\ code. \quad \text{(Expression 57)}$$

Doppler frequency index $f_{es\_cfar}$ corresponds, for example, to a Doppler index for the case where the FFT size of Doppler analyzer 210 is extended to Loc×Ncode. Hereinafter, $f_{es\_cfar}$ is referred to as "extended Doppler frequency index."

Note that, the Doppler range is assumed to be up to +1/(2×Tr), and the range of extended Doppler frequency index $f_{es\_cfar}$ corresponding to this Doppler range is −Loc× Ncode/2≤$f_{es\_cfar}$<Loc×Ncode/2. Thus, as a result of calculation of Expression 57, $f_{es\_cfar}$+Loc×Ncode is regarded as $f_{es\_cfar}$ when $f_{es\_cfar}$<−Loc×Ncode/2. Further, when $f_{es\_cfar}$≥Loc×Ncode/2, $f_{es\_cfar}$−Loc×Ncode is regarded as $f_{es\_cfar}$.

Moreover, the Doppler frequency information may be converted into a relative velocity component and then outputted. Doppler frequency index $f_{es\_cfar}$ may be converted into relative velocity component $v_d(f_{es\_cfar})$ using following Expression 58:

$$v_d(f_{es\_cfar}) = \frac{\lambda}{2} f_{es\_cfar} \Delta_f. \quad \text{(Expression 58)}$$

Here, λ is the wavelength of the carrier frequency of an RF signal outputted from a transmission radio (not illustrated). When a chirp signal is used as the radar transmission signal, λ is the wavelength of the center frequency in the frequency sweep band of the chirp signal. Further, $\Delta_f$ denotes the Doppler frequency interval in FFT processing performed in Doppler analyzer 210. For example, in the present embodiment, $\Delta_f = 1/\{Loc \times N_{code} \times Tr\}$.

The operation example of direction estimator 215 has been described above.

In FIG. 1, positioning output section 300 may temporarily store, over a plurality of measurement periods, a detection result of a target (e.g., including direction estimation information $D_{target}$, range information $R_{target}$, or Doppler velocity information $V_{target}$ of the target) inputted from direction estimator 215. Positioning output section 300 may also perform the range aliasing determination processing described above, based on the detection result of the target, for example. Positioning output section 300 may output the target detection result excluding the result incorrectly detected due to range aliasing, to an advanced driver assistance system or a monitoring system for monitoring around the mobile body during automatic driving, for example.

The operation example of radar apparatus 10 has been described above.

As described above, radar apparatus 10 in the present embodiment generates the first radar transmission signal (e.g., a radar transmission wave for the LR mode) and the second radar transmission signal (e.g., a radar transmission wave for the SR mode), the transmission timing of which is later than that of the first radar transmission signal, for example, and transmits the code multiplexed signal of the first radar transmission signal and the second radar transmission signal. In addition, radar apparatus 10 down-mixes the reflected wave signal using the second radar transmission wave for the SR mode in the radar receiver, for example.

This enables radar apparatus 10 to detect in a greater distance by the first radar transmission wave for the LR mode compared to the SR mode. In other words, radar apparatus 10 can expand the distance range where detection with the LR mode is possible, while keeping distance resolution based on a chirp signal for the SR mode. For example, the distance range where detection with the LR mode is possible can be expanded up to twice, or three times taking aliasing into account, as large as the distance range where detection with the SR mode is possible.

Further, radar apparatus 10 can expand the maximum detection distance range while keeping the distance resolution without increasing sampling rate $f_{sa}$ of AD converter 207, for example, thereby enabling to prevent the cost of the hardware from increasing due to the acceleration of AD conversion.

Further, radar apparatus 10 may, for example, perform the determination of Doppler aliasing on the reception signal (for example, the output of each of Doppler analyzers 210 per code element of a code multiplexed signal) using an orthogonal code that is unused for the code multiplexing transmission. By this determination, radar apparatus 10 can, for example, determine the aliasing within the Doppler range that is greater by a factor of the code length of the orthogonal code sequences than the Doppler analysis range in each of Doppler analyzers 210. Therefore, according to the present embodiment, radar apparatus 10 can extend, to the Doppler range equivalent to that at the time of single antenna transmission, the Doppler range where it is possible to perform detection without ambiguity.

Further, radar apparatus 10 can, for example, reduce mutual interference between code multiplexed signals as low as a noise level by performing the Doppler phase correction considering aliasing during code demultiplexing based on the determination result for the Doppler aliasing, and thus can perform the code multiplexing transmission of the MIMO radar while preventing degradation of radar detection performance.

Thus, the present embodiment enables radar apparatus 10 to expand the distance range and the detection range of the Doppler component while keeping the distance resolution in simultaneous multiplexing transmission such as code multiplexing or Doppler multiplexing, for example. According to the present embodiment, it is thus possible to enhance the target detection accuracy of radar apparatus 10.

Further, first transmit antennas 107-1 and second transmit antennas 107-2 may, for example, be transmit antennas having the same level of directional characteristics or transmit antennas having different directional characteristics. For example, first transmit antennas 107-1 used for transmitting the first radar transmission wave may, for example, be antennas having a directive gain increased by narrower directivity than the directivity of second transmit antennas 107-2 in order to make it possible to detect an object at a greater distance by the first radar transmission wave than by the second radar transmission wave. It is thus possible for radar apparatus 10 to detect a target at a far distance in the directivity direction of first transmit antennas 107-1 by the first radar transmission wave with better reception quality (e.g., Signal to Noise Ratio (SNR)), so as to improve the target detection performance.

Although descriptions have been given, in the present embodiment, of the case where the viewing angles formed by first transmit antennas 107-1 and second transmit antennas 107-2 at least partly overlap with each other, by way of example, the present embodiment is not limited thereto. First transmit antennas 107-1 and second transmit antennas 107-2 may be antennas with different directivity directions without having a mutual viewing angle.

Further, a plurality of receive antennas 202 may, for example, be receive antennas having the same level of directional characteristics or receive antennas having different directional characteristics in the embodiment described above. For example, two types of receive antennas having respective different directional characteristics among the plurality of receive antennas 202 are called first receive antennas and second receive antennas, respectively. For example, the first receive antennas may be antennas having a directive gain increased by narrower directivity than the directivity of the second receive antennas. With this configuration of the receive antennas, radar apparatus 10 can detect an object at a far distance, for example, by the first radar transmission wave. It is thus possible to detect the target at a far distance with a better reception quality (e.g., SNR) than in the case of the second receive antennas, by a reception signal received in the directivity direction of the first receive antennas among reception signals that are reflected waves of the first radar transmission wave, so as to improve the target detection performance.

In addition, in the above-described embodiment, antennas of first transmit antennas 107-1 used for transmission of the first radar transmission wave may be those which have a directive gain increased by narrower directivity than the directivity of second transmit antennas 107-2. Further, antennas used for the first receive antennas of a plurality of receive antennas 202 may be those which have a directive gain increased by narrower directivity in the directivity direction of the first transmit antennas than the directivity of the second receive antennas. Thus, since the directivity direction of the first receive antennas overlaps with the directivity direction of the first transmit antennas, it is possible to detect the target at a far distance with a better reception quality (e.g., SNR), with the increased directive gain of the transmit antennas and receive antennas, by a reception signal received at the first receive antennas among reception signals that are reflected waves of the first radar transmission wave, so as to improve the target detection performance.

In the embodiment described above, when the distance ranges are configured so that the distance ranges where detection can be performed using the respective reception beat signals for the first radar transmission signal transmitted from transmit antenna 107-1 for the LR mode and the second radar transmission signal transmitted from transmit antenna 107-2 for the SR mode partly overlap with each other, direction estimation processing for the combination use of the SR mode and the LR mode (SR/LR-DOA) may be performed in the overlapped range of the distance detection range. This enables radar apparatus 10 to perform direction estimation processing using the reception signals for the radar transmission signals transmitted from first transmit antennas 107-1 and second transmit antennas 107-2, for example, thereby improving the array gain and also improving angular resolution, in radar apparatus 10, due to the increase of the aperture length by the virtual receive array.

Further, in the embodiment described above, radar apparatus 10 transmits the first radar transmission wave for the LR mode earlier in time than the second radar transmission wave for the SR mode, and down-mixes the radar reflected wave using the transmission chirp signal for the SR mode in the radar receiver, but the present disclosure is not limited to this. For example, radar apparatus 10 may transmit the first radar transmission wave for the LR mode by changing the frequency modulation starting frequency (or the center frequency in the frequency sweep band of a transmission chirp signal) of the second radar transmission wave for the SR mode. Radar apparatus 10, for example, may set the modulation frequency of the first radar transmission wave higher than that of the second radar transmission wave at a certain timing (e.g., the first timing) and a timing different from the first timing (e.g., the third timing). This brings the similar effect to the above (e.g., the effect of expanding the distance range where detection is possible while keeping the distance resolution) without transmitting the first radar transmission wave for the LR mode earlier in time than the second radar transmission wave for the SR mode.

Figure 11:
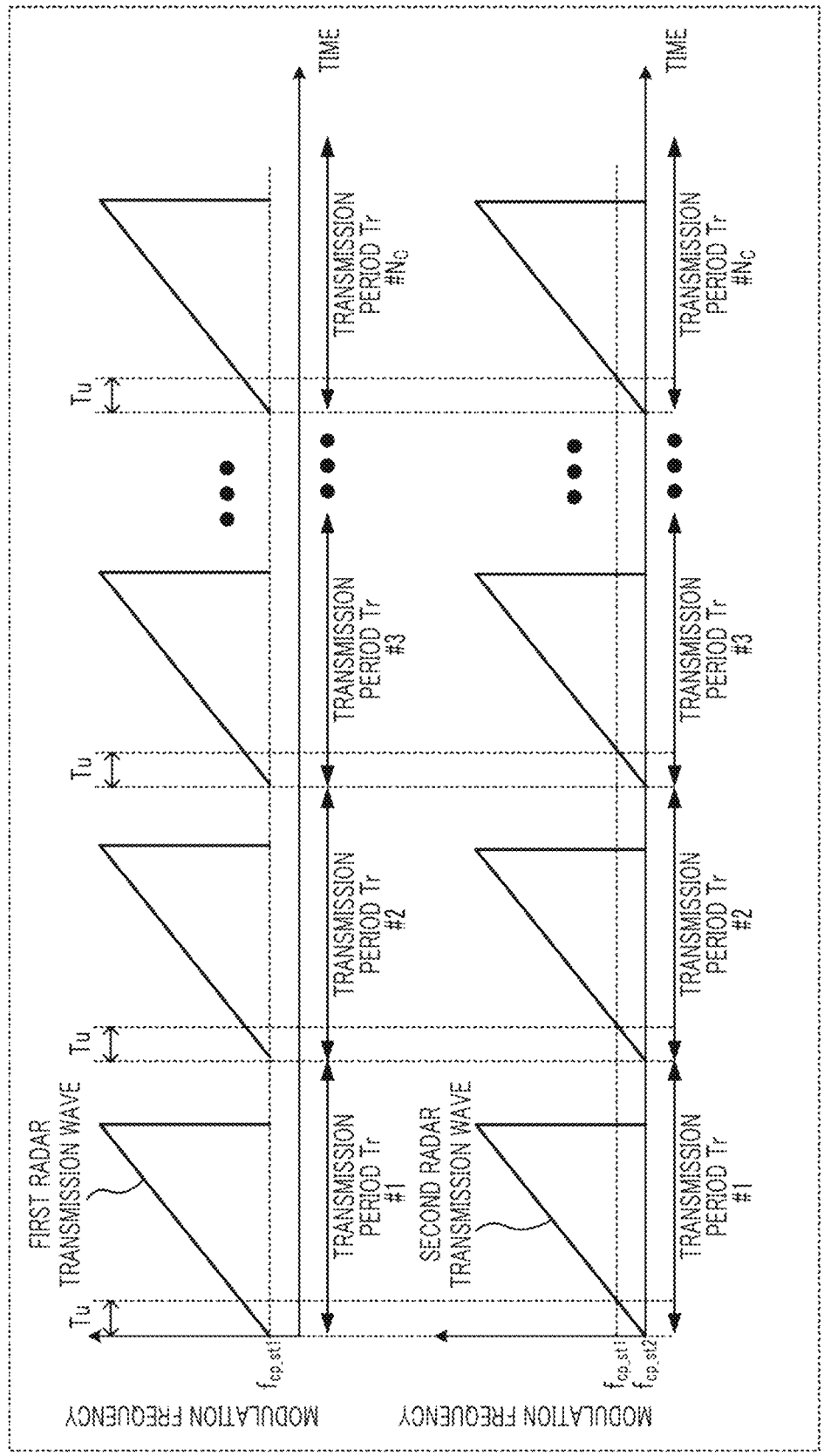
FIG. 11 illustrates another exemplary radar transmission signal according to Embodiment 1.

As illustrated in FIG. 11, the frequency modulation starting frequency of the first radar transmission wave is represented by "$f_{cp\_st1}$", and the frequency modulation starting frequency of the second radar transmission wave "$f_{cp\_st2}$" may be set so that the frequency modulation starting frequency of the second radar transmission wave is equal to "$f_{cp\_st1}$" after transmission delay time Tu has passed. In other words, $f_{cp\_st1} \neq f_{cp\_st2}$ and they may be set such that $f_{cp\_st1} = f_{cp\_st2} + Tu \times (d_{fcp}/T_{sa})$. Herein, $d_{fep}$ represents the frequency modulation sweep width at which the frequency of a chirp signal is swept per sampling period $T_{sa}$ of AD converter 207. When radar apparatus 10 down-mixes the radar transmission wave using the transmission chirp signal for the SR mode, for example, the relationship between the first radar transmission wave and the second radar transmission wave in FIG. 11 is similar to that in FIG. 2.

Alternatively, the center frequency of the radar transmission wave (the center frequency in the frequency sweep band of the transmission chirp signal) may be used in place of the frequency modulation starting frequency. When the center frequency of the first radar transmission wave is represented by "$f_{cp\_center1}$" and the center frequency of the second radar transmission wave is represented by "$f_{cp\_center2}$", for example, $f_{cp\_center1} \approx f_{cp\_center2}$ and they may be set such that $f_{cp\_center1} - f_{cp\_center2} = Tu \times (d_{fcp}/T_{sa})$.

Note that the difference between the modulation frequency of the first radar transmission wave and that of the second radar transmission wave may be set on the basis of the detection area expected for the LR mode (in other words, the distance range detected by the first radar transmission signal) in radar apparatus 10, for example.

Embodiment 2

A radar apparatus according to the present embodiment may be the same as radar apparatus 10 (e.g., FIG. 1) according to Embodiment 1.

The present embodiment is different from Embodiment 1 in a method of controlling generation of a radar transmission signal (or also referred to as a radar transmission wave) in transmission signal generation controller 104, for example.

Radar apparatus 10 may cyclically set transmission delay of the radar transmission signal, for example, per code transmission period (e.g., Loc×Tr). The setting of the transmission delay expands a Doppler range where radar apparatus 10 can perform detection, compared with Embodiment 1.

Transmission signal generation controller 104 according to the present embodiment controls, for example, generation of radar transmission signals generated in first radar-transmission-signal generator 101-1 and second radar-transmission-signal generator 101-2. For example, transmission signal generation controller 104 may control synchronization of the generation of the radar transmission signals in first radar-transmission-signal generator 101-1 and second radar-transmission-signal generator 101-2, or may control transmission timings of the radar transmission signals.

Figure 12:
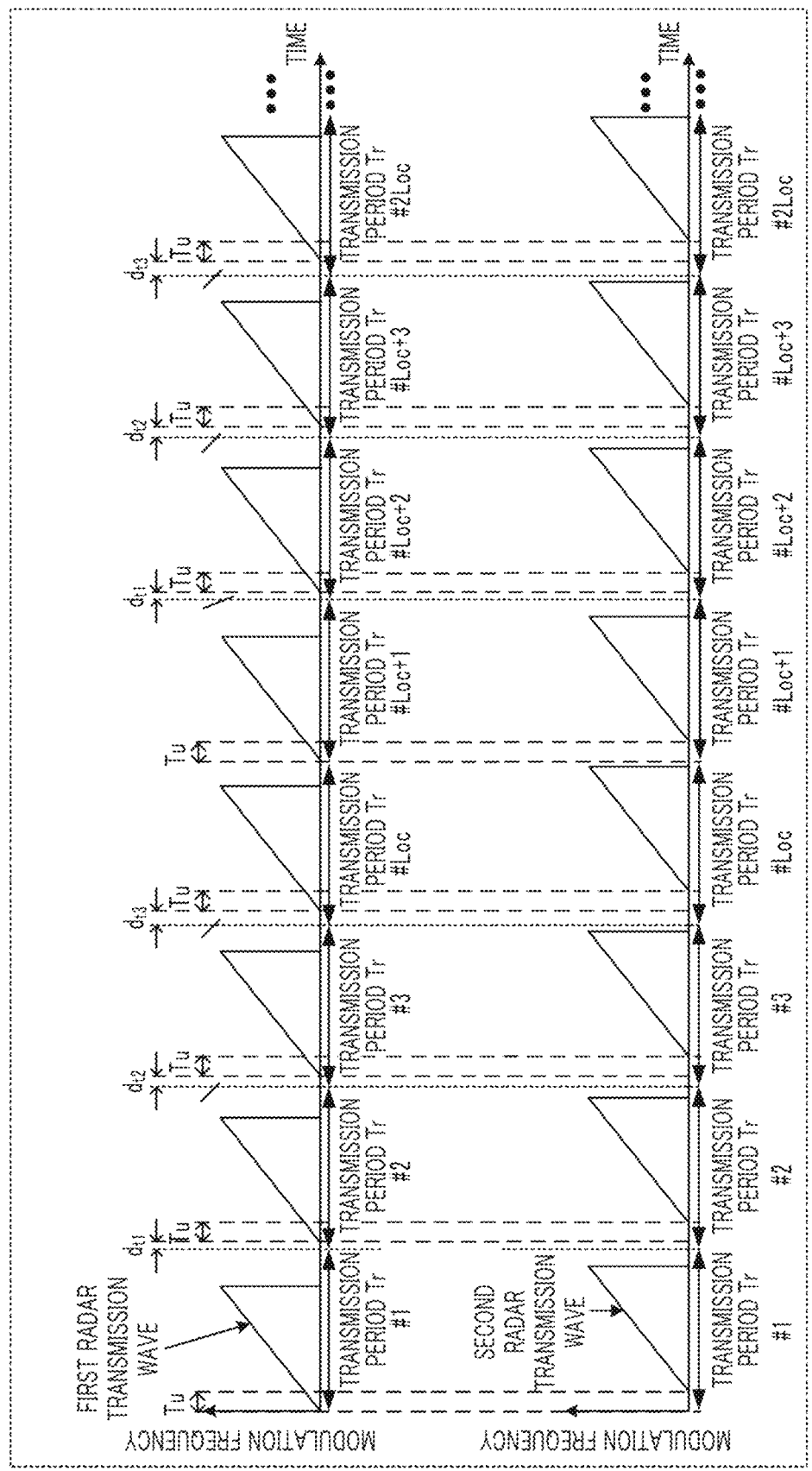
FIG. 12 illustrates an exemplary radar transmission signal according to Embodiment 2.

The upper side in FIG. 12 illustrates exemplary radar transmission signals outputted from first radar-transmission-signal generator 101-1 (e.g., the first radar transmission waves), for example, and the lower side in FIG. 12 illustrates exemplary radar transmission signals outputted from second radar-transmission-signal generator 101-2 (e.g., the second radar transmission waves).

For example, transmission signal generation controller 104 may control the output timing of the second radar transmission waves, as illustrated in FIG. 12, so as to delay by transmission delay time (also referred to as time delay) Tu with reference to the transmission timing of the first radar transmission wave outputted per transmission period Tr, as in Embodiment 1.

In addition, transmission signal generation controller 104 may cyclically set transmission delays $d_{t1}, d_{t2}, \ldots, d_{tLoc-1}$ for the first radar transmission wave and the second radar transmission wave, for example, per code transmission period (e.g., Loc×Tr). The setting of transmission delay $d_t$ causes, for example, the first radar transmission wave and the second radar transmission wave to be transmitted per transmission period Tr after respectively set transmission delays $d_{t1}, d_{t2}, \ldots, d_{tLoc-1}$ have passed, as illustrated in FIG. 12.

That is, the first radar transmission wave and the second radar transmission wave are set with any of transmission delays $d_{t1}, d_{t2}, \ldots, d_{tLoc-1}$ per transmission period Tr. Note that any one of transmission delays $d_{t1}, d_{t2}, \ldots, d_{tLoc-1}$ may be set to 0, and a non-zero value may be set for at least one of the transmission delays.

Next, exemplary operations of radar receiver 200 will be described.

Hereinafter, an example of the aliasing determination processing of aliasing determiner 212 will be described.

Here, by way of example, a description will be given of a case where number $N_{CM}$ of code multiplexing=3, and code generator 105 uses three orthogonal codes $Code_1 = WH_4(3) = [1, 1, -1, -1]$, $Code_2 = WH_4(4) = [1, -1, -1, 1]$, and $Code_3 = WH_4(2) = [1, -1, 1, -1]$ among the Walsh-Hadamard codes with code length Loc=4.

For example, aliasing determiner 212 uses, for the aliasing determination, one ($=N_{allcode} - N_{CM}$) unused orthogonal code among the $N_{allcode} = 4$ Walsh-Hadamard codes with code length Loc=4. For example, when number $N_{CM}$ of code multiplexing=3 and the codes for code multiplexing transmission determined by code generator 105 are $Code_1 = WH_4(3) = [1, 1, -1, -1]$, $Code_2 = WH_4(4) = [1, -1, -1, 1]$, and $Code_3 = WH_4(2) = [1, -1, 1, -1]$, the unused orthogonal code is $UnCode_1 = WH_4(1) = [1, 1, 1, 1]$.

For example, since Doppler analyzers 210 apply FFT processing to each code element as described above when radar apparatus 10 performs code multiplexing transmission using orthogonal codes with code length Loc=4, the FFT processing is performed using the output from beat frequency analyzer 208 per (Loc×Tr)=(4×Tr) periods. Thus, the Doppler range in which the sampling theorem does not cause aliasing in Doppler analyzer 210 is $\pm 1/(2Loc \times Tr) = \pm 1/(8 \times Tr)$.

Aliasing determiner 212 may perform the determination of aliasing in the range greater by a factor of (code length Loc of the orthogonal code sequences×2), for example, than the range of the Doppler analysis in Doppler analyzers 210 (Doppler range). For example, aliasing determiner 212 performs the aliasing determination processing on the assumption of the Doppler range=±1/Tr which is 8 (=2Loc) times greater than the Doppler range±1/(2Loc×Tr)(=±1/(8×Tr)) in which no aliasing is caused in Doppler analyzer 210.

Figure 13A:
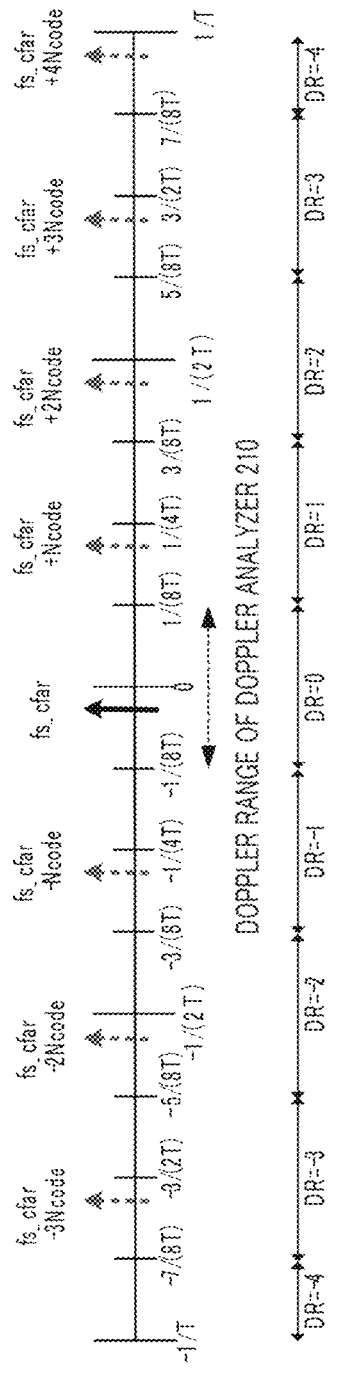
FIGS. 13A and 13B illustrate examples of Doppler aliasing determination according to Embodiment 2.
Figure 13B:
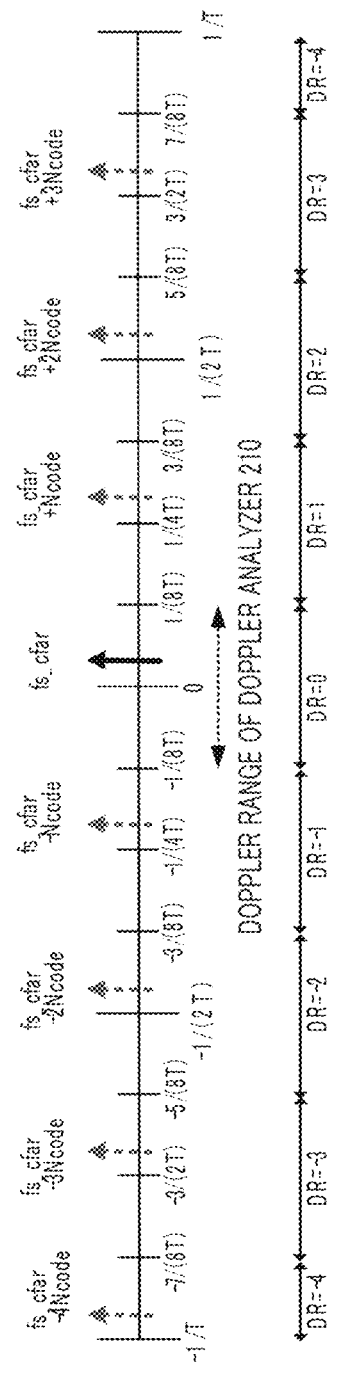

Here, Doppler components $VFT_z^{noc}(f_{b\_cfar}, f_{s\_cfar})$, which are the outputs of Doppler analyzers 210 corresponding to distance indexes $f_{b\_cfar}$ and Doppler frequency indexes $f_{s\_cfar}$ extracted in CFAR section 211, may contain a Doppler component including aliasing as illustrated in FIG. 13A and FIG. 13B, for example, in the Doppler Range of +1/Tr.

For example, when $f_{s\_cfar} < 0$ as illustrated in FIG. 13A, the Doppler component in the Doppler range of +1/Tr may be any of eight (=2Loc) Doppler components of $f_{s\_cfar} - 3Ncode$, $f_{s\_cfar} - 2Ncode$, $f_{s\_cfar} - Ncode$, $f_{s\_cfar}$, $f_{s\_cfar} + Ncode$, $f_{s\_cfar} + 2Ncode$, $f_{s\_cfar} + 3Ncode$, and $f_{s\_cfar} + 4Ncode$.

In addition, when $f_{s\_cfar} > 0$ as illustrated in FIG. 13B, for example, the Doppler component in the Doppler range of #1/Tr may be any of eight (=2Loc) Doppler components of $f_{s\_cfar} - 4Ncode$, $f_{s\_cfar} - 3Ncode$, $f_{s\_cfar} 2Ncode$, $f_{s\_cfar} - Ncode$, $f_{s\_cfar}$, $f_{s\_cfar} + Ncode$, $f_{s\_cfar} + 2Ncode$, and $f_{s\_cfar} + 3Ncode$. These possible (eight (=2Loc) of) Doppler components for $f_{s\_cfar}$ are referred to as Doppler component candidates for $f_{s\_cfar}$.

Aliasing determiner 212 performs code demultiplexing processing in the Doppler range of +1/Tr as illustrated in FIGS. 13A and 13B, for example, using an unused orthogonal code. For example, aliasing determiner 212 may correct, for the unused orthogonal code, the phase change corresponding to eight (=2Loc) Doppler components including aliasing as illustrated in FIGS. 13A and 13B.

Then, aliasing determiner 212 determines whether or not each Doppler component is a true Doppler component, for example, based on the received power of the Doppler component that is code-demultiplexed based on the unused orthogonal code. For example, aliasing determiner 212 may detect the Doppler component having the minimum received power among the Doppler component candidates for $f_{s\_cfar}$, and determine the detected Doppler component as the true Doppler component. In other words, aliasing determiner 212 may determine that the Doppler components having other levels of received power different from the minimum received power among the Doppler component candidates for $f_{s\_cfar}$ are false Doppler components.

This aliasing determination processing makes it possible to reduce ambiguity in the Doppler range of +1/Tr (in other words, possible to solve the ambiguity). In addition, this aliasing determination processing makes it possible to expand the range in which the Doppler frequency can be detected without ambiguity to a range of from −1/(Tr) to less than 1/(Tr), which is greater than the Doppler range (e.g., of from −1/(8Tr) to less than 1/(8Tr)) in Doppler analyzer 210.

For example, by the code demultiplexing based on the unused orthogonal code, the phase change of the true Doppler component is corrected appropriately, and the orthogonality between the orthogonal codes for code multiplexing transmission and the unused orthogonal code is maintained. The unused orthogonal code and the code-multiplexed transmission signals are thus uncorrelated, and the received power becomes as low as a noise level.

Meanwhile, the phase change of the false Doppler component is erroneously corrected, and the orthogonality between the orthogonal codes for code multiplexing transmission and the unused orthogonal code is not maintained. Thus, since a correlated component (interference component) between the unused orthogonal code and the code-multiplexed transmission signals is caused, the received power greater than the noise level can be detected, for example.

Therefore, as described above, aliasing determiner 212 may determine the Doppler component having the minimum received power as the true Doppler component among the Doppler component candidates for $f_{s\_cfar}$ that are code-demultipelxed based on the unused orthogonal code, and determine that the other Doppler components having received power different from the minimum received power are the false Doppler components.

For example, aliasing determiner 212 corrects the phase change according to each Doppler component of the Doppler component candidates for $f_{s\_cfar}$ based on the outputs of Doppler analyzers 210 in each of antenna system processors 201, and calculates, according to following Expression 59, received power $DeMulUnCode_{nuc}(f_{b\_cfar}, f_{s\_cfar}, DR)$ after code demultiplexing using unused orthogonal code $UnCode_{nuc}$:

(Expression 59)
$$DeMul\,UnCode_{nuc}(f_{b\_cfar}, f_{s\_cfar}, DR) = \sum_{z=1}^{Na}\left|(UnCode_{nuc})^* \cdot \{\beta_{dt}(DR) \otimes \alpha_{dt}(f_{s\_cfar}) \otimes VFTALL_z(f_{b\_cfar}, f_{s\_cfar})\}^T\right|^2.$$

In Expression 59, with respect to the outputs of Doppler analyzers 210 in all of antenna system processors 201, the sum of the received powers after the code demultiplexing using unused orthogonal code $UnCode_{nuc}$ is calculated, thereby increasing the aliasing determination accuracy even when the reception signal level is low. However, instead of Expression 59, with respect to the outputs of Doppler analyzers 210 in some of antenna system processors 201, the received power after code demultiplexing using the unused orthogonal code may be calculated. Even in this case, it is possible to reduce the arithmetic processing amount while maintaining the accuracy of aliasing determination, for example, as long as the reception signal level is sufficiently high.

Note that, nuc=1, . . . , $N_{allcode}$−NOM in Expression 59. Further, DR is an index indicating the Doppler aliasing range, and takes an integer value in the range of DR=−Loc, −Loc+1, . . . , 0, . . . , Loc−1, for example. Here, DR corresponds to the correction of phase change according to each Doppler component of the Doppler component candidates for $f_{s\_cfar}$.

In addition, in Expression 59,
operator "⊗"
represents a product between elements of vectors having the same number of elements. For example, for nth order vectors A=[$a_1$, . . . , $a_n$] and B=[$b_1$, . . . , $b_n$], the products between the elements are expressed as follows:

$$A \otimes B = [a_1, \ldots, a_n] \otimes [b_1, \ldots, b_n] = [a_1 b_1, \ldots, a_n b_n].$$

Further, in Expression 59,
operator "•"
represents a vector dot product operator. Moreover, in Expression 59, superscript "T" represents vector transposition, and superscript "*" (asterisk) represents a complex conjugate operator.

In Expression 59, $\alpha_{dt}(f_{s\_cfar})$ represents a "Doppler phase correction vector." When Doppler frequency index $f_{s\_cfar}$ extracted in CFAR section 211 is within the output range (in other words, Doppler range) of Doppler analyzer 210 that includes no Doppler aliasing, for example, Doppler phase correction vector $\alpha_{dt}(f_{s\_cfar})$ corrects the Doppler phase rotation caused by the time difference in the Doppler analysis between Loc Doppler analyzers 210. For example, Doppler phase correction vector $\alpha_{dt}(f_{s\_cfar})$ is expressed by following Expression 60:

(Expression 60)
$$\alpha_{dt}(f_{s\_cfar}) = \left[1, \exp\left\{-j\frac{2\pi f_{s\_cfar}}{N_{code}}\left(\frac{T_r + dt_1}{LocT_r}\right)\right\}, \exp\left\{-j\frac{2\pi f_{s\_cfar}}{N_{code}}\left(\frac{2T_r + dt_2}{LocT_r}\right)\right\}, \ldots, \exp\left\{-j\frac{2\pi f_{s\_cfar}}{N_{code}}\left(\frac{(Loc-1)T_r + dt_{Loc-1}}{LocT_r}\right)\right\}\right].$$ [77]

For example, Doppler phase correction vector $\alpha_{dt}(f_{s\_cfar})$ given by Expression 60 is a vector having, as an element, a Doppler phase correction coefficient used to correct phase rotations of Doppler components with Doppler frequency indexes $f_{s\_cfar}$ resulting from the respective time delays of Tr+$d_{t1}$, 2Tr+$d_{t2}$, . . . , (Loc−1)Tr+$d_{tLoc-1}$ of output $VFT_z^2(f_{b\_cfar}, f_{s\_cfar})$ of second Doppler analyzer 210 to output $VFT_z^{Loc}(f_{b\_cfar}, f_{s\_cfar})$ of Locth Doppler analyzer 210, for example, with reference to the Doppler analysis time of output $VFT_z^1(f_{b\_cfar}, f_{s\_cfar})$ of first Doppler analyzer 210.

Further, in Expression 59, Bat (DR) represents an "aliasing phase correction vector." Aliasing phase correction vector Bat (DR) corrects, considering the case where Doppler aliasing is present, the Doppler phase rotation of an integer multiple of $2\pi$ among the Doppler phase rotations caused by the time differences in the Doppler analyses of Loc Doppler analyzers 210, for example.

For example, aliasing phase correction vector Bar(DR) is expressed by following Expression 61:

(Epression 61)

$$\beta_{dt}(DR) = \left[1, \exp\left(-j2\pi DR\left(\frac{T_r + dt_1}{LocT_r}\right)\right), \exp\left(-j2\pi DR\left(\frac{2T_r + dt_2}{LocT_r}\right)\right), \ldots, \exp\left(-j2\pi DR\left(\frac{(Loc-1)T_r + dt_{Loc-1}}{LocT_r}\right)\right)\right].$$ [78]

In Expression 61, DR is an index indicating the Doppler aliasing range, and takes an integer value in the range of DR=−Loc, −Loc+1, . . . , 0, . . . , Loc−1.

For example, Doppler phase correction vector $\beta_{dt}(DR)$ given by Expression 61 is a vector having, as an element, a Doppler phase correction coefficient used to correct phase rotations of an integer multiple of $2\pi$ considering the respective time delays of $Tr+d_{t1}$, $2Tr+d_{t2}$, . . . , $(Loc-1)Tr+d_{tLoc-1}$ of output $VFT_z^2(f_{b\_cfar}, f_{s\_cfar})$ of second Doppler analyzer 210 to output $VFT_z^{Loc}(f_{b\_cfar}, f_{s\_cfar})$ of Locth Doppler analyzer 210, for example, with reference to the Doppler analysis time of output $VFT_z^1(f_{b\_cfar}, f_{s\_cfar})$ of first Doppler analyzer 210. Such phase corrections by Doppler phase correction vector $\alpha_{dt}(f_{s\_cfar})$ and Doppler phase correction vector $\beta_{dt}(DR)$ correspond to the correction of phase change according to each Doppler component of the Doppler component candidates for $f_{s\_cfar}$.

In the present embodiment, transmission delays $d_{t1}, d_{t2}, \ldots, d_{tLoc-1}$ are cyclically set per code transmission period (e.g., Loc×Tr), for example, and $\alpha_{dt}(f_{s\_cfar})$ and $\beta_{dt}(DR)$ are thus different from $\alpha(f_{s\_cfar})$ (e.g., Expression 24) and $\beta(DR)$ (e.g., Expression 25) in Embodiment 1. The cyclic setting of transmission delays $d_{t1}, d_{t2}, \ldots, d_{tLoc-1}$ per code transmission period, for example, possibly enables to obtain values of different phase correction coefficients (e.g., $\alpha_{dt}(f_{s\_cfar})$ and $\beta_{dt}(DR)$) in the range of DR=−Loc, −Loc+1, . . . , 0, . . . , Loc−1, in the present embodiment. This enables aliasing determination in a wider Doppler range than that in Embodiment 1, in the present embodiment.

In the case of Loc=4, for example, when DR=−4, −3, −2, −1, 0, 1, 2, 3 of integer values and transmission delays $d_{t1}, d_{t2}, \ldots, d_{tLoc-1}$ are not cyclically set per code transmission period, $\beta(DR)$ is possibly an overlapped phase correction value as in following Expression 62:

(Epression 62)

$$\beta_{dt}(-4) = \beta(0), \beta(-3) = \beta(1), \beta(2) = \beta(-2), \beta(3) = \beta(-1).$$ [79]

Meanwhile, when transmission delays $d_{t1}, d_{t2}, \ldots, d_{tLoc-1}$ are cyclically set per code transmission period, $\beta(DR)$ is represented by following Expression 63:

(Epression 63)

$$\beta_{dt}(DR) = \beta(DR) \otimes \left[1, \exp\left(-j2\pi DR\left(\frac{dt_1}{LocT_r}\right)\right), \exp\left(-j2\pi DR\left(\frac{dt_2}{LocT_r}\right)\right), \ldots, \exp\left(-j2\pi DR\left(\frac{dt_{Loc-1}}{LocT_r}\right)\right)\right].$$ [80]

In Expression 63, for example, when each of transmission delays $d_{t1}, d_{t2}, \ldots, dt_{Loc-1}$ is set to a value of 0.5 Tr or less in the range of DR=−Loc, −Loc+1, . . . , 0, . . . , Loc−1, different phase rotations within $2\pi$ are respectively given to $\beta(DR)$ in the variable range of DR, and thus each $\beta_{dt}(DR)$ is set to a phase correction values different one another. This enables aliasing determiner 212 to determine aliasing in the range of DR=−Loc, −Loc+1, . . . , 0, . . . , Loc−1 (in other words, the range equal to or greater than −1/(Tr) and less than 1/(Tr)).

Note that the smaller the set value for each of transmission delays $d_{t1}, d_{t2}, \ldots, d_{tLoc-1}$ is, the smaller the phase difference at a phase correction value becomes, for example, and the aliasing determination accuracy is possibly lowered. The greater the set value for each of transmission delays $d_{t1}, d_{t2}, \ldots, d_{tLoc-1}$ is, however, the longer the transmission time of a radar transmission signal could be. The set value for each of transmission delays $d_{t1}, d_{t2}, \ldots, d_{tLoc-1}$ may be a value approximately from 0.1 Tr to 0.25 Tr as an example.

For example, when Loc=4, the Doppler range (e.g., −⅛Tr to +⅛Tr) in which the Doppler component with Doppler frequency index $f_s$ efar as the output of Doppler analyzer 210 is detected, corresponds to DR=0 in FIG. 13A or 13B. In addition, the Doppler component in the Doppler range corresponding to each DR may be calculated with respect to the Doppler phase rotations (e.g., $2\pi \times DR$, DR=−4, −3, −2, −1, 1, 2, 3) with Doppler frequency index $f_{s\_cfar}$ for DR=0 by integer multiples of $2\pi$.

For example, in accordance with Expression 59, aliasing determiner 212 calculates, within the ranges of DR=−Loc, −Loc+1, . . . , 0, . . . , Loc−1, respective received powers DeMulUnCode$_{nuc}$ ($f_{b\_cfar}, f_{s\_cfar}$, DR) after the code demultiplexing using unused orthogonal code UnCode$_{nuc}$ that has corrected the phase changes of the Doppler components including aliasing.

Then, aliasing determiner 212 detects the DR in which received power DeMulUnCode$_{nuc}$($f_{b\_cfar}, f_{s\_cfar}$, DR) is minimum among the ranges of DR. In the following, as given by following Expression 64, the DR in which received power DeMulUnCode$_{nuc}$($f_{b\_cfar}, f_{s\_cfar}$, DR) is minimum among the ranges of DR is represented as "DR$_{min}$":

(Epression 64)

$$DR\text{min} = \left\{ argDR \bigg|_{DR=-Loc, \ldots, Loc-1}^{\min} DeMulUnCode_{nuc}(f_{b\_cfar}, f_{s\_cfar}, DR) \right\}.$$ [81]

Note that, when there are a plurality of unused qjorthogonal codes UnCode$_{nuc}$, received power DeMulUnCodeAll ($f_{b\_cfar}, f_{s\_cfar}$, DR) after code demultiplexing using all the unused orthogonal codes as given by following Expression 65 may be used instead of received power DeMulUnCode$_{nuc}$ ($f_{b\_cfar}, f_{s\_cfar}$, DR):

(Epression 65)

$$DeMulUnCodeAll(f_{b\_cfar}, f_{s\_cfar}, DR) = \sum_{nun=1}^{N_{allcode}} DeMulUnCode_{nun}(f_{b\_cfar}, f_{s\_cfar}, DR). \quad [82]$$

Obtaining the received power after the code demultiplexing using all the unused orthogonal codes makes it possible for aliasing determiner 212 to increase the accuracy of the aliasing determination even when the reception signal level is low.

For example, aliasing determiner 212 calculates DeMulUnCodeAll($f_{b\_cfar}$, $f_{s\_cfar}$, DR) in each of the ranges of DR=−Loc, −Loc+1, . . . , 0, . . . , Loc−1, and detects the DR (in other words, $DR_{min}$) in which received power DeMulUnCodeAll($f_{b\_cfar}$, $f_{s\_cfar}$, DR) is minimum. When Expression 65 is used, the DR which provides the minimum received power in the DR range is represented as "$DR_{min}$" as given by following Expression 66:

(Epression 66)

$$DRmin = \left\{ argDR \bigg|_{DR=-Loc,\ldots,Loc-1} \min DeMulUnCodeAll(f_{b\_cfar}, f_{s\_cfar}, DR) \right\}. \quad [83]$$

Further, for example, aliasing determiner 212 may perform processing of comparing minimum received power DeMulUnCode$_{nuc}$($f_{b\_cfar}$, $f_{s\_cfar}$, $DR_{min}$) after code demultiplexing using unused orthogonal code UnCode$_{nuc}$ with received power, and determining (in other words, measuring) the certainty of the aliasing determination. In this case, aliasing determiner 212 may determine the certainty of the aliasing determination in accordance with following Expressions 67 and 68, for example:

(Epression 67)

$$DeMulUnCode_{nuc}(f_{b\_cfar}, f_{s\_cfar}, DR_{min}) < \quad [84]$$
$$Threshold_{DR} \times PowerFT(f_{b\_cfar}, f_{s\_cfar});$$

(Epression 68)

$$DeMulUnCode_{nuc}(f_{b\_cfar}, f_{s\_cfar}, DR_{min}) \geq \quad [85]$$
$$Threshold_{DR} \times PowerFT(f_{b\_cfar}, f_{s\_cfar}).$$

For example, when minimum received power DeMulUnCode$_{nuc}$($f_{b\_cfar}$, $f_{s\_cfar}$, $DR_{min}$) after code demultiplexing using unused orthogonal code UnCode$_{nuc}$ is smaller (e.g., Expression 67) than a value obtained by multiplying, by predetermined value Threshold$_{DR}$, received power value PowerFT($f_{b\_cfar}$, $f_{s\_cfar}$) corresponding to distance index $f_{b\_cfar}$ and Doppler frequency index $f_{s\_cfar}$ extracted in CFAR section 211, aliasing determiner 212 determines that the aliasing determination is sufficiently certain. In this case, radar apparatus 10 may perform, for example, subsequent processing (e.g., code demultiplexing processing).

Meanwhile, for example, aliasing determiner 212 determines that the accuracy of the aliasing determination is not sufficient (for example, determines the component as a noise component) when minimum received power DeMulUnCode$_{nuc}$($f_{b\_cfar}$, $f_{s\_cfar}$, $DR_{min}$) after code demultiplexing using unused orthogonal code UnCode$_{nuc}$ is equal to or greater than the value obtained by multiplying received power value PowerFT($f_{b\_cfar}$, $f_{s\_cfar}$) by Threshold$_{DR}$ (for example, Expression 68). In this case, for example, radar apparatus 10 may not perform subsequent processing (e.g., code demultiplexing processing).

Such processing makes it possible to reduce a determination error in aliasing determination in aliasing determiner 212 and to remove a noise component. Note that, predetermined value Threshold$_{DR}$ may, for example, be set within a range of from 0 to less than 1. By way of example, considering inclusion of a noise component, Threshold$_{DR}$ may be set in a range of approximately from 0.1 to 0.5.

Note that the calculation formula for received power DeMulUnCode$_{nuc}$($f_{b\_cfar}$, $f_{s\_cfar}$, DR) after code demultiplexing using unused orthogonal code UnCode$_{nuc}$ may be following Expression 69 instead of Expression 59, for example:

(Epression 69)

$$DeMulUnCode_{nuc}(f_{b\_cfar}, f_{s\_cfar}, DR_{min}) = \sum_{z=1}^{Na} \quad [86]$$
$$\left| (\beta_{dt}(DR) \otimes UnCode_{nuc})^* \cdot \{\alpha_{dt}(f_{s\_cfar}) \otimes VFTALL_z(f_{b\_cfar}, f_{s\_cfar})\}^T \right|^2.$$

In Expression 69, the term $$\beta_{dt}(DR) \otimes UnCode_{nuc} \quad [87]$$

does not depend on index (Doppler frequency index) $f_s$ of a Doppler component, and it is thus possible to reduce the arithmetic amount in aliasing determiner 212, for example, by pre-tabulation.

The operation example of aliasing determiner 212 has been described above.

Code demultiplexer 213 performs demultiplexing processing of a code multiplexed signal based on the aliasing determination result in aliasing determiner 212 and the codes for code multiplexing transmission.

For example, as given by following Expression 70, code demultiplexer 213 performs, based on aliasing phase correction vector $\beta_{dt}(DR_{min})$ using $DR_{min}$ that is the aliasing determination result in aliasing determiner 212, code demultiplexing processing on Doppler components VFTALL$_z$ ($f_{b\_cfar}$, $f_{s\_cfar}$) that are the outputs of Doppler analyzers 210 corresponding to distance indexes $f_{b\_cfar}$ and Doppler frequency indexes $f_{s\_cfar}$ extracted by CFAR section 211:

(Epression 70)

$$DeMUL_z^{ncm}(f_{b\_cfar}, f_{s\_cfar}) = \quad [88]$$
$$(Code_{ncm})^* \cdot \{\beta_{dt}(DRmin) \otimes \alpha_{dt}(f_{s\_cfar}) \otimes VFTALL_z(f_{b\_cfar}, f_{s\_cfar})\}^T.$$

Since aliasing determiner 212 can determine an index that is a true Doppler aliasing range within the Doppler range of from −1/Tr to less than 1/Tr (in other words, can determine the index such that $DR_{min}=DR_{true}$), code demultiplexer 213 can set the correlation value between the orthogonal codes used for code multiplexing to zero in the Doppler range of from −1/Tr to less than 1/Tr, thereby enabling the demultiplexing processing in which the interference between the code multiplexed signals is suppressed.

Here, $\text{DeMul}_z^{ncm}$ ($f_{b\_cfar}$, $f_{s\_cfar}$) is an output (e.g., code demultiplexing result) resulting from code demultiplexing of a code multiplexed signal using orthogonal code $\text{Code}_{ncm}$ corresponding to the output of distance index $f_{b\_cfar}$ and Doppler frequency index $f_{s\_cfar}$ of Doppler analyzer 210 in zth antenna system processor 201. Note that, z=1, . . . , Na, and ncm=1, . . . , $N_{CM}$.

Note that, code demultiplexer 213 may use following Expression 71 instead of Expression 70:

(Epression 71)

$$DeMUL_z^{ncm}(f_{b\_cfar}, f_{s\_cfar}) = $$
$$(\beta_{dt}(DR\min) \otimes Code_{ncm})^* \cdot \{a_{dt}(f_{s\_cfar}) \otimes VFTALL_z(f_{b\_cfar}, f_{s\_cfar})\}^T. \quad [89]$$

In Expression 71, the term $$\beta_{dt}(DR) \otimes Code_{ncm} \quad [90]$$

(where, $DR=DR_{min}$ in Expression 71) does not depend on index (e.g., Doppler frequency index) $f_s$ of the Doppler component, and it is thus possible to reduce the arithmetic amount in code demultiplexer 213, for example, by pre-tabulation.

Through the code demultiplexing processing as described above, radar apparatus 10 can obtain a signal resulting from demultiplexing of a signal code-multiplexed and transmitted using orthogonal code $Code_{ncm}$ applied to ncmth transmit antenna Tx #ncm based on the aliasing determination result of aliasing determiner 212 assuming a Doppler range of +1/Tr that is 2Loc times greater than Doppler range±1/(2Loc×Tr) in which the aliasing is not caused in Doppler analyzer 210.

In addition, radar apparatus 10 performs, on the output of Doppler analyzer 210 for each code element, Doppler phase correction (for example, processing based on aliasing phase correction vector $\beta_{dt}(DR_{min})$) considering Doppler aliasing, for example, during code demultiplexing processing. Mutual interference between code multiplexed signals can thus be reduced, for example, as low as a noise level. In other words, radar apparatus 10 can reduce inter-code interference and suppress the effect on degradation of the detection performance of radar apparatus 10.

Note that, in Expression 71, the term $$\alpha_{dt}(f_{s\_cfar}) \otimes VFTALL_z(f_{b\_cfar}, f_{s\_cfar}) \quad [91]$$

is commonly used in aliasing determiner 212 and code demultiplexer 213. In this regard, radar apparatus 10*b* illustrated in FIG. 10, for example, includes phase corrector 216 and may output, to aliasing determiner 212*b* and code demultiplexer 213*b*, output $$\alpha_{dt}(f_{s\_cfar}) \otimes VFTALL_z(f_{b\_cfar}, f_{s\_cfar}) \quad [92]$$

obtained by multiplying Doppler component $VFTALL_z(f_{b\_cfar}, f_{s\_cfar})$ by Doppler phase correction vector $\alpha_{dt}(f_{s\_cfar})$. Aliasing determiner 212*b* and code demultiplexer 213*b* need not redundantly calculate the term $$\alpha_{dt}(f_{s\_cfar}) \otimes VFTALL_z(f_{b\_cfar}, f_{s\_cfar}) \quad [93]$$

and it is thus possible to reduce redundant arithmetic processing of the term in radar apparatus 10*b*.

The operation example of code demultiplexer 213 has been described above.

As described above, in the present embodiment, radar apparatus 10 transmits the first radar transmission wave for the LR mode earlier in time than the second radar transmission wave for the SR mode, and down-mixes the radar reflected wave using the second radar transmission wave for the SR mode in the radar receiver, for example, as in Embodiment 1. This enables radar apparatus 10 to detect in a greater distance by the first radar transmission wave for the LR mode compared to the SR mode. In other words, radar apparatus 10 can expand the distance range where detection with the LR mode is possible, while keeping distance resolution based on a chirp signal for the SR mode. For example, the distance range where detection with the LR mode is possible can be expanded up to twice, or three times taking aliasing into account, as large as the distance range where detection with the SR mode is possible.

In addition, radar apparatus 10 performs code multiplexing transmission by cyclically providing transmission delays $d_{t1}, d_{t2}, \ldots, d_{tLoc-1}$ per code transmission period (Loc×Tr) using, for example, orthogonal code sequences with a code length capable of generating more orthogonal codes than the number of code multiplexing transmissions, in the present embodiment.

This enables radar apparatus 10 to determine Doppler aliasing for a reception signal (e.g., output of each of Doppler analyzers 210 per code element of a code multiplexed signal), for example, using an orthogonal code that is unused for the code multiplexing transmission. Cyclically providing transmission delays $d_t, d_{t2}, \ldots, d_{tLoc-1}$ per code transmission period (Loc×Tr), for example, expands a Doppler range where aliasing determiner 212 can perform detection twice as large as that in Embodiment 1.

Further, radar apparatus 10 can, for example, set the Doppler range where it is possible to perform detection without ambiguity to +1/Tr and reduce mutual interference between code multiplexed signals as low as a noise level, by performing the Doppler phase correction considering aliasing during code demultiplexing based on the determination result of the aliasing. Thus, the code multiplexing transmission of the MIMO radar is possible while preventing degradation of radar detection performance. This enables to expand a Doppler detection range twice as large as that in Embodiment 1, for example, while keeping the Doppler resolution based on the first radar transmission wave or the second radar transmission wave, in the present embodiment.

Note that, in the present embodiment, radar apparatus 10 transmits the first radar transmission wave for the LR mode earlier in time than the second radar transmission wave for the SR mode, and down-mixes the radar reflected wave using the transmission chirp signal for the SR mode in the radar receiver, but the present disclosure is not limited to this. For example, radar apparatus 10 may apply the present embodiment in a case of transmitting using the first radar transmission wave (i.e., a case of not transmitting the second radar transmission wave) or a case of transmitting using the second radar transmission wave (i.e., a case of not transmitting the first radar transmission wave). This, for example, also expands the Doppler range where aliasing determiner 212 can perform detection twice as large as that in Embodiment 1. By performing the Doppler phase correction considering aliasing during code demultiplexing based on this determination result, Radar apparatus 10 can, for example, set the Doppler range where it is possible to perform detection without ambiguity to ±1/Tr and reduce mutual interference between code multiplexed signals as low as a noise level. Thus, the code multiplexing transmission of the MIMO radar is possible while preventing degradation of radar detection performance.

Further, the description has been given of the case of combining the setting of transmission delays (e.g., $d_t$, $d_{t2}$, . . . , $d_{tLoc-1}$) and the operation in Embodiment 1 (e.g., application of transmission delay time Tu) in the present embodiment, but the setting of the transmission delays need not be combined with Embodiment 1. For example, radar apparatus 10 may set the transmission timings (frequency modulation starting frequency or center frequency) of the first radar transmission wave and the second radar transmission wave to equal, and may cyclically set the transmission delays per code transmission period. In other words, radar apparatus 10 may set transmission delay $d_t$ without setting transmission delay time Tu. This case also enables radar apparatus 10 to expand the Doppler frequency range where it is possible to perform detection without ambiguity.

Each embodiment according to the present disclosure has been described, thus far.

In the radar apparatus according to an exemplary embodiment of the present disclosure, the radar transmitter and the radar receiver may be individually arranged in physically separate locations. Further, in the radar receiver according to an exemplary embodiment of the present disclosure, the direction estimator and the other components may be individually arranged in physically separate locations.

The radar apparatus according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip.

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

The expression "section" used in the above-described embodiments may be replaced with another expression such as "circuit (circuitry)," "device," "unit," or "module."

The above embodiments have been described with an example of a configuration using hardware, but the present disclosure can be realized by software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

SUMMARY OF THE DISCLOSURE

A radar apparatus according to an embodiment of the present disclosure includes signal generation circuitry, which, in operation, generates a first transmission signal and a second transmission signal; and transmission circuitry, which, in operation, transmits a multiplexed signal resulting from code-multiplexing the first transmission signal and the second transmission signal, wherein a modulation frequency of the first transmission signal at a first timing is identical to a modulation frequency of the second transmission signal at a second timing that is later than the first timing.

In an embodiment of the present disclosure, the radar apparatus further includes reception circuitry, which, in operation, down-mixes a reflected wave signal being the multiplexed signal reflected by an object, using the second transmission signal.

In an embodiment of the present disclosure, the first transmission signal and the second transmission signal are chirp signals.

In an embodiment of the present disclosure, a transmission start timing of the first transmission signal is earlier than a transmission start timing of the second transmission signal.

In an embodiment of the present disclosure, the modulation frequency of the first transmission signal is higher than the modulation frequency of the second transmission signal at the first timing and a third timing that is different from the first timing.

In an embodiment of the present disclosure, a difference between the modulation frequency of the first transmission signal and the modulation frequency of the second transmission signal at the third timing is set based on a distance range where detection is performed using the first transmission signal.

In an embodiment of the present disclosure, a difference between the first timing and the second timing is set based on a distance range where detection is performed using the first transmission signal.

In an embodiment of the present disclosure, a difference between the first timing and the second timing varies for each positioning.

In an embodiment of the present disclosure, a frequency sweep width of at least one of the chirp signals varies for each positioning.

In an embodiment of the present disclosure, a sampling rate in AD conversion for the reflected wave signal varies for each positioning.

In an embodiment of the present disclosure, the multiplexed signal is code-multiplexed by using a part of a plurality of code sequences with a code length greater than a number of code multiplexing for the multiplexed signal.

In an embodiment of the present disclosure, a first code sequence and a second code sequence included in the plurality of code sequences include code elements so that, between the first code sequence and the second code sequence, either odd-numbered code elements are the same and even-numbered code elements have signs inverted, or even-numbered code elements are the same and odd-numbered code elements have signs inverted, and either one of the first code sequence and the second code sequence is used for code multiplexing of the first transmission signal, and the other one of the first code sequence and the second code sequence is used for code multiplexing of the second transmission signal.

In an embodiment of the present disclosure, different transmission delays are cyclically set for the first transmission signal and the second transmission signal for each transmission period corresponding to a code length of a code sequence used for code multiplexing for the multiplexed signal.

In an embodiment of the present disclosure, the radar apparatus further includes reception circuitry, which, in operation, determines aliasing, in Doppler frequency domain, of a reflected wave signal being the multiplexed signal reflected by an object, in a range (the code length×2) times as large as a Doppler analysis range for the reflected wave signal.

A radar apparatus according to an embodiment of the present disclosure includes signal generation circuitry, which, in operation, generates a first transmission signal and a second transmission signal; and transmission circuitry, which, in operation, transmits a multiplexed signal resulting from code-multiplexing the first transmission signal and the second transmission signal, wherein different transmission delays are cyclically set for the first transmission signal and the second transmission signal for each transmission period corresponding to a code length of a code sequence used for code multiplexing for the multiplexed signal.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2020-047718, filed on Mar. 18, 2020, the disclosure of which including the specification, drawings and abstract is incorporated herein by reference in its entirety.

INDUSTRIAL APPLICABILITY

The present disclosure is suitable as a radar apparatus for wide-angle range sensing.

REFERENCE SIGNS LIST 10, 10a, 10b Radar apparatus
100, 100a Radar transmitter
101-1 First radar-transmission-signal generator
101-2 Second radar-transmission-signal generator
102-1, 102-2 Modulation signal generator
103-1, 103-2 VCO
104 Transmission signal generation controller
105 Code generator
106 Phase rotator
107-1 First transmit antenna
107-2 Second transmit antenna
108 Delayer
200, 200b Radar receiver
201 Antenna system processor
202 Receive antenna
203 Reception radio
204 Mixer
205 LPF
206 Signal processor
207 AD converter
208 Beat frequency analyzer
209 Output switcher
210 Doppler analyzer
211 CFAR section
212, 212b Aliasing determiner
213, 213b Code demultiplexer
214 Distance shifter
215 Direction estimator
216 Phase corrector
300 Positioning output section

The invention claimed is:

1. A radar apparatus, comprising:
signal generation circuitry, which, in operation, periodically generates a plurality of transmission signals transmitted at different transmission start timings; and
a transmission circuitry, which, in operation, applies different phase rotations to a first transmission signal and a second transmission signal among the plurality of transmission signals and transmits the first transmission signal and the second transmission signal from different transmission antennas,
wherein
a transmission start timing of the second transmission signal is later than a transmission start timing of the first transmission signal,
a part of the first transmission signal and a part of the second transmission signal are transmitted in a first period, and
a modulation frequency of the first transmission signal at a first timing included in the first period differs from a modulation frequency of the second transmission signal at the first timing.

2. The radar apparatus according to claim 1, further comprising
a receiving circuitry, which, in operation, down-mixes reflected wave signals being the plurality of transmission signals reflected by an object, with respect to the second transmission signal.

3. The radar apparatus according to claim 2, wherein a sampling rate in an AD conversion of the reflected wave signal varies periodically.

4. The radar apparatus according to claim 1, wherein the first transmission signal and the second transmission signal are chirp signals.

5. The radar apparatus according to claim 1, wherein at a second timing after the first timing, the modulation frequency of the first transmission signal is higher than the modulation frequency of the second transmission signal.

6. The radar apparatus according to claim 5, wherein a difference between the modulation frequency of the first transmission signal and the modulation frequency of the second transmission signal at the second timing is set based on a distance range for performing detection using the first transmission signal.

7. A radar signal processing circuits comprising:
signal generation circuitry, which, in operation, periodically generating a plurality of transmission signals transmitted at different transmission start timings; and a transmission circuitry, which, in operation, applies different phase rotations to a first transmission signal and a second transmission signal among the plurality of transmission signals and transmits the first transmission signal and the second transmission signal from different transmission antennas, wherein a transmission start timing of the second transmission signal is later than a transmission start timing of the first transmission signal, a part of the first transmission signal and a part of the second transmission signal are transmitted in a first period, and a modulation frequency of the first transmission signal at a first timing included in the first period differs from a modulation frequency of the second transmission signal at the first timing.

8. The radar signal processing circuits according to claim 7, further comprising a receiving circuitry, which, in operation, down-mixes reflected wave signals being the plurality of transmission signals reflected by an object, with respect to the second transmission signal.

9. The radar signal processing circuits according to claim 8, wherein a sampling rate in a$_n$ AD conversion of the reflected wave signal varies periodically.

10. The radar signal processing circuits according to claim 7, wherein the first transmission signal and the second transmission signal are chirp signals.

11. The radar signal processing circuits according to claim 7, wherein at a second timing after the first timing, the modulation frequency of the first transmission signal is higher than the modulation frequency of the second transmission signal.

12. The radar signal processing circuits according to claim 11, wherein a difference between the modulation frequency of the first transmission signal and the modulation frequency of the second transmission signal at the second timing is set based on a distance range for performing detection using the first transmission signal.

13. A radar signal processing method comprising:

periodically generating a plurality of transmission signals transmitted at different transmission start timings; and applying different phase rotations to a first transmission signal and a second transmission signal among the plurality of transmission signals and transmitting the first transmission signal and the second transmission signal from different transmission antennas, wherein a transmission start timing of the second transmission signal is later than a transmission start timing of the first transmission signal, a part of the first transmission signal and a part of the second transmission signal are transmitted in a first period, and a modulation frequency of the first transmission signal at a first timing included in the first period differs from a modulation frequency of the second transmission signal at the first timing.

14. The radar signal processing method according to claim 13, further comprising down-mixing reflected wave signals being the plurality of transmission signals reflected by an object, with respect to the second transmission signal.

15. The radar signal processing method according to claim 14, wherein a sampling rate in an AD conversion of the reflected wave signal varies periodically.

16. The radar signal processing method according to claim 13, wherein the first transmission signal and the second transmission signal are chirp signals.

17. The radar signal processing method according to claim 13, wherein at a second timing after the first timing, the modulation frequency of the first transmission signal is higher than the modulation frequency of the second transmission signal.

18. The radar signal processing method according to claim 17, wherein a difference between the modulation frequency of the first transmission signal and the modulation frequency of the second transmission signal at the second timing is set based on a distance range for performing detection using the first transmission signal.

* * * * *